United States Patent [19]
Higuchi et al.

[11] Patent Number: 5,822,605
[45] Date of Patent: Oct. 13, 1998

[54] PARALLEL PROCESSOR SYSTEM WITH A BROADCAST MESSAGE SERIALIZING CIRCUIT PROVIDED WITHIN A NETWORK

[75] Inventors: Tatsuo Higuchi, Fuchu; Tadaaki Isobe; Junji Nakagoshi, both of Hadano; Shigeo Takeuchi, Hanno; Tatsuru Toba, Fuchu; Yoshiko Yasuda, Kawasaki; Teruo Tanaka, Hachioji; Takayuki Nakagawa; Yuji Saeki, both of Hadano, all of Japan

[73] Assignees: Hitachi, Ltd.; Hitachi ULSI Engineering Corp., both of Tokyo, Japan

[21] Appl. No.: 408,561

[22] Filed: Mar. 22, 1995

[30] Foreign Application Priority Data

Mar. 24, 1994 [JP] Japan ................................... 6-053405
Jun. 29, 1994 [JP] Japan ................................... 6-169995

[51] Int. Cl.$^6$ ............................ G06F 13/00; H04L 12/50
[52] U.S. Cl. ................................ 395/800.11; 395/800.12; 395/200.68; 395/200.7; 395/311; 395/312
[58] Field of Search ........................ 395/800.11, 800.12, 395/200.68, 200.7, 311, 312

[56] References Cited

U.S. PATENT DOCUMENTS

| | | | |
|---|---|---|---|
| 5,212,773 | 5/1993 | Hillis .................................. | 395/200.73 |
| 5,333,279 | 7/1994 | Dunning ............................... | 395/280 |
| 5,377,333 | 12/1994 | Nakagoshi et al. ................... | 395/312 |
| 5,379,440 | 1/1995 | Kelly et al. ........................... | 395/800 |
| 5,553,078 | 9/1996 | Horie .................................. | 370/94.3 |

OTHER PUBLICATIONS

T. Boku et al, "A Performance Evaluation of Hyper–Crossbar Network", Technical Report of IEICE, Institute of Electronics, Information and Communication Engineers, CPSY 93–40, (1993, Nov.), pp. 41–48. No translation.

*Primary Examiner*—Alyssa H. Bowler
*Assistant Examiner*—John Follensbee
*Attorney, Agent, or Firm*—Fay, Sharpe, Beall, Fagan, Minnich & McKee

[57] ABSTRACT

In a parallel processor system comprising a plurality of processor elements constituting a network, a source processor element wishing to broadcast data to a plurality of destination processor elements sends a broadcast request message containing the target data to a broadcast exchanger. The broadcast exchanger converts the received message into a broadcast message and sends it over the network to the destinations. A plurality of broadcast request messages, if transmitted parallelly to the broadcast exchanger, are serialized thereby so that only one broadcast message will be transmitted at a time over the network. This prevents deadlock from occurring between different broadcast messages. The routes for transmitting broadcast request messages and those for transmitting broadcast messages are arranged so as not to overlap with one another. This suppresses deadlock between any broadcast request message and broadcast message. The broadcast exchanger is replaced alternatively with one of the partial networks. These schemes all apply where long messages are transmitted through worm-hole routing.

46 Claims, 34 Drawing Sheets

FIG. 29

| SOURCE PE ADDRESS | DESTINATION PE ADDRESS | MAX | | MIN | | CONTROL BITS | | | DATA | 17a |
|---|---|---|---|---|---|---|---|---|---|---|
| | | XMAX | YMAX | XMIN | YMIN | BC | PB | SB | | |

| SOURCE PE ADDRESS | * | MAX | | MIN | | CONTROL BITS | | | DATA | 17b BROADCAST REQUEST MESSAGE |
|---|---|---|---|---|---|---|---|---|---|---|
| | | * | * | * | * | 1 | 0 | 1 | | |

| SOURCE PE ADDRESS | * | MAX | | MIN | | CONTROL BITS | | | DATA | 17c BROADCAST MESSAGE |
|---|---|---|---|---|---|---|---|---|---|---|
| | | * | * | * | * | 1 | 0 | 0 | | |

| SOURCE PE ADDRESS | DESTINATION PE ADDRESS | MAX | | MIN | | CONTROL BITS | | | DATA | 17d ONE-TO-ONE COMMUNICATION REQUEST MESSAGE |
|---|---|---|---|---|---|---|---|---|---|---|
| | | * | * | * | * | 0 | 0 | 0 | | |

| SOURCE PE ADDRESS | DESTINATION PE ADDRESS | * | * | * | * | 0 | 0 | 1 | DATA | 17e ONE-TO-ONE COMMUNICATION MESSAGE |
|---|---|---|---|---|---|---|---|---|---|---|

| SOURCE PE ADDRESS | * | MAX | | MIN | | CONTROL BITS | | | DATA | 17f PARTIAL BROADCAST REQUEST MESSAGE |
|---|---|---|---|---|---|---|---|---|---|---|
| | | * | * | * | * | 0 | 1 | 1 | | |

| SOURCE PE ADDRESS | * | MAX | | MIN | | CONTROL BITS | | | DATA | 17g PARTIAL BROADCAST MESSAGE |
|---|---|---|---|---|---|---|---|---|---|---|
| | | XMAX | YMAX | XMIN | YMIN | 0 | 1 | 0 | | |

PARALLEL PROCESSOR SYSTEM WITH A BROADCAST MESSAGE SERIALIZING CIRCUIT PROVIDED WITHIN A NETWORK

BACKGROUND OF THE INVENTION

The present invention relates to a message transmission method and a parallel processor system for use therewith, whereby broadcast messages or partial broadcast messages are transmitted between a plurality of processor elements over a network.

Broadcasting is one of the important data transmission facilities offered by the parallel processor system for transmitting messages between the multiple processor elements configured on the network.

One method for implementing the broadcast facility is disclosed illustratively in Japanese Patent Laid-Open No. Hei 1-267763. The disclosed method involves breaking up n processor elements into factors n1×n2×n3× . . . ×nn, each factor representing a processor element disposed at one of the lattice points constituting an n-dimensional lattice space. The sides making up the lattice space are connected by partial networks each composed of a crossbar switch. This constitutes what is known as a hyper-crossbar network. The partial networks within such a network are each furnished with a circuit for implementing the broadcast facility, whereby data is transmitted parallelly from one processor element to all the other processor elements configured.

Another important data transmission facility of the parallel processor system is a partial broadcast facility. This facility involves transmitting data between the processor elements within a limited processor group on the network. One method for implementing the partial broadcast facility is disclosed illustratively in Japanese Patent Laid-Open No. Hei 5-28122 or U.S. patent application Ser. No. 07/916,663 corresponding thereto now U.S. Pat. No 5,192,580.

One problem to be considered in implementing a network is the possibility of deadlock. The deadlock is a state that the network gets into where one message conflicts with another message in acquiring a transmission route. If the network is in a state of deadlock, neither of the contending messages can proceed from there. On the hyper-crossbar network, for example, a deadlock can occur if each of a plurality of crossbar switches constituting the network receives two or more broadcast messages at the same time. Specifically, to transmit each broadcast message to the multiple output ports of the crossbar switches requires that all of these output ports be ready for use by the broadcast message in question. However, if a different part of the output ports are allocated for a different broadcast message, each of the broadcast messages involved must wait indefinitely to acquire the unallocated output ports for transmission. This problem, encountered when a plurality of broadcast messages are input to any one crossbar switch, is circumvented conventionally by use of a broadcast message serializing circuit whereby a plurality of broadcast messages are processed serially. That is, each broadcast message is transmitted after completion of transmission of the preceding message. The scheme is discussed illustratively in Japanese Patent Laid-Open No. Hei 1-267763 cited above.

Parallel processor systems generally utilize the so-called worm-hole routing as their data transmission method. This method, as disclosed illustratively in U.S. Pat. No. 5,212, 773 issued to W. Daniel Hillis, involves taking a message sufficiently longer than any of the diverse buffers within the network, dividing the message into a plurality of parts, and making these message parts advance individually. It may happen that the leading part of a message has arrived at the destination processor element while the trailing part of that message still remains in the source processor element. In such a case, the route used for the message transmission is not allocated as a whole beforehand; the necessary route is secured in steps as the leading part of the message advances. Each of a plurality of route portions constituting the allocated route is released after the trailing part of the message has passed it. That is, each of the component route portions is allocated for transmission of the message solely from the time the leading part of the message has passed that route portion in question until the time the trailing part of the message has passed it. Where a component route portion is being allocated for one broadcast message, that portion cannot be allocated for any subsequent broadcast message. In that case, with a particular route portion allocated for the current message, the attempt by the subsequent broadcast message to have the same route portion allocated for transmission of the latter causes the two messages to keep waiting for the unallocated route portion to be released while each message has part of its necessary route portions allocated. The two messages thus wait indefinitely for the perpetually unavailable route portion to be released. This is how a deadlock results from the contention for a transmission route between a plurality of processor elements transmitting a plurality of broadcast messages over a network such as a hyper-crossbar network composed of a plurality of partial networks.

FIG. 9 outlines the structure of the conventional parallel processor system described in Japanese Pat. Laid-Open No. Hei 5-28122 or U.S. patent application Ser. No. 07/916,663 now U.S. Pat. No. 5,192,580 corresponding thereto. Specifically, the network of the processor system comprises a plurality of X-coordinate crossbar switches (each abbreviated to XB-X hereunder) and a plurality of Y-coordinate crossbar switches (XB-Y hereunder). The points of intersection between the XB-Xs and the XB-Ys are each connected to an exchange switch EX. One exchange switch is connected with one processor, which is not shown in FIG. 9 for space reasons. Although Japanese Pat. Laid-Open No. Hei 5-28122 does not describe how the processor system will work if a plurality of broadcast messages are transmitted simultaneously, it is surmised that a deadlock occurs if two or more sources transmit broadcast messages as shown in FIG. 9. According to the message transmission method described in Japanese Pat. Laid-Open No. Hei 5-28122, a source 1 in FIG. 9 transmits a broadcast message to exchange switches EX00 through EX03 using an XB-X0. In turn, the EX00 through EX03 transmit the broadcast message to the EX00 through EX33 using an XB-Y0 through XB-Y3 arranged in the Y-axis direction. Through these EXs, the broadcast message is transmitted to all processor elements PE.

Meanwhile, a source 2 (EX12) transmits a broadcast message to an EX10 through EX13 using an XB-X1. These EXs in turn transmit the broadcast message to the EX00 through EX33 using the XB-Y0 through XB-Y3 in the Y-axis direction, whereby the broadcast message is transmitted to all processor elements PE. In this manner, if broadcast messages do not occur simultaneously, each message is transmitted normally to all processor elements PE. But if a plurality of broadcast messages are transmitted in a substantially simultaneous manner from the source processor element PE, then such messages do not conflict with each other regarding the XB-Xs but they do conflict regarding the XB-Ys. For example, suppose that the broadcast message from the source 1 has the XB-Y0 and XB-Y1 allocated while the broadcast message from the source 2 has the XB-Y2 and XB-Y3 allocated. In that case, one broadcast message fails to have the XB-Y2 and XB-Y3 allocated while the other message cannot secure the XB-Y0 and XB-Y1. The transmission of both messages thus stops and a deadlock occurs.

The cause of this problem is as follows: where any one broadcast message is to be transmitted over the above network, it is necessary to utilize the entire network for that message alone. Despite this requirement, attempts to secure the network for a plurality of broadcast messages are started simultaneously and independently on a plurality of routes of the network. The problem, in short, stems from such attempts to transmit a plurality of broadcast messages simultaneously over the network.

One solution to the above problem is proposed in the Technical Report of the Institute of Electronics, Information and Communication Engineers of Japan, Vol. 93, No. 320, pp. 41–48. The proposed solution involves allowing only one of the configured processor elements to be selected for executing the transmission of broadcast messages. Specifically, where it is desired to transmit data from one of the processor elements to the remaining elements, the source processor element sends a broadcast request message comprising the target data to the processor element designated as the broadcast execution processor element. After the broadcast execution processor element has received the broadcast request message, that processor element outputs a broadcast message containing the data onto the network. As a result, even if a plurality of processor elements output broadcast request messages, the broadcast execution processor element serially outputs onto the network a plurality of broadcast messages corresponding to these request messages. The scheme thus prevents the state of deadlock from occurring.

In case of a fault within a hyper-crossbar network, there is a method for transmitting data by detouring around the faulty point. One such method is disclosed illustratively in Japanese Pat. Laid-Open No. Hei 3-209550. The disclosed method involves having each of the component partial networks supplied with fault information about those partial networks connected to each partial network, whereby the transmission of messages to any faulty partial network is prevented. In each partial network, the message from the input port connected to the immediately upstream partial network is not forwarded to the output port connected to the same partial network. This prevents any message from getting into an endless loop on the network. Messages are thus transmitted correctly to the destination processor elements.

Some of the parallel processor systems employing a hyper-crossbar network have two groups of processors connected to the network. One group of processors performs arithmetic operations; the other processor group carries out I/O processing. The scheme is aimed at preventing the I/O processing required of the processor elements from deteriorating their performance in arithmetic operations. One such parallel processor system is disclosed illustratively in Japanese Pat. Laid-Open No. Hei 5-081216 or U.S. Pat. No. 5,377,333 corresponding thereto.

SUMMARY OF THE INVENTION

The method proposed in the Technical Report of the Institute of Electronics, Information and Communication Engineers of Japan, Vol. 93, No. 320 is effective in preventing deadlock, but has the disadvantage of taking extra time in transmitting broadcast messages. Specifically, a processor element that wants to transmit a broadcast message first issues a broadcast request message. The request message is received by the broadcast execution processor element. Thereafter, the broadcast execution processor element sends out a broadcast message including the data from the broadcast request message. In this manner, the proposed method is plagued by the transmission overhead involving the reception of a broadcast request message and the subsequent transmission of a broadcast message.

If the broadcast execution processor element doubles as a processor element for executing arithmetic operations, the processor element must halt its ongoing arithmetic operation when transmitting the broadcast message. This translates into a delay in the execution of the arithmetic operations by that processor element.

Suppose that the processor element located the farthest from the broadcast execution processor element requests message broadcast. In that case, effecting the broadcast requires allocating two routes: one for transmitting a broadcast request message from the source processor element to the broadcast execution processor element, the other for transmitting a broadcast message from the broadcast execution processor element to the source processor element. The transmission distance involved is twice the distance used for transmitting a one-to-one communication message. It thus takes time to complete a broadcast session after a request for message broadcast is made.

The problems above also apply to partial broadcast messages.

The above-mentioned method for detouring around the faulty point on the network, as disclosed in Japanese Pat. Laid-Open No. Hei 3-209550, has the following disadvantage: with one of the configured partial networks at fault, there may occur in a substantially simultaneous manner a combination of a broadcast message and a one-to-one communication message, a combination of a broadcast message and a partial broadcast message, or a combination of a plurality of broadcast messages. In such cases, the attempts to detour around the faulty route portion will result in a deadlock.

It is therefore an object of the present invention to provide a message transmission method and a parallel processor system for use therewith, whereby broadcast messages are transmitted more rapidly than before while the state of deadlock is avoided.

It is another object of the invention to provide a message transmission method and a parallel processor system for use therewith, whereby partial broadcast messages are transmitted more rapidly than before while the state of deadlock is avoided.

It is a further object of the invention to provide a message transmission method and a parallel processor system for use therewith, whereby broadcast messages are transmitted more rapidly than before while the state of deadlock is avoided and a faulty point within the network is detoured.

In achieving the foregoing and other objects of the present invention and according to one aspect thereof, there is provided a message transmission method comprising the steps of:

taking from a source processor element a broadcast request message including the data designated by the source processor element requesting the broadcast of the data to a plurality of processor elements on a network, in order to transmit via the network the broadcast request message from the source processor element to a predetermined position within the network; and transmitting from the predetermined position within the network a broadcast message including the data retained in the transmitted broadcast request message, to the plurality of processor elements via the network.

Preferably, the broadcast message is transmitted over a transmission route different from the route for transmitting the broadcast request message from the source processor element to the predetermined position within the network.

More specifically, the message transmission method according to the invention comprises the steps of:

taking from a plurality of source processor elements a plurality of broadcast request messages including the data designated by the plurality of source processor elements each requesting the broadcast of the data to a plurality of processor elements on a network, in order to transmit via the network the plurality of broadcast request messages parallelly from the plurality of source processor elements to a plurality of predetermined positions within the network; and transmitting from the plurality of predetermined positions within the network a plurality of broadcast messages including the data retained in the transmitted broadcast request messages, serially to the plurality of processor elements via the network.

The above step for serially transmitting the multiple broadcast messages preferably includes a step for selecting another broadcast message every time the current broadcast message in its entirety has been transmitted to the predetermined positions.

The above step for serially transmitting the multiple broadcast messages preferably regards a plurality of output positions as the predetermined positions. In this case, the broadcast messages may be transmitted in parallel from these output positions onto the network.

According to another aspect of the invention, there is provided a network for connecting a plurality of processor elements, the network comprising:

a broadcast request message transmission route for transmitting to a first predetermined position within the network a broadcast request message which is sent by one of the processor elements and which includes the data to be broadcast to the plurality of processor elements;

a broadcast message supply circuit connected to the first predetermined position and used to convert the broadcast request message transmitted to the position into a broadcast message for requesting the transmission of the data held in the broadcast request message to the plurality of processor elements, the broadcast message supply circuit further supplying the broadcast message to another predetermined position within the network; and a broadcast message transmission route for transmitting the broadcast message thus supplied to the plurality of processor elements.

The network above receives a broadcast request message from any one processor element, generates with little delay a broadcast message requested by that broadcast request message, and transmits the generated broadcast message to the multiple processor elements on the network.

Preferably, the broadcast request message transmission route and the broadcast message transmission route have no overlapping portion therebetween. This arrangement prevents the two kinds of messages from bringing about a state of deadlock.

More preferably, the above network further comprises:

a second broadcast request message transmission route for transmitting to a second predetermined position within the network a second broadcast request message which is sent by another processor element and which includes the data to be broadcast to the plurality of processor elements;

wherein the broadcast message supply circuit has a circuit which is connected to the second predetermined position, which converts the broadcast request messages transmitted to the first and the second predetermined position into a plurality of corresponding broadcast messages, and which outputs the plurality of broadcast messages serially from the second predetermined position onto the network.

With the preferred network above in use, a plurality of broadcast request messages may be transmitted in parallel to the broadcast message supply circuit, and this circuit still supplies the corresponding broadcast messages serially to the network. This arrangement suppresses the state of deadlock caused by the parallel supply of a plurality of broadcast messages to the network.

In another preferred structure according to the invention, the network is constituted by a hyper-crossbar network comprising a plurality of crossbar switches and a plurality of exchange switches connecting these crossbar switches. The broadcast message supply circuit is added to the network as an exchange switch for connecting any two of the plurality of crossbar switches.

In a further preferred structure according to the invention, the above hyper-crossbar network includes an I/O processor element in addition to the configured processor elements. The broadcast message supply circuit is furnished in the position of the exchange switch for connecting the I/O processor element to the hyper-crossbar network. Thus located, the broadcast message supply circuit doubles as the exchange switch for connecting the I/O processor element to the network.

In an even further preferred structure according to the invention, the above hyper-crossbar network comprises a conversion circuit furnished in each of a plurality of exchange switches connected to one particular crossbar switch, the conversion circuit converting a broadcast request message into a broadcast message. That particular crossbar switch includes a broadcast message serializing circuit.

These aspects and variations of the invention permit high-speed transmission of broadcast messages without causing a deadlock by taking advantage of the rapid transmission capability of the hyper-crossbar network. The invention is particularly effective in transmitting broadcast messages by worm-hole routing over the hyper-crossbar network.

These and other objects, features and advantages of the invention will become more apparent upon a reading of the following description and appended drawings.

BRIEF DESCRIPTION OF THE DRAWINGS

FIG. 29 is a view depicting message formats used by a parallel processor system practiced as a sixth embodiment of the invention;

DESCRIPTION OF THE PREFERRED EMBODIMENTS

Figure 1:
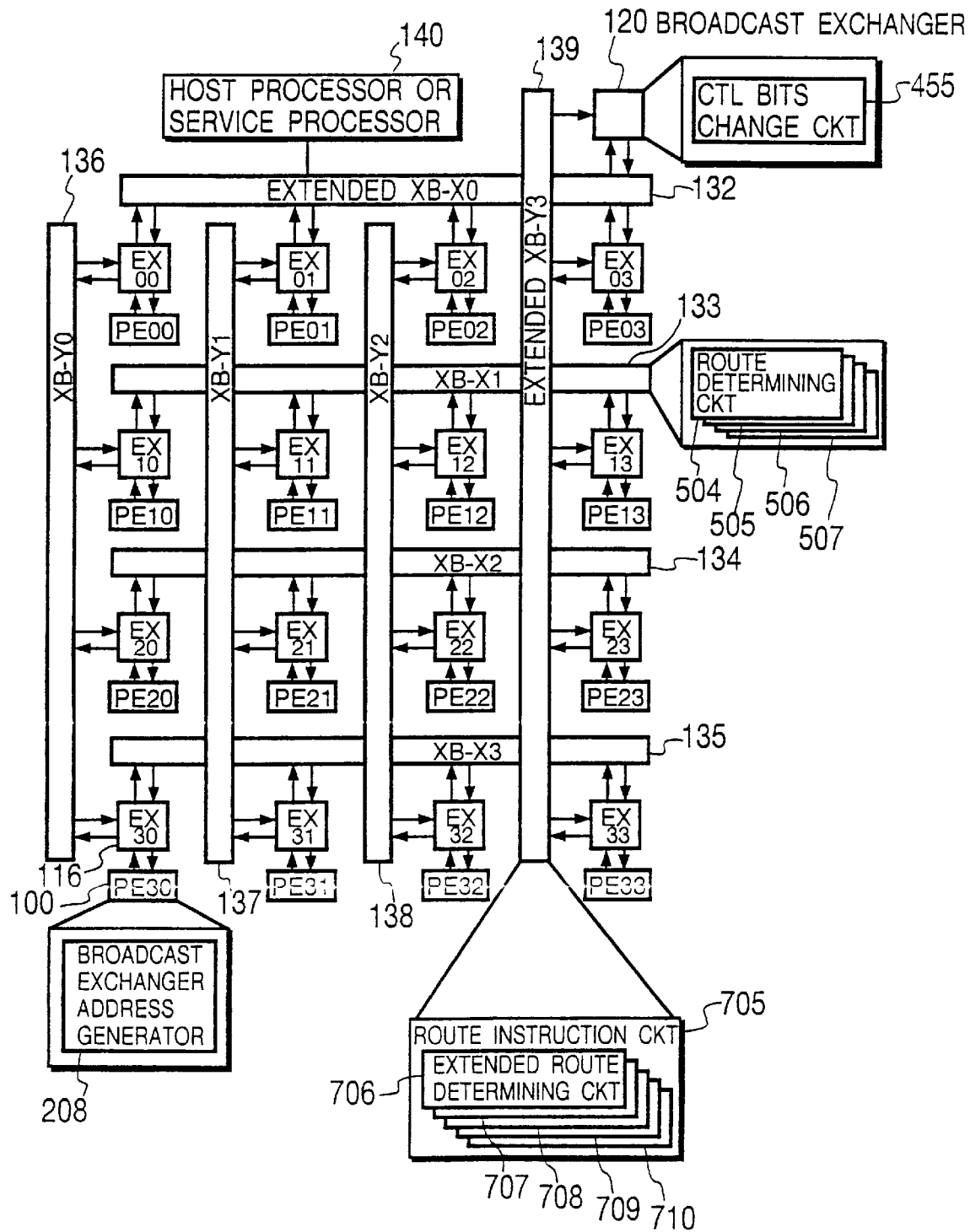
FIG. 1 is a schematic circuit diagram of a parallel processor system practiced as a first embodiment of the invention.

Preferred embodiments of the invention will now be described with reference to the accompanying drawings. In the description that follows, like reference numerals designate like or corresponding parts. Throughout the embodiments described below, like circuit names designate like or similarly structured circuits. The embodiments and their variations in this specification utilize what is disclosed in Japanese Pat. Laid-Open No. Hei 5-28122 or U.S. patent application Ser. No. 07/916,663 now U.S. Pat. No. 5,192,580 corresponding thereto. The contents of these applications, including the network constitution, the scheme for transmitting broadcast messages, and the techniques for transmitting partial broadcast messages, are incorporated in this specification for reference.

<First Embodiment>

In FIG. 1, reference numerals 132 through 135 are X-coordinate crossbar switches (each abbreviated to XB-X hereunder), and 136 through 139 are Y-coordinate crossbar switches (each abbreviated to XB-Y hereunder). Reference numeral 116 represents an exchange switch (abbreviated to EX) connected to one I/O port of an XB-X as well as to one I/O port of an XB-Y. These crossbar switches and exchange switches constitute a hyper-crossbar network. Reference numeral 100 denotes a processor element (abbreviated to PE) connected to one EX. Reference numeral 120 indicates a broadcast exchanger (BEX) having a broadcast serializing facility specific to the first embodiment. Reference numeral 140 is a host processor or a service processor (SVP) which loads programs and data to the PEs and which retrieves the resultant data from each PE upon completion of program execution thereby. The processor 140 also initializes the network and the PE, monitors the PE and the network for failure, and services the network and the PE in case of fault.

Each PE is given a network address (simply called the address hereunder) representing the combination of X and Y coordinates of a single lattice point in a two-dimensional coordinate space. Each XB-X is installed with respect to a plurality of PEs having the same Y coordinate. Hence each XB-X represents an X-coordinate XB, and each XB-Y denotes a Y- coordinate XB. Each XB-X is specified as XB-Xi, the suffix i representing the Y coordinate i (i=0–3). Each XB-Y is installed with respect to a plurality of PEs having the same X coordinate. Each XB-Y is specified as XB-Yj, the suffix j representing the X coordinate j (j=0–3). In FIG. 1, each PE is identified by its Y and X coordinates. For example, PE03 is the processor element having a Y coordinate of 0 and an X coordinate of 3. Each EX is given the same address as that of the corresponding PE. Each crossbar switch has a plurality of input ports and a plurality of output ports. Upon receipt of a plurality of ordinary messages (called one-to-one communication messages) through these input ports, a crossbar switch is capable of transmitting these messages parallelly to the output ports designated by the addresses held in the messages. When admitting a broadcast message through one of the input ports, a crossbar switch is also capable of transmitting the message parallelly to the output ports. More specifically, the XB-X1 through XB-X3 and the XB-Y0 through XB-Y2 each comprise three input ports and three output ports connected to a plurality of PEs. The XB-X0 has an additional set of an input and an output port connected to the broadcast exchanger (BEX) 120. Equipped with these extended ports, the XB-X0 is called the extended X-coordinate crossbar switch or the extended XB-X0. Likewise, the XB-Y3 further comprises one output port connected to the broadcast exchanger (BEX) 120. Thus furnished with the extended port, the XB-Y3 is called the extended Y-coordinate crossbar switch or the extended XB-Y3. In the description that follows in which these crossbar switches are not specifically distinguished from one another, they may be simply referred to as XBs. Although FIG. 1 shows four X-coordinate crossbar switches and four Y-coordinate crossbar switches, the quantities are only for illustration purposes. With the first embodiment, messages are transmitted over the network through wormhole routing as described in U.S. Pat. No. 5,212,773 cited above. The transmission technique described in this U.S. patent is incorporated herein for reference regarding the first embodiment and the embodiments that will be discussed later and their variations. The technique above involves first dividing into a plurality of parts a message significantly longer than the capacities of the diverse buffers within the network, and having each of the message parts advance individually through the network. The first embodiment deals with the transmission of a message so long that its trailing part still remains in the source processor element while its leading part has already arrived at the destination processor element. In such a case, the route used for the message transmission is not allocated as a whole beforehand; the necessary route is secured in steps as the leading part of the message advances. Each of a plurality of route portions constituting the allocated route is released after the trailing part of the message has passed it.

In the first embodiment, each PE wishing to broadcast data to all other PEs transmits a broadcast request message containing the data to the broadcast exchanger (BEX) 120. Responding serially to a plurality of broadcast request messages from a plurality of PEs, the broadcast exchanger (BEX) 120 transmits serially the broadcast messages requested by these messages to the XB-X0. That is, the broadcast exchanger (BEX) 120 performs the same serializing operation as that on a plurality of broadcast request messages carried out by one of the PEs as described in connection with the prior art. Under the prior art, when any one PE performs the serializing operation, that PE receives a broadcast request message in its entirety and then retransmits a broadcast message containing the data held in the received broadcast request message. However, unlike the other EXs, the broadcast exchanger (BEX) 120 has no corresponding PE connected thereto. That is, the broadcast exchanger (BEX) 120 serializes a plurality of broadcast request messages from the network in preparation for serial retransmission of the corresponding broadcast messages. The broadcast exchanger (BEX) 120 comprises a CTL bit change circuit 455. This circuit converts the control bits contained in, and standing for, each broadcast request message into those representing a broadcast message to be retransmitted, whereby a broadcast message is generated. Thus with the first embodiment, unlike under the prior art, the broadcast exchanger (BEX) 120 transmits an already received leading part of a broadcast request message while still receiving concurrently a subsequent part of that message. The scheme minimizes the delay in the broadcast exchanger (BEX) 120 transmitting the broadcast message. Because the broadcast exchanger (BEX) 120 is furnished independently of the PEs for performing arithmetic operations, the performance of the arithmetic operation PEs is not delayed by the intervention of the BEX 120.

Whereas the use of the broadcast exchanger (BEX) 120 offers the benefits outlined above, it could bring about a deadlock involving a broadcast request message and a broadcast message. Specifically, where the first embodiment utilizes worm-hole routing, the following can happen: with the route allocated for transmission of a broadcast request message from one PE up to the broadcast exchanger (BEX) 120, that part of the broadcast request message which has first arrived at the broadcast exchanger (BEX) 120 is sent therefrom as the leading part of the corresponding broadcast message. At this point, if the broadcast message is to employ for its transmission any portion of the already allocated route, the broadcast message waits for that portion of the allocated route to be released. While the broadcast message waits indefinitely for the necessary route portion to be released, the broadcast request message is also unable to advance over the network. Thus occurs a deadlock involving these two messages.

Figure 10:
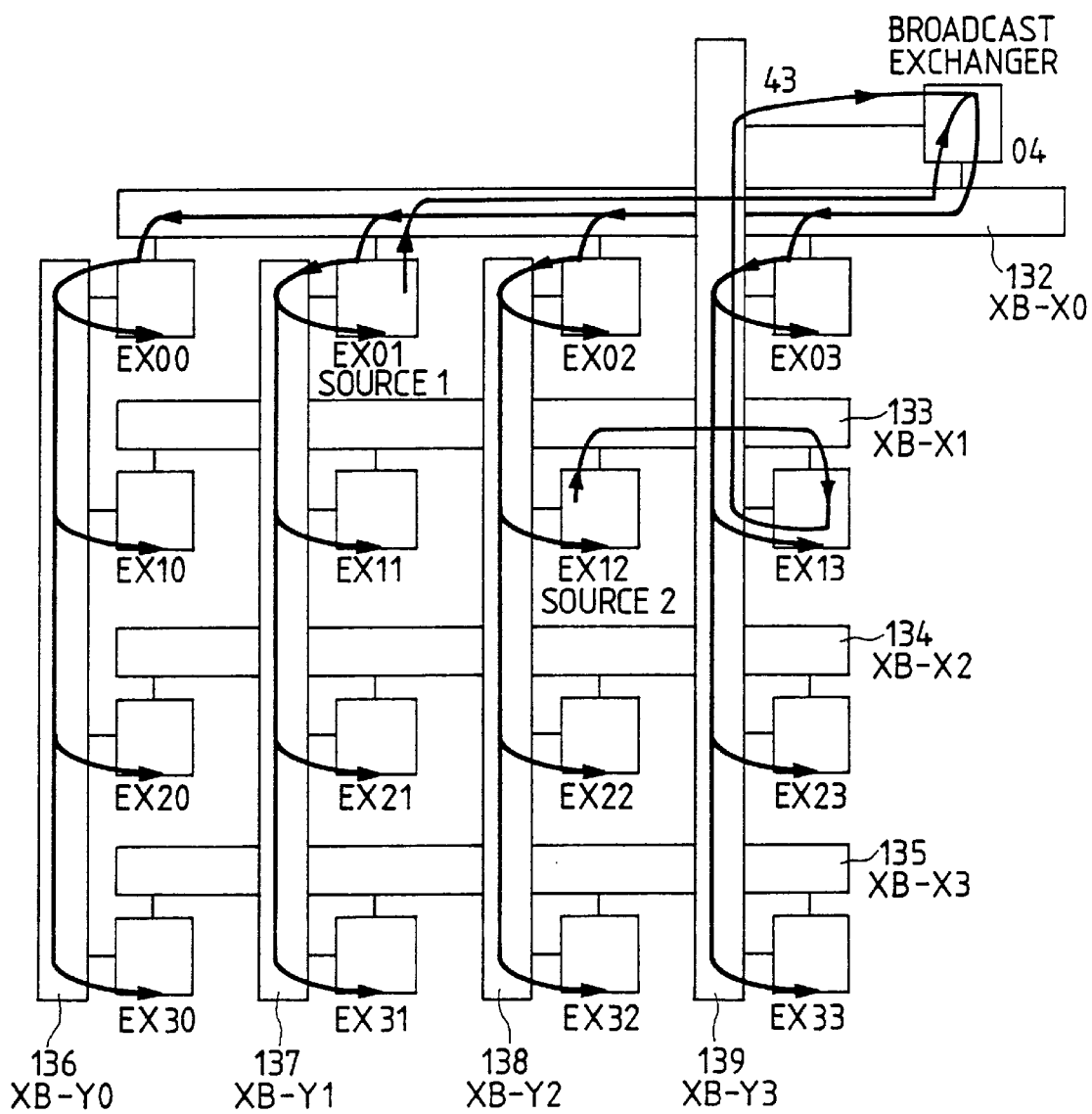
FIG. 10 is a view indicating typical routes for transmitting a plurality of broadcast messages by use of the circuit in FIG. 1.

The problem above is circumvented by the first embodiment being arranged so that the route for the broadcast request message will not overlap with that for the broadcast message. FIG. 10 is a view indicating typical routes for transmitting a broadcast request message and a broadcast message by use of the first embodiment. The first embodiment is arranged to transmit an ordinary message (one-to-one communication message) from a source PE to a destination PE as follows: the source PE first transmits the message via the EX connected therewith to an XB-X. From that XB-X, the message is transmitted to the EX having the same X coordinate as that in the address of the destination PE. Thereafter, the message is transmitted via that EX to an XB-Y. Past that XB-Y, the message is transmitted to the EX having the same Y coordinate as that in the address of the destination PE. From that EX, the message is transmitted to the destination PE connected thereto.

A broadcast request message sent from a PE connected to an XB-X other than the extended XB-X0, e.g., from source 2 (PE12) connected to an EX12, is also sent to the broadcast exchanger (BEX) 120 in like manner. In this case, the address of the broadcast exchanger (BEX) 120 is used in place of the address of the destination PE. The address of the broadcast exchanger (BEX) 120 used here is a first address related to this BEX for transmitting the broadcast request message via the extended XB-Y3 to the broadcast exchange (BEX) 120. The first address is address 43 consisting of a Y coordinate of 4 and an X coordinate of 3. The Y coordinate 4 is selected to be greater than the X coordinate of any of the EX03 through EX33 connected to the extended XB-Y3. The X coordinate 3 is the same as that of the other PEs connected to this XB-X0. When the PE12 in the source 2 outputs the broadcast request message containing the above first address, that message is transmitted just like a one-to-one communication message from EX12 to XB-X1 to EX13. From the EX13, the broadcast request message is transmitted to the extended XB-Y3. The broadcast request message is then transmitted to the broadcast exchanger (BEX) 120 via the output port which is located within the extended XB-Y3 and which is connected to the broadcast exchanger (BEX) 120. In response to the broadcast request message thus received, the broadcast exchanger (BEX) 120 changes the control bits in that message into those representing a broadcast message which is then forwarded to the XB-X0. The subsequent route for transmitting this broadcast message is the same as that of the conventional method. Specifically, as shown in thick line in FIG. 10, the broadcast message is transmitted parallelly from the XB-X0 to the EX00 through EX03 and on to the XB-Y0 through XB-Y3. From the EX00 connected to the XB-Y0 through XB-Y3, the broadcast message is transmitted to the EX33. Past these EXs, the broadcast message is sent from the PE00 to the PE33. As described, the route for transmitting a broadcast request message does not overlap with the route for transmitting a broadcast message. Thus no deadlock occurs with respect to the two messages.

Meanwhile, suppose that one of the PE00 through PE03 connected to the XB-X0 issues a broadcast request message. In that case, the address of the broadcast exchanger (BEX) 120 used here is a second address related to the XB-X0 for transmitting the broadcast request message to the broadcast exchanger (BEX) 120. With the first embodiment, the second address is address 04 consisting a Y coordinate of 0 and an X coordinate of 4. The Y coordinate 0 is the same as that of the other EX00 through EX03 connected to this XB-X0. The X coordinate 4 is selected to be greater than the X coordinate of any of these EXs. For example, suppose that the PE01, i.e., source 1, outputs a broadcast request message containing the second address. In such a case, the message is transmitted from the extended XB-X0 directly to the broadcast exchanger (BEX) 120. The subsequent operation of the broadcast exchanger (BEX) 120 is the same as that carried out when a broadcast request message is received from the source 2. In this case, too, the route for transmitting the broadcast request message does not overlap with that for transmitting the broadcast message. Thus no deadlock occurs involving the two messages.

Suppose that, in transmitting its broadcast request message, the source 1 uses as the address of the broadcast exchanger (BEX) 120 the address 43 that the source 2 utilized in transmitting a broadcast request message. In such a case, the message is sent to the XB-Y3 via the XB-X0 and EX03. Past the XB-Y3, the message is transmitted to the broadcast exchanger (BEX) 120. Although the broadcast request message needs to pass through the EX03, the broadcast message corresponding to that message is also required to pass therethrough. With their transmission routes thus overlapping partially, the two messages will bring about a deadlock if they are to be transmitted through worm-hole routing. To avoid the deadlock, the first embodiment uses the address 04 as the address of the broadcast exchanger (BEX) 120 when transmitting a broadcast request message from any PE connected to the XB-X0. The broadcast request message is transmitted from the XB-X0 directly to the broadcast exchanger (BEX) 120 without passage through the EX03.

Meanwhile, suppose that a PE other than the PE00 through PE03 transmits a broadcast request message. In such a case, it is impossible to utilize for transmission the second BEX address 04 employed by the source 1 in transmitting its broadcast request message. Because the XB-X1 through XB-X3 to which these PEs are connected have no route corresponding to the X coordinate 4 in the second address, this message cannot be transmitted over this network. For this reason, the first embodiment switches the above-described two BEX addresses as needed.

Figure 8:
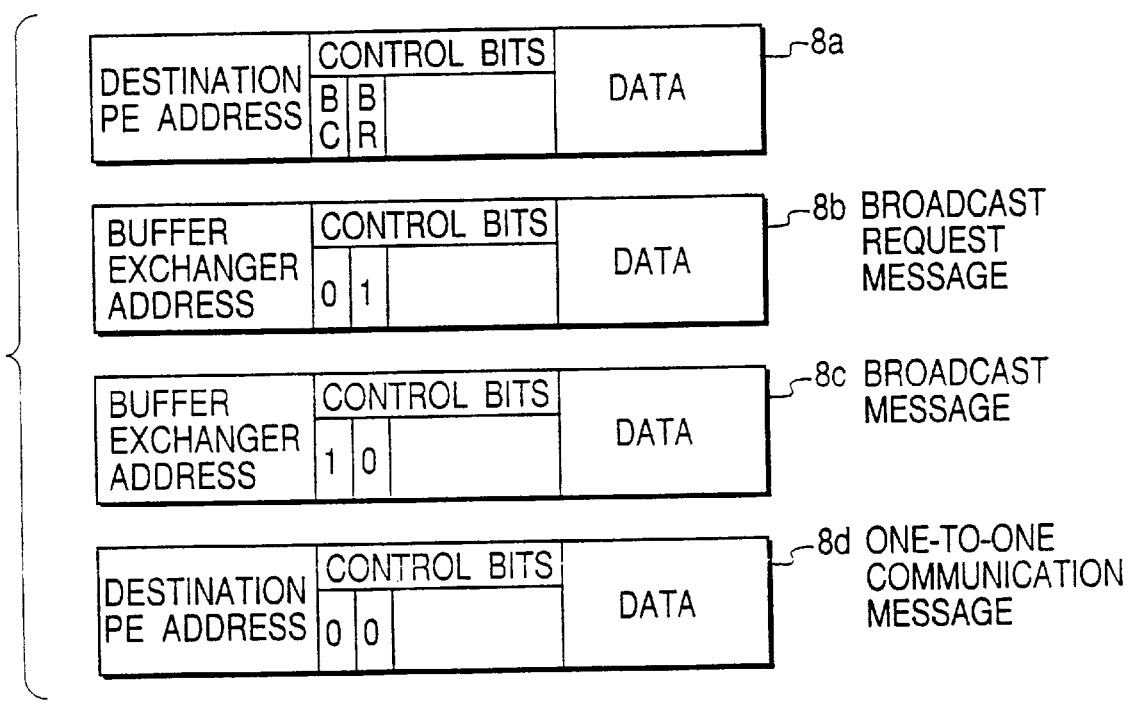
FIG. 8 is a view showing message formats used by the circuit of FIG. 1.
Figure 9:
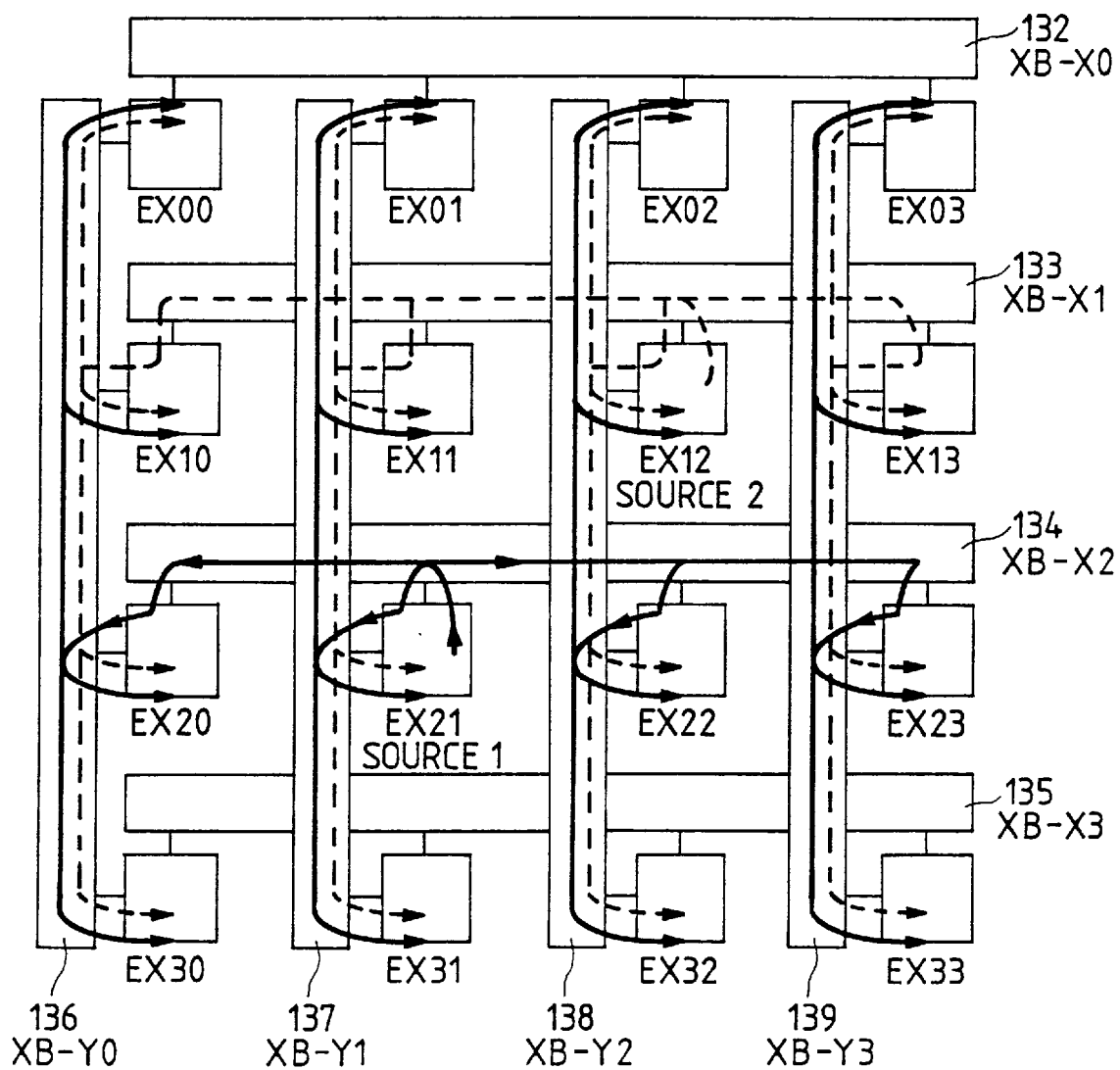
FIG. 9 is a view depicting typical routes for transmitting a plurality of broadcast messages conventionally.

More details of the circuit constituting the first embodiment will now be described. FIG. 8 is a view showing various message formats used by the circuit of FIG. 1. As shown in the common format 8a, each message is composed of a destination PE address field, a control (CTL) bit field and a data field. The destination PE address is the address of the PE that receives the message. The CTL bits represent the attribute of the message in question and contain a BC bit and a BR bit. When set, the BC bit indicates that the message is a broadcast message; when set, the BR bit indicates that the message is a broadcast request message.

In the case of a broadcast request message 8b, the BC bit is set to 0 and the BR bit to 1. The destination PE address is set to be the BEX address (04 or 43).

With a broadcast message 8c, the BC bit is set to 1 and the BR bit to 0. The destination PE address is also set to be the address of the one-to-one communication exchanger (BEX) 120 (04 or 43).

With a broadcast message 8d, both the BC bit and the BR bit are set to 0.

Figure 4:
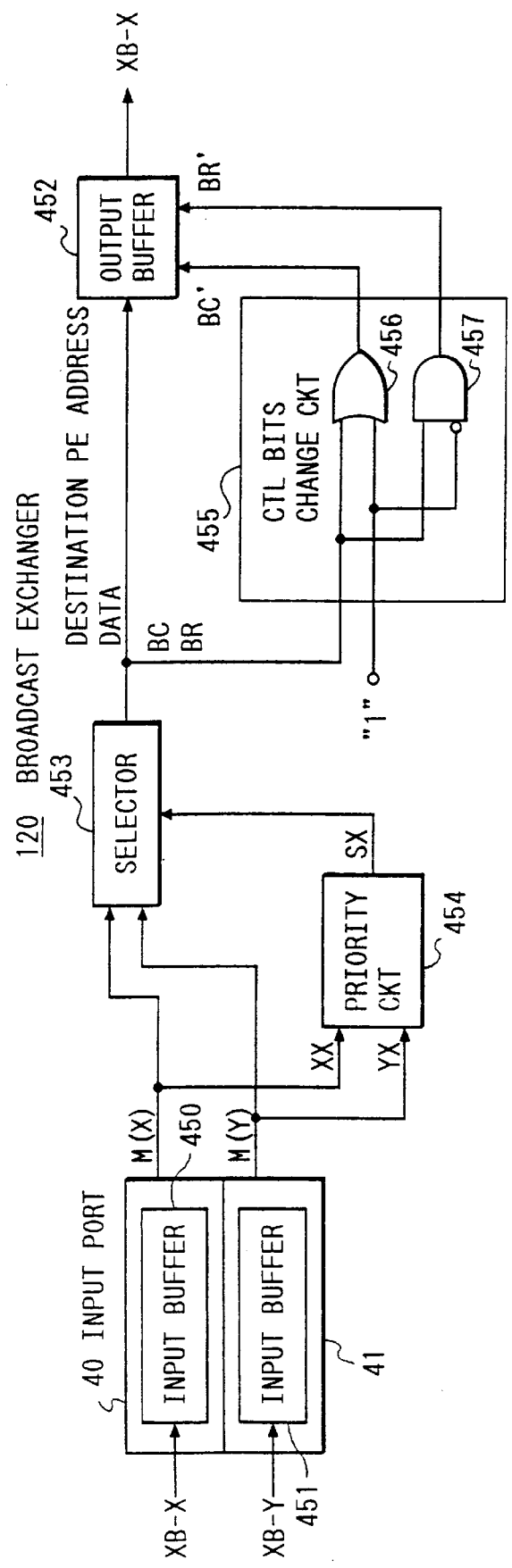
FIG. 4 is a schematic circuit diagram of a broadcast exchanger (BEX) used by the circuit of FIG. 1.

FIG. 4 is a schematic circuit diagram showing the structure of the broadcast exchanger (BEX) 120. The broadcast exchanger (BEX) 120 has its two input ports 40 and 41 connected to the extended XB-X0 and the extended XB-Y3, respectively. Input buffers 450 and 451 retain temporarily the messages input through the ports 40 and 41, respectively. Upon receipt of the messages, the input buffers 450 and 451 supply a priority circuit 454 with signals XX and YX respectively, the signals indicating the presence of the messages to be transmitted. The priority circuit 454 selects one of the broadcast request messages held in the input buffers 450 and 451 for transmission. Having made the selection, the priority circuit 454 supplies a selector 453 with a signal SX indicating which of the signals has been selected. Illustratively, this broadcast exchanger selects messages on a first-in, first-out basis. Given the signal SX, the selector 453 selects accordingly the message to be transmitted. An output buffer 452 retains temporarily the message thus selected.

A control (CTL) bit change circuit 455 changes the BC bit (with a value of 0) and the BR bit (with a value of 1) of the broadcast request message M(X), M(Y) selected by the selector 453, into the bits of a broadcast message. The BC bit is converted to a new BC bit (BC' with a value of 1) by an OR gate 456 that admits a signal 1; the BR bit is converted to a new BR bit (BR' with a value of 0) by an AND gate 457 that has its inversion input terminal receive the signal 1. The BC' and BR' bits are transmitted to the output buffer 452. This rewrites the BC and BR bits of the broadcast message retained in the output buffer 452, whereby the broadcast request message held in the output buffer is converted to the corresponding broadcast message. The broadcast message in the output buffer is broadcast from there to all PEs via the XB-X0.

The first embodiment also performs message transmission through the use of the above-described worm-hole routing. Initially, the input buffer 450 or 451 retains the leading part of the message to be transmitted. When selected by the selector 453, the leading part of the message is sent to the output buffer 452. This leaves empty the input buffer that held the leading part of the message. As a result, a part of the same message subsequent to its leading part is forwarded to the same input buffer from the XB-X0 or XB-Y3. The leading part of the message in the output buffer is transmitted from there to the XB-X0. At the time that the output buffer 452 becomes empty, the subsequent part of the same message in the same input buffer is selected. Thus the priority circuit 454 keeps selecting the same input buffer once the circuit 454 selects the leading part of a broadcast request message having arrived at the input buffer 451 or 452, until all subsequent parts of that message have been transmitted to the output buffer 452. During that time, the input port 40 or 41 secures the input buffer therein for the message being transmitted and not for any other new message. After one message in its entirety has been selected by the priority circuit 454 and transmitted to the output buffer 452, the priority circuit 454 starts selecting anew the input buffer 450 or 451. As a result, the broadcast exchanger (BEX) 120 transmits only one broadcast message at a time. That is, the broadcast exchanger (BEX) 120 selects serially a plurality of broadcast request messages. Only after the entire broadcast message corresponding to one selected broadcast request message has been transmitted, is the next broadcast request message processed. This is how a plurality of broadcast request messages are serialized. Meanwhile, to implement the priority circuit 454 requires furnishing three circuits: one for checking to see if that part of the message which is held in the input buffer 450 or 451 is the leading part or the trailing part of the message, another for checking to see if the output buffer 452 is empty, and another for determining the input buffer in accordance with the output of these checking circuits. These component circuits of the priority circuit 454 are implemented using known techniques and thus will not be discussed further.

Unlike the EXs, the broadcast exchanger (BEX) 120 has no PE corresponding thereto and thus has no output buffer for transmitting messages to PEs. Furthermore, the message received from the XB-X0 or XB-Y3 is transmitted to the XB-X0. Thus the broadcast exchanger (BEX) 120 has no output buffer for transmitting messages to the XB-Y3.

Figure 2:
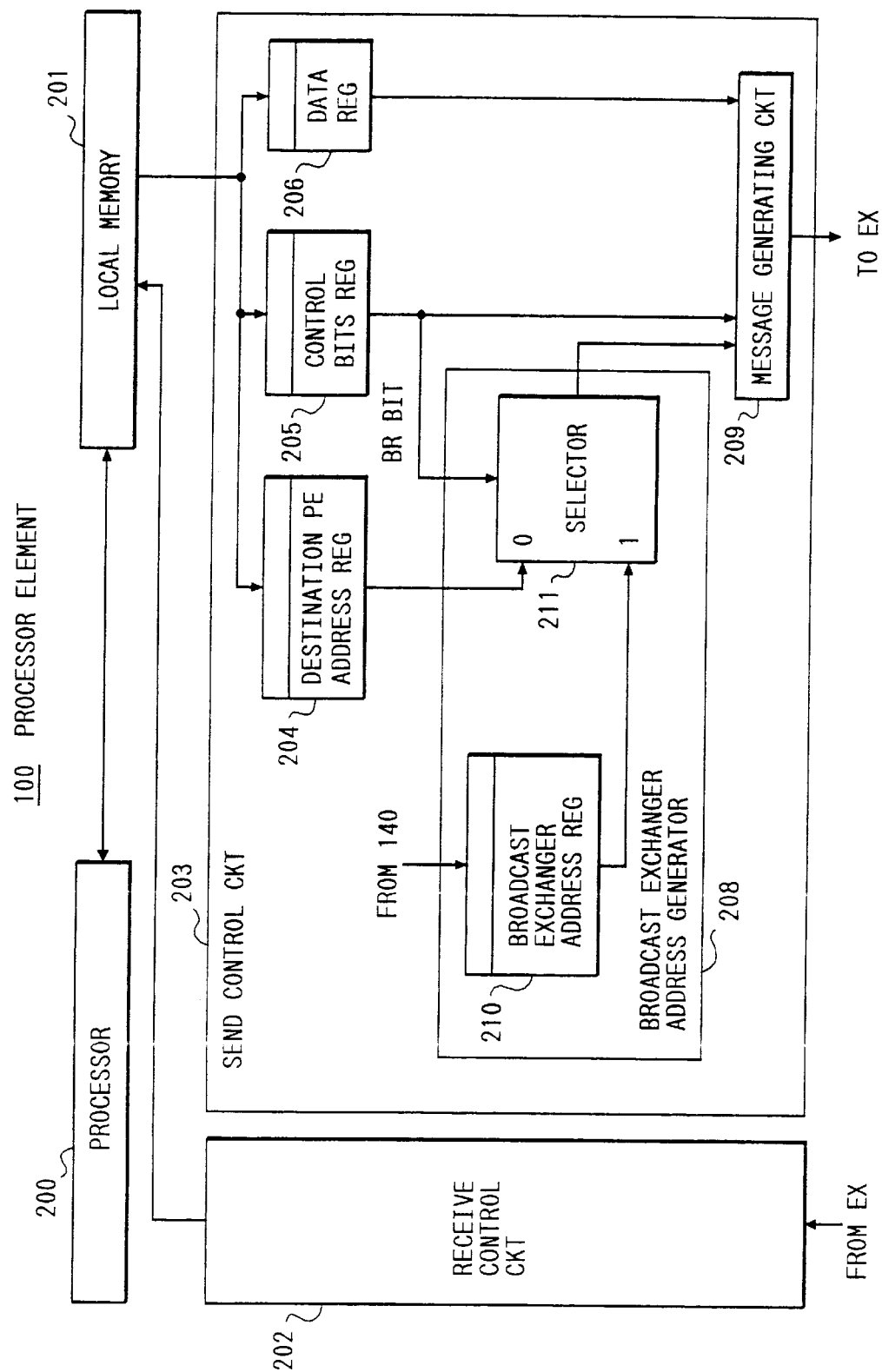
FIG. 2 is a schematic circuit diagram of a processor element (PE) used by the circuit of FIG. 1.

FIG. 2 is a schematic circuit diagram showing the structure of a processor element PE100. The other PEs have the same structure as that of the PE100. With the exception of a circuit 208 for generating a BEX address used to transmit a broadcast request message, the PE structure is basically the same as that of the PEs described in Japanese Pat. Laid-Open No. Hei 5-28122 or U.S. patent application Ser. No. 07/916,663 now U.S. Pat. No. 5,192,580 corresponding thereto. The BEX address generator 208 is composed of a BEX address register 210 for retaining the BEX address and a selector 211. When the BR bit within the CTL bits in a register 205 is found to be 1, the selector 211 selects in place of the destination PE address the address of the broadcast exchanger (BEX) 120 held in the register 210; otherwise the selector 211 selects the destination PE address. In the setup of FIG. 1, upon system start, the host processor or service processor (SVP) 140 may initially set 04 in the register 210 for the PE00 through PE03 and 43 in the register 210 for the other PEs. When outputting a broadcast request message, each PE sets 0 for the BC bit and 1 for the BR bit in the register 205, and sets in the register 206 the data to be broadcast. Then the broadcast request message 8b of FIG. 8 is transmitted. Needless to say, a long broadcast request message is divided into a plurality of parts according to the worm-hole routing convention for serial transmission.

In FIG. 2, reference numeral 200 is a data processor for executing programs; 201 is a local memory for storing data and instruction series; 202 is a receive control circuit that receives a message from the EX corresponding to the PE in question and transmits the received message to the memory 201; and 203 is a send control circuit. The send control circuit 203 comprises registers 204 through 206 for retaining the message contents retrieved from the memory 201, and a message generating circuit 209 for generating a message and transmitting it to the EX corresponding to the PE in question.

Figure 3:
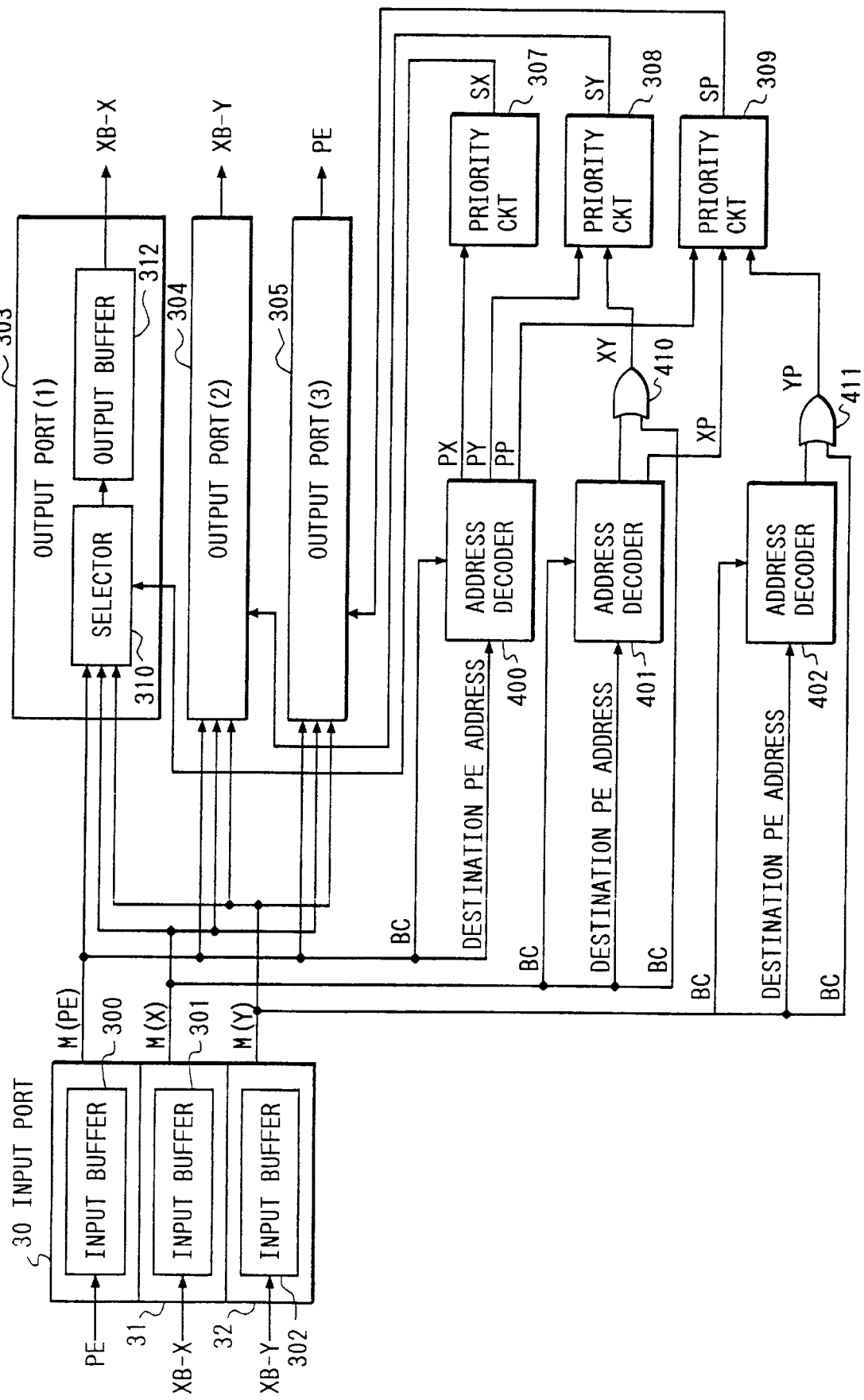
FIG. 3 is a schematic circuit diagram of an exchange switch (EX) used by the circuit of FIG. 1.

FIG. 3 is a schematic circuit diagram showing the structure of an exchange switch EX116. The other EXs have the same structure as that of the EX116. The EX structure is basically the same as that of the EXs described in Japanese Pat. Laid-Open No. Hei 5-28122 or U.S. patent application Ser. No. 07/916,663 now U.S. Pat. No. 5,192,580 corresponding thereto.

Three input ports 30, 31 and 32 of each EX are connected respectively to a PE, XB-X and XB-Y. The messages received through the input ports 30 through 32 are held temporarily in input buffers 300 through 203, respectively. Output ports 303 through 305 send messages to an XB-X, XB-Y and PE, respectively.

When the received message is a one-to-one communication message or a broadcast request message, each EX transmits the message as follows:

(1) The message received from the PE is sent to the XB-X, XB-Y or PE.

The message is sent to the PE if the X and Y coordinates of the destination PE address held in that message coincide with those of the current PE. The message is sent to the XB-Y if the X coordinate of the destination PE address held in that message coincides with the X coordinate of the current PE but the Y coordinate of that destination PE address does not coincide with that of the current PE. Otherwise the message is transmitted to the XB-X.

(2) The message input from the XB-X is sent to the XB-Y.

(3) The message input from the XB-Y is sent to the PE.
If the received message is a broadcast message, each EX transmits the message as follows:

(1) The broadcast message input from the XB-X is sent to the XB-Y.

(2) The broadcast message input from the XB-Y is sent to the PE.

Below is a brief description of the EX circuit structure.

Reference numerals 400 through 402 designate address decoders which, if messages M(PE), M(X) and M(Y) input to the input buffers 300 through 302 are a one-to-one communication message or a broadcast request message each, decode the destination PE address in each message to determine the destination to which the message is destined. These address decoders operate when the BC bit is found to be 0 in the messages. The reference characters M(PE), M(X) and M(Y) of the messages indicate that these are message signals (destination PE address, broadcast bit BC, broadcast request bit BR) received from the PE, XB-X and XB-Y connected to the EX. Output signals PX, PY and PP indicate that the messages received from the PEs are sent to the PEs. Likewise, output signals XY and XP indicate that the messages received from the XB-X are sent to the XB-Y and PE. An output signal YP indicates that the message received from the XB-Y is sent to the PE. It should be noted that there is no signal YX that would indicate that the message received from the XB-Y would be sent to the XBX. This is because, as discussed in the Technical Report of the Institute of Electronics, Information and Communication Engineers of Japan, Vol. 93, No. 320, the first embodiment performs dimension order routing whereby all messages are first transmitted in the X-axis direction and then in the Y-axis direction so as to avoid the deadlock of one-to-one communication messages. That is, no message is transmitted first in the Y-axis direction and then in the X-axis direction, i.e., no message received from the XB-Y is initially transmitted to the XB-Y.

Reference numerals 307 through 309 denote priority circuits. These priority circuits select one of three input messages, and output signals SX, SY and SP indicating which of the messages is selected. In this example, the received messages are selected on a first-in, first-out basis. A selector 310 selects the message to be transmitted in accordance with the signal SX from the priority circuit 307. An output buffer 312 retains temporarily the selected message. The output ports 303, 304 and 305 have the same structure. The message received from a PE is either a one-to-one communication message (BC=BR=0) or a broadcast request message (BC=0, BR=1). The address decoder 400 decodes the destination PE address held in the received message in order to determine the PE to which the message is destined. The other address decoders 401 and 402 perform the same process.

If each EX receives a broadcast message from the XB-X, the OR gate 410 sets the signal XY to 1 for transmission of the broadcast message to the XB-Y. If each EX receives a broadcast message from the XB-Y, the OR gate 411 sets the signal YP to 1 for transmission of the broadcast message to the PE. In each EX, as in the broadcast exchanger (BEX) 120, the priority circuits 307, 308 and 309 are arranged to transmit messages through worm-hole routing.

Figure 5:
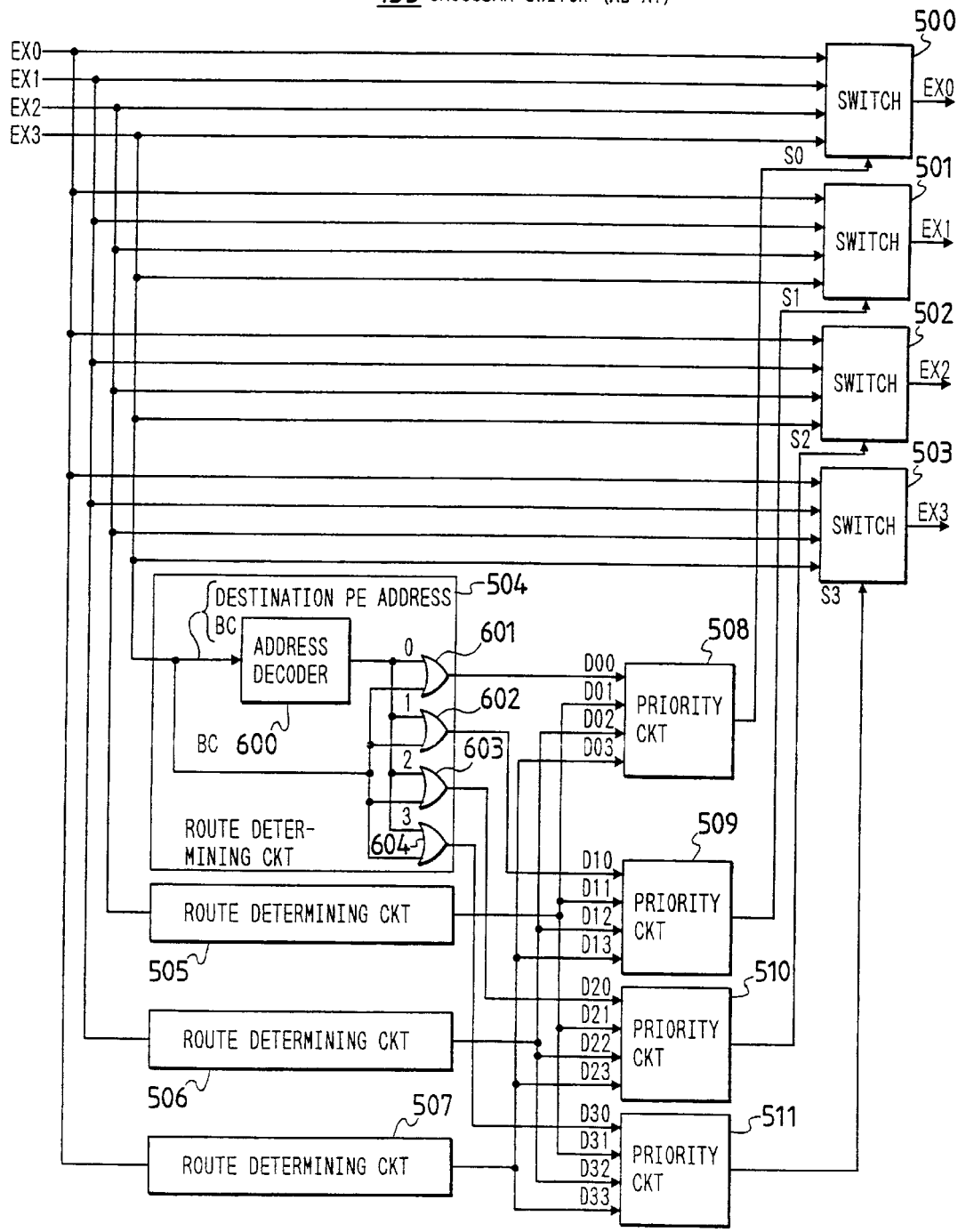
FIG. 5 is a schematic circuit diagram of a crossbar switch (XB) used by the circuit of FIG. 1.

FIG. 5 is a schematic circuit diagram showing the structure of the X-coordinate crossbar switch XB-X1. This XB structure is the same as that of the other XB-Xi (i=2 or 3) or of the Y-coordinate crossbar switches XB-Yj (j=0, 1 or 2). The XB structure is basically the same as that of the XBs described in Japanese Pat. Laid-Open No. Hei 5-28122 or U.S. patent application Ser. No. 07/916,663 now U.S. Pat. No. 5,192,580 corresponding thereto. Upon receipt of a one-to-one communication message or a broadcast message, each of these crossbar switches XBs transmits the message to one output port determined by the destination address designated by that message. For an XB-X, the X coordinate of the destination address is used; for an XB-Y, the Y coordinate of the destination address is utilized. If a broadcast message is input to any one of the input ports of these XBs, the message is transmitted to all EXs connected to the XB in question. With the first embodiment, broadcast messages are transmitted not by the XB-X1 through the XB-X3 but by the XB-Y0 through the XB-Y2.

The crossbar switch structure will now be described briefly. In FIG. 5, I/O signals EX0 through EX3 come from the EX10 through EX13 connected to the crossbar switch in question. The input signals EX0 through EX3 are replaced by signals EX10 through EX13 in the case of the XB-X1 or by signals EX00 through EX30 in the case of the XB-Y0. Broadcast message transmission, to be described below, is actually not utilized by the XB-X1, etc. but by the XB-Y. However, for reasons of expediency, the XB-X1 is used hereunder as an example for illustration.

Reference numerals 500 through 503 represent switches for selecting one of four input ports. Because what is shown here is a crossbar switch XB, the input signals EX0 through EX3 are each connected directly to the inputs of the switches 500 through 503. Thus a message received via any one of the input ports is fed to the switches 500 through 503. Route determining circuits 504 through 507 determine which of the switches the received message is to be sent to. Signals D00, D01, D02 and D03 specify that the input message is to be output to the EX0; these signals are generated from the messages that were input respectively from the EX0, EX1, EX2 and EX3. Signals D10, D11, D12 and D13 designate message output to the EX1; signals D20, D21, D22 and D23 dictate message output to the EX2; and signals D30, D31, D32 and D33 specify message output to the EX3. These messages are generated respectively from the messages received from the EX0, EX1, EX2 and EX3, and are input to priority circuits 508 through 511. The priority circuits 508 through 511 determine the sequence in which the four received messages are to be transmitted. In this example, the messages are selected for transmission on a first-in, first-out basis.

The route determining circuit 504 comprises an address decoder 600 and OR gates 601 through 604. The other route determining circuits 505 through 507 have the same constitution. When the message input to the XB is a one-to-one communication message or a broadcast request message, the address decoder 600 decodes the destination PE address in that message to determine its destination. Via the OR gates 601 through 604, the address decoder 600 outputs 1 to one of the signals D00 through 30. On the other hand, if the message received from the EX0 is a broadcast message, the outputs of the OR gates 601 through 604 are all set to 1 in order to output 1 to all output signals D00 through D30. This allows the same message to be broadcast to the extended EX0 through EX3 that are connected to the XB-X.

Figure 6:
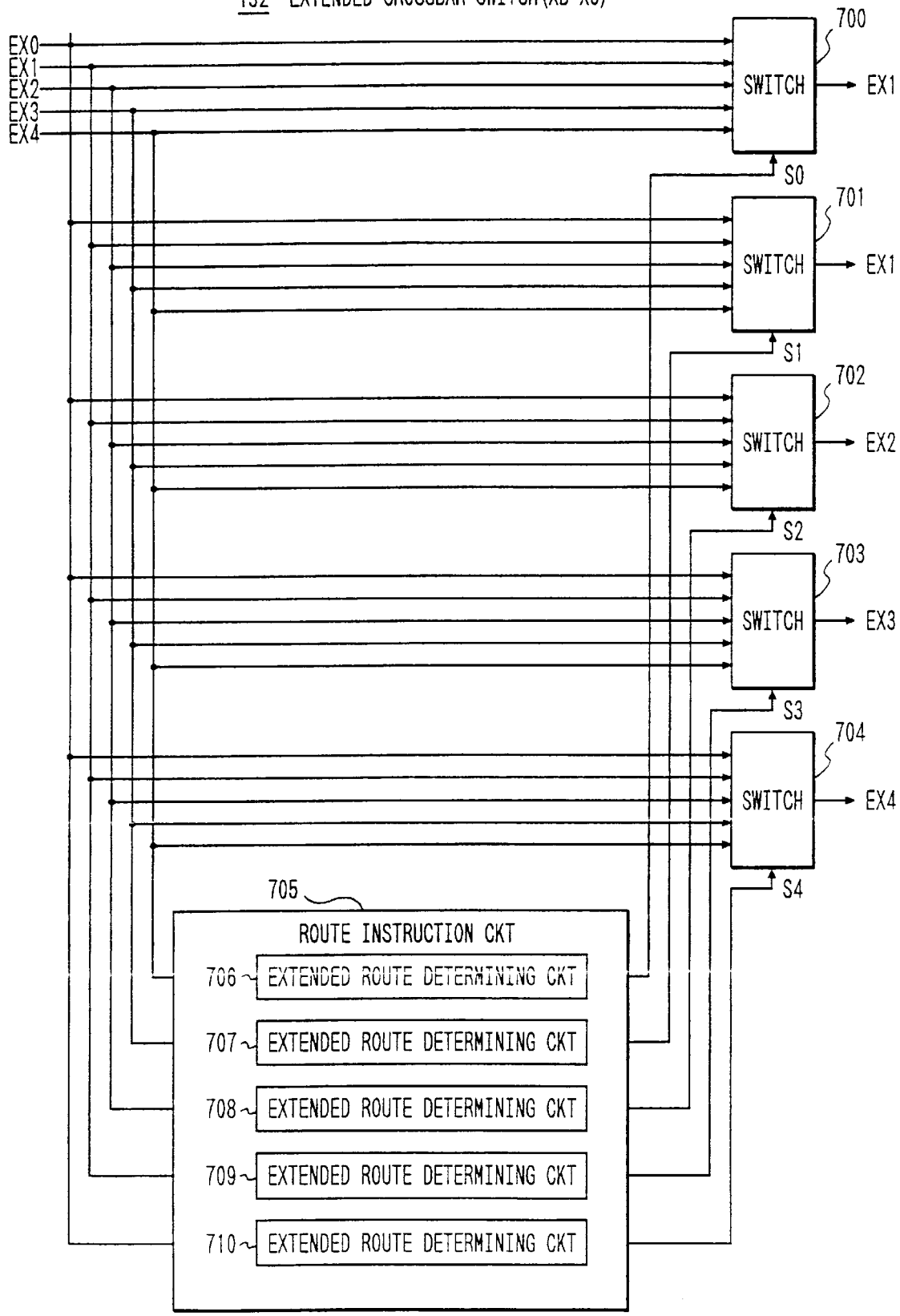
FIG. 6 is a schematic circuit diagram of an extended crossbar switch used by the circuit of FIG. 1.
Figure 7:
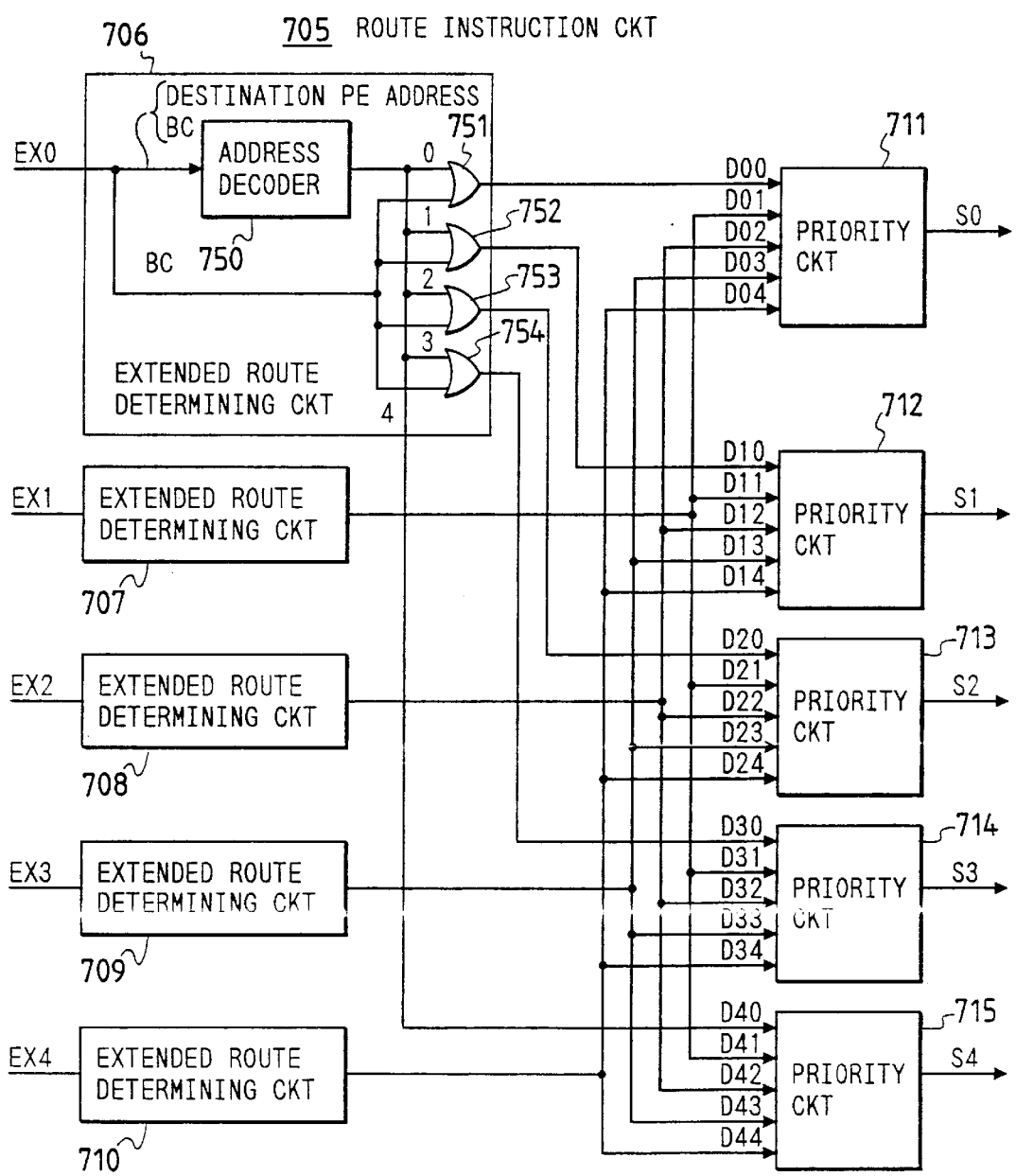
FIG. 7 is a schematic circuit diagram of a route instruction circuit used by the extended crossbar switch of FIG. 7.

FIG. 6 is a schematic circuit diagram showing the structure of the extended crossbar switch XB-X0. In FIG. 6, I/O signals EX0 through EX3 come from the EX00 through EX03 connected to the crossbar switch in question. A signal EX4 comes from the broadcast exchanger (BEX) 120. The same applies to the extended XB-Y3, except that no input signal from the broadcast exchanger (BEX) 120 is used by the first embodiment. One difference between the extended XB-X0 and the non-extended XB-X1 is that the extended XB-X0 has an additional I/O port. Another difference between the two crossbar switches is the way in which extended route determining circuits 706 through 710 of the extended XB-X0 operate in transmitting broadcast messages. Specifically, as shown in FIG. 7, if the signal from the input port EX is a broadcast message, the extended route determining circuit 706 does not transfer that message to the output port EX4 connected to the broadcast exchanger (BEX) 120. With the first embodiment, the broadcast message is sent from the broadcast exchanger (BEX) 120 only to the input port EX4. This broadcast range limiting facility of the first embodiment is used only by the extended routine determining circuit 710. That is, the broadcast message fed from the broadcast exchanger (BEX) 120 to the XB-X0 is not returned to the same exchanger but sent only to the EX00 through EX03 connected to the XB-X0. If the broadcast message were allowed to be further transmitted to the broadcast exchanger (BEX) 120, the route for transmitting the broadcast request message up to the exchanger 120 would overlap with the route for transmitting the broadcast message starting from the exchanger 120, resulting in a deadlock. The other operations of the extended route determining circuits 706, etc. are the same as those of the non-extended XB-X1, etc. and will not be described further.

As described earlier in reference to FIG. 10, the above circuits allow the sources 1 and 2 to transmit broadcast request messages to the broadcast exchanger (BEX) 120 which in turn transmits broadcast messages to all PEs. Furthermore, the first embodiment has a plurality of sources issue broadcast request messages simultaneously and still allows the broadcast messages corresponding to these request messages to be transmitted serially. Thus message broadcast is implemented without a deadlock.

<First Variation of the First Embodiment>

Differently from what the first embodiment does, it may be arranged that the broadcast message received from the extended XB-X0 is transmitted simultaneously to the XB-Y3 and to the PEs and that the broadcast message received from the XB-Y3 is kept from returning to the EX00 through EX03. In such cases, the BEX address in use may be address 43 having the PE00 through PE03 included in a broadcast request message and still no deadlock occurs. Therefore the same BEX address may be stored for the different PEs. To implement this feature, however, requires modifying the EX00 through EX03 so that they will operate differently from the other EXs. With the first embodiment, all EXs may use the same circuit. The end of the message broadcast operation is recognized by detecting the transmission of the broadcast message completed by all EXs, including the EX00 through EX03, to the PEs. This arrangement simplifies structurally the hardware for broadcast end detection.

<Second Variation of the First Embodiment>

The network of the first embodiment comprises a plurality of partial networks each composed of a crossbar switch. Alternatively, these crossbar switches may be replaced by, say, a plurality of partial networks each comprising a multistage switch. The same applies to the other embodiments to be explained later.

<Third Variation of the First Embodiment>

With the first embodiment, each PE outputs a broadcast request message comprising the address of the broadcast exchanger BEX, the data to be transmitted, and a message mode bit BR identifying the message. The output broadcast request message reaches the EX connected to the PE in question. Thereafter, the EX and a plurality of XBs transmit the message to the broadcast exchanger BEX on the basis of the address held in that message, whereby the corresponding broadcast message is generated. Alternatively, it is possible to arrange the PEs, EXs and XBs so that a PE may transmit to the EX a broadcast request message not designating such a broadcast exchanger address, whereupon the EX changes this broadcast request messages into the corresponding broadcast message. This broadcast message is transmitted to the broadcast exchanger by the EX and by the multiple XBs. This scheme is similar to the method of the fifth embodiment, to be discussed later, and is implemented by use of a circuit similar to that of the fifth embodiment.

<Fourth Variation of the First Embodiment>

Another variation of the first embodiment is one which utilizes a three-dimensional hyper-crossbar network. The PEs and EXs are represented by three-dimensional coordinates PEijk and EXijk, respectively. Illustratively, an XB-Xij represents the X-coordinate XB connected with the EXij0, EXij1, EXij2 and EXij3. Likewise, an XB-Yik denotes the Y-coordinate XB connected with the EXi0k, EXi1k, EXi2k and EXi3k; and an XB-Zjk stands for the Z-coordinate XB connected with the EX0jk, EX1jk, EX2jk and EX3jk.

In a three-dimensional setup, the extended XB-X0 and XB-Y3 are supplemented by an extended XB composed illustratively of a Z-coordinate XB, e.g., XB-Z0 with its output ports connected to the broadcast exchanger (BEX), the added XB transmitting broadcast request messages to this broadcast exchanger (BEX). Whereas each EX in the two-dimensional setup comprises three inputs and three outputs for the PE, X-coordinate XB and Y-coordinate XB, each EX in the three-dimensional network further includes input and output ports for the Z-coordinate XB. Dimension order routing is allocated to range from an X-coordinate XB through a Y-coordinate XB to a Z-coordinate XB, in that order.

The broadcast exchanger (BEX) permits receipt of a broadcast request message from the extended XB-Z0. As with the first embodiment, the corresponding broadcast message is supplied to the extended XB-X0.

In the three-dimensional setup, the message broadcast operation initially involves assigning three addresses to the broadcast exchanger (BEX). One of the three addresses is used for each of the following three PE groups:

group (1) PE00k (k=0, 1, 2 or 3)
  address used: 004
group (2) PE0jk (j=1, 2 or 3; k=0, 1, 2 or 3)
  address used: 043
group (3) PEijk (i=1, 2 or 3; j=0, 1, 2 or 3; k=0, 1, 2 or 3)
  address used: 403 The PEs of group (1) may transmit broadcast request messages to the broadcast exchanger (BEX) using the extended XB-X00 alone; the PEs of group (2) may transmit broadcast request messages to the broadcast exchanger (BEX) using the XB-X0j and the extended XB-Y03; the PEs of group (3) may transmit broadcast request messages to the broadcast exchanger (BEX) using the XB-Xij, XB-Yik and the extended XB-Z03. In this manner, the routes for broadcast request messages from all PEs to the broadcast exchanger (BEX) are determined. The routes for a broadcast message from the broadcast exchanger (BEX) to all PEs are allocated through two-dimensional extension. Specifically, the extended XB-X00 first transmits the broadcast message to the EX000 through EX003. From there, the broadcast message is transmitted via the XB-Y00 through XB-Y03 to those EXs among the EX000 through EX033 which have a Z coordinate of 0. Finally, the broadcast message is sent to all EXs by use of all Z-coordinate XBs. From there, the broadcast message is forwarded to each PE. Because no contention occurs between this routing for broadcast message transmission and the above-described routing for broadcast request message transmission to the broadcast exchanger (BEX), no deadlock takes place even as a plurality of sources output broadcast request messages simultaneously. In short, deadlocks are avoided by transmitting a plurality of broadcast messages serially. This is achieved by allocating only one transmission route for a broadcast message within the network and thus eliminating contention between this broadcast routing and the routing for transmitting broadcast request messages to the top of the broadcast route (i.e., BEX).

The same holds true for the network of n dimensions. Specifically, N processor elements constituting the parallel processor system are broken up into factors n1×n2× . . . nm, each factor representing a processor element disposed at one of the lattice points constituting the n-dimensional lattice space. The network is constituted by having the sides of the lattice space, corresponding to the processor elements, connected by crossbar switches through the use of exchange switches each comprising an (m+1)-input (m+1)-output crossbar switch. Each coordinate system is assigned a single extended XB. The extended ports are connected to the broadcast exchanger (BEX) and the PEs are divided into n groups. Upon initialization, the host processor or service processor SVP sets in each PE the address of the broadcast exchanger (BEX) so that each PE may transmit its message to the BEX.

<Second Embodiment>

Figure 11:
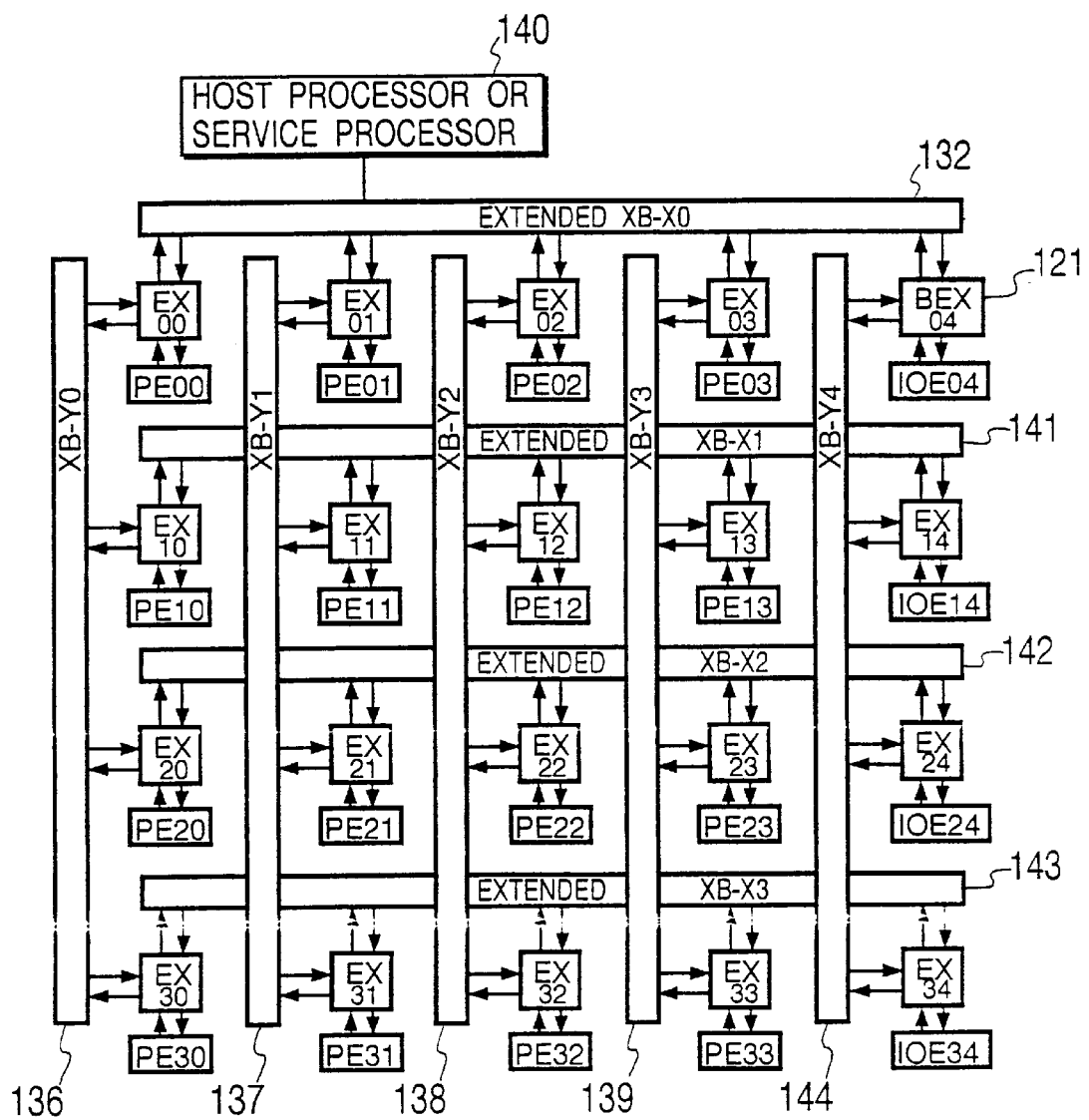
FIG. 11 is a schematic circuit diagram of a parallel processor system practiced as a second embodiment of the invention.

FIG. 11 is a schematic circuit diagram showing the system configuration of a parallel processor system practiced as the second embodiment of the invention. With the second embodiment, a broadcast exchanger (BEX) 121 is connected to the XB-Y4 which in turn is connected to a plurality of I/O processors primarily performing system I/O processing (these I/O processors are thus abbreviated to IOEs). The IOEs and the broadcast exchanger (BEX) 121 are further connected to X-coordinate XBs.

In the setup above, the processors for performing arithmetic operations are distinguished from the IOEs for carrying out I/O processing. Because the PEs are spared the chores of I/O processing, they do not suffer from deterioration in their performance of arithmetic operations. Thus the parallel processor system of which these PEs are the components has its performance improved. Such parallel processor systems are disclosed illustratively in Japanese Pat. Laid-Open No. Hei 5-081216 and U.S. Pat. No. 5,377,333 corresponding thereto. The techniques disclosed in these publications are incorporated herein for reference. Where data necessary for arithmetic operations is broadcast between the PEs constituting such a parallel processor system, attempts to feed the data to the IOEs not assigned to arithmetic operations will cause them to receive the unnecessary broadcast message and to perform extra operations thereon. This can lower the speed of I/O processing and degrade the performance of the parallel processor system as a whole. Therefore, in the parallel processor system such as that in FIG. 11 where the PEs are combined with the IOEs, it is preferred to transmit the broadcast message only to the PEs and not to the IOEs. The second embodiment is arranged so that the broadcast message is transmitted from the broadcast exchanger (BEX) 121 to the PEs only and not to the IOEs. Taking advantage of this feature, the second embodiment keeps the routing for broadcast request message transmission from overlapping with the routing for broadcast message transmission, even with the broadcast exchanger (BEX) connected to the IOE04.

FIG. 11 is referenced for the description that follows. Unlike the PEs, the IOE04 through IOE34 incorporate I/O units, not shown, and have them perform I/O processing. Also unlike the PEs, the IOE04 through IOE34 include no BEX address generation circuit. In other respects, however, the IOEs have basically the same structure as the PEs. The X-coordinate XBs are each connected to either the broadcast exchanger (BEX) 121 or to an IOE in addition to the PE. These XBs have the same structure as the extended XB of the first embodiment. The extended XB-X1 through XB-X3 are connected to the broadcast exchanger (BEX) 121 and to the EX14 through EX34, which are in turn connected to an IOE each. Unlike the first embodiment, the broadcast exchanger (BEX) 121 is coupled with the IOE 04. The IOE04 through IOE34 are assigned addresses 04 through 34, respectively. The broadcast exchanger (BEX) 121, EX14, EX24 and EX34 connected to these IOEs are assigned the addresses of the broadcast exchanger (BEX) 121 or of the IOEs connected thereto. This means that the address of the broadcast exchanger (BEX) 121 is 04 only. This address is included in the broadcast request message that may be issued by any one of the PEs. This address is also included in the one-to-one communication message sent from any one PE to the IOE04. These messages are transmitted to the broadcast exchanger (BEX) 121 in the same manner as with the first embodiment. The extended XB-Y3 used in the first embodiment is not used in the second embodiment.

Figure 12:
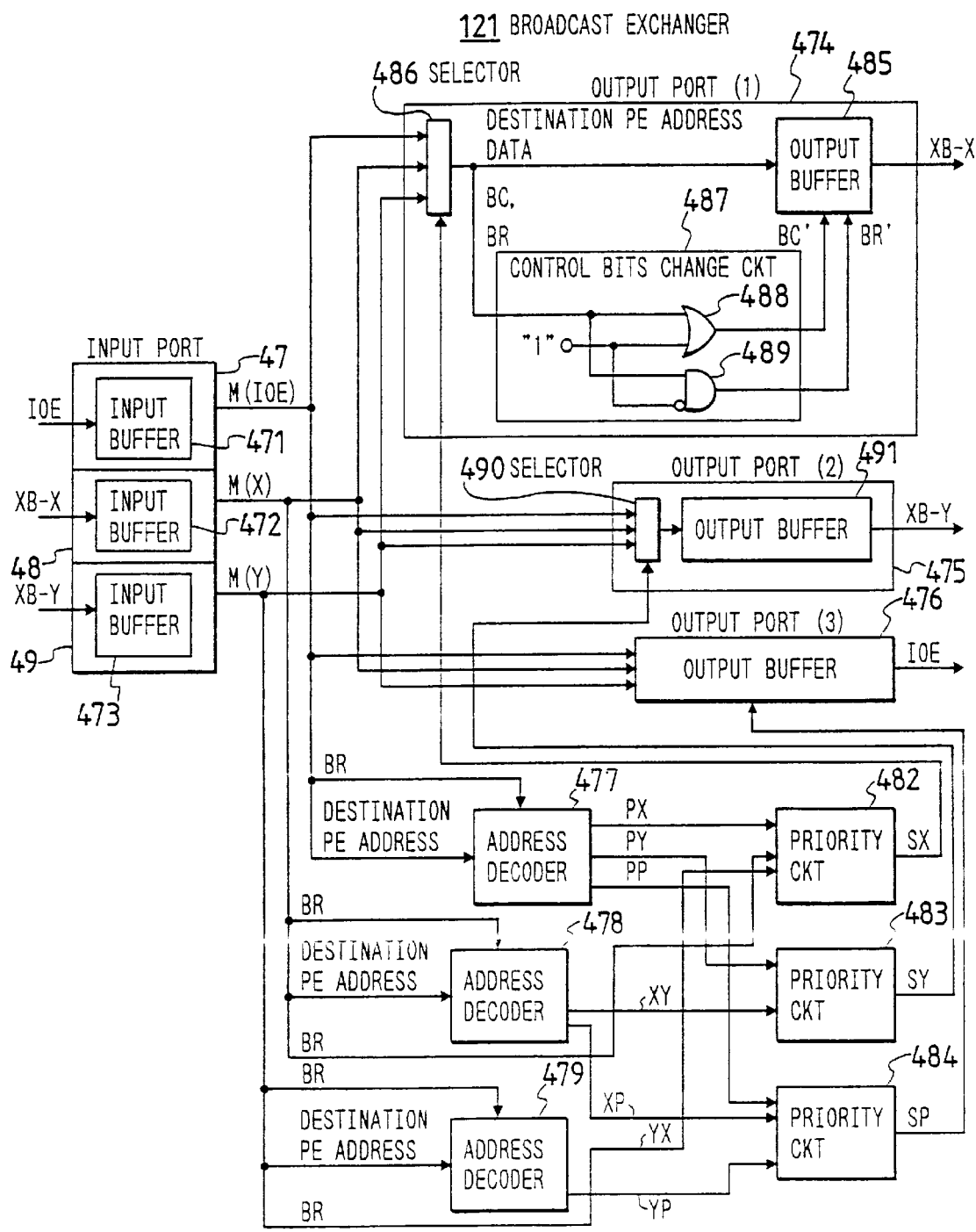
FIG. 12 is a schematic circuit diagram of a broadcast exchanger (BEX) used by the circuit of FIG. 11.

FIG. 12 is a schematic circuit diagram showing the structure of the broadcast exchanger (BEX) 121 used by the second embodiment. The broadcast exchanger (BEX) 121 have the facilities of both the broadcast exchanger (BEX) 120 (FIG. 4) and the EX (FIG. 3) used in the first embodiment. Three input ports 47, 48 and 49 of the broadcast exchanger (BEX) 121 are connected to the IOE, XB-X and XB-Y, respectively. The messages received through these input ports are retained temporarily in input buffers 471 through 473. Output buffers 474 through 476 have output ports through which to output messages to the XB-X, XB-Y and IOE, respectively. The output buffers 475 and 476 are the same in structure while the output buffer 474 is different in that it comprises a CTL bit change circuit 487. The CTL bit change circuit 487 is identical in structure to that of the first embodiment; it is used to change a broadcast request message into a broadcast message.

If the XB-X0 supplies a broadcast request message designating the address of the broadcast exchanger (BEX) 121, then a signal BR is set to 1. The output port 474 causes this message to be selected as a broadcast message to be transmitted to the XB-X0. If the XB-Y4 supplies a broadcast request message designating the address of the broadcast exchanger (BEX) 121, then a signal YX is set to 1. This time, too, the output port 474 causes the message to be selected as a broadcast message to be transmitted to the XB-X0. With the second embodiment, it is assumed that the IOE04 issues no broadcast request message. In this manner, the broadcast request message is always converted to the corresponding broadcast message and transmitted to the XB-X (XB-X0 in the above example). A priority circuit 482 causes the output port 474 to act the same way as the BEX of the first embodiment. Thus the broadcast exchanger (BEX) 121 serializes a plurality of broadcast request messages to be selected. Each selected broadcast request message is converted to the corresponding broadcast message and transmitted by the XB-X0 to all PEs.

Figure 13:
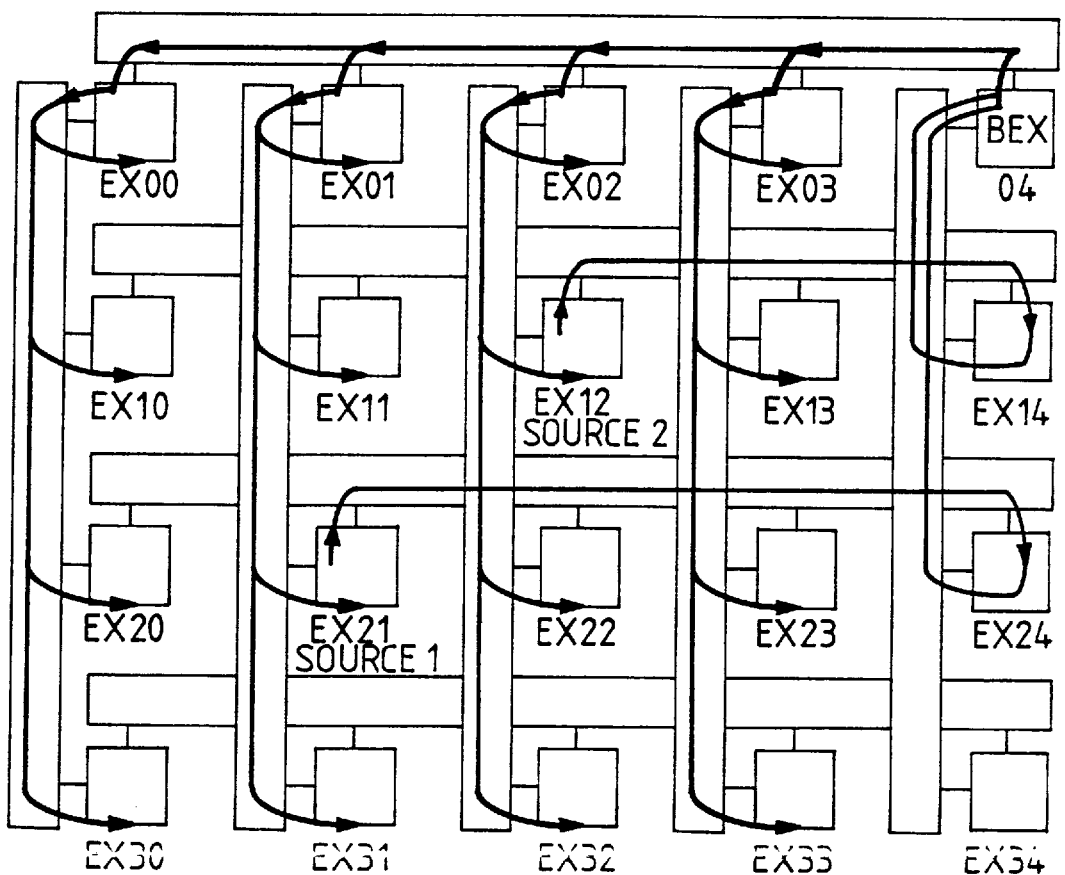
FIG. 13 is a view showing typical routes for transmitting a plurality of broadcast messages by use of the circuit in FIG. 11.

How the second embodiment performs its message broadcast operation will now be described with reference to FIG. 13. In FIG. 13, sources 1 and 2 output in a substantially simultaneous manner broadcast request messages with their destination PE address set for 04. As with the first embodiment, these messages are transmitted parallelly to the XB-Y4, one from the EX21 through the extended XB-X2, the other from the EX12 through the extended XB-X1. The messages advance simultaneously because these two routes do not overlap with each other. On receiving the messages having the same destination PE address 04 each, the XB-Y4 gives priority illustratively to the message from the source 1. In that case, the priority-accorded message is moved from the XB-Y4 into the input buffer 473 of the input port XB-Y of the broadcast exchanger (BEX) 121 for temporary storage therein. A signal YX is set to 1 for this broadcast request message. The priority circuit 482 selects this message by issuing a signal SX causing a selector 486 of the output port 474 to select M(Y). As with the first embodiment, the CTL bit change circuit 487 converts this broadcast request message into the corresponding broadcast message to be transmitted to the XB-X. Thereafter, as with the first embodiment, the extended XB-X0 broadcasts the message to ports 0 through 3. The XB-Y0 through XB-Y3 then transmit the broadcast message to the PE00 through PE33. As explained in connection with the extended XB-X, the broadcast message is not transmitted to the IOE connected to the extended port (i.e., port 4). When the input buffer 473 of the XB-Y port of the broadcast exchanger (BEX) 121 becomes empty, the broadcast request message which came from the source 2 and which was made to wait in the priority circuit of the XB-Y4 is transmitted to the broadcast exchanger (BEX) 121 as well as to the PE00 through PE33. If any one of the PEs (e.g., PE01) connected to the XB-X0 outputs a broadcast request message, not shown in FIG. 13, this message is transmitted via the XB-X0 to the broadcast exchanger (BEX) 121. The message is then changed into a broadcast message and again sent to the XB-X0. Thus with the second embodiment, as with the first embodiment, no contention occurs between the routing for broadcast request message transmission from its sources to the broadcast exchanger (BEX) 121 and the routing for broadcast message transmission from the broadcast exchanger (BEX) 121 to the PEs, whereby the deadlock is avoided.

One-to-one communication messages are handled by address decoders 477 through 479 according to the address designated by each message, the manner of the handling being the same as that by the EXs of the first embodiment. Specifically, where messages M(IOE), M(X) and M(Y) input to the input buffers 471 through 473 are a one-to-one communication message each, the address decoders 477 through 479 decode the destination PE address in each message to determine its destination. Each address decoder operates when the BR bit in the message is found to be 0. With the BR bit set to 0, the address decoders operate the same way as the EXs of the first embodiment where the message is a one-to-one communication message (BC=0). For example, if the XB-X0 supplies a one-to-one communication message that designates the address coinciding with that of the broadcast exchanger (BEX) 121, the message is transmitted to the XB-Y4. If the XB-Y4 supplies a one-to-one communication message that designates the address coinciding with that of the broadcast exchanger (BEX) 121, the message is transmitted to the IOE04.

<First Variation of the Second Embodiment>

With the first embodiment, the BEX takes the place of the exchange switches connected to the IOEs that receive no broadcast message. Furnished where it is, the BEX prevents the routing for broadcast request message transmission from overlapping with the routing for broadcast message transmission. Alternatively, it is also possible to use one of the EXs connected with the PEs, in place of the broadcast exchanger (BEX). For example, in the second embodiment, the exchange switch EX00 may replace the broadcast exchanger (BEX). In this case, the BEX used in the second embodiment is modified as follows:

When a broadcast request message is input from the XB-X0, the BEX transmits to the XB-X0 the broadcast message corresponding to that request message; the broadcast message is also sent both to the XB-Y0 connected to the BEX and to the PE connected to the same BEX (PE00 in this example). The broadcast message output to the XB-X0 is transmitted via the XB-X1 through XB-X3 to the PEs connected to the XB-Y1 through XB-Y3, as with the first and the second embodiment. The XB-Y0 connected with the BEX is arranged so that the broadcast message will not be retransmitted from the XB-Y0 to the BEX. Thus the broadcast message is sent to the PE00 directly from the BEX. In the manner described, the routing for broadcast request message transmission is kept from overlapping with the routing for broadcast message transmission.

<Second Variation of the Second Embodiment>

A second variation of the second embodiment is one which utilizes a three-dimensional hyper-crossbar network. The PEs and EXs are represented by three-dimensional coordinates PEijk and EXijk, respectively. Illustratively, an XB-Xij represents the X-coordinate XB connected with the EXij0, EXij1, EXij2 and EXij3. Likewise, an XB-Yik denotes the Y-coordinate XB connected with the EXi0k, EXi1k, EXi2k and EXi3k; and an XB-Zjk stands for the Z-coordinate XB connected with the EX0jk, EX1jk, EX2jk and EX3jk. In the three-dimensional setup, all X-coordinate XBs are extended XBs. Thus the PEs corresponding to the EXs connected with the extended ports are all IOEs that receive no broadcast message. In other words, addresses ij4 (i=0, 1, 2, 3; j=0, 1, 2, 3) all stand for the IOEs. Whereas each EX in the two-dimensional setup comprises three inputs and three outputs for the PE, X-coordinate XB and Y-coordinate XB, each EX in the three-dimensional network further includes input and output ports for the Z-coordinate XB. Dimension order routing is allocated to range from an X-coordinate XB through a Y-coordinate XB to a Z-coordinate XB, in that order.

Whereas the BEX in the two-dimensional setup has three inputs and three outputs for the PE, X-coordinate XB and Y-coordinate XB, the BEX in the three-dimensional setup further includes input and output ports for the Z-coordinate XB. Of the messages transmitted to the BEX, the broadcast request message is transmitted from the Z-coordinate XB to the X-coordinate XB.

How the message broadcast operation takes place in the three-dimensional setup will now be described. Upon initialization, the host processor or service processor SVP sets in each PE that address of the broadcast exchanger (BEX) which is set for 004. A broadcast request message coming from any one PEijk is transmitted by the extended XB-Xij to the X=4 plane to which the IOEs are connected. From there, the broadcast request message is transmitted to the BEX by way of the XB-Yi4, XB-Zj4, etc.

The routes for transmitting broadcast request messages from all PEs to the BEX are determined as described. The routes for a broadcast message from the broadcast exchanger (BEX) to all PEs are also allocated through two-dimensional extension. Specifically, the extended XB-X00 first transmits the broadcast message to the EX000 through EX003. From there, the broadcast message is transmitted via the XB-Y00 through XB-Y03 to those EXs among the EX000 through EX033 which have a Z coordinate of 0. Finally, the broadcast message is sent to all EXs by use of all Z-coordinate XBs. From there, the broadcast message is forwarded to each PE. This broadcast message is prevented by the appropriate facility of the extended XBs from reaching any of the IOEs that are connected to the extended ports. Because no contention occurs between this routing for broadcast message transmission and the above-described routing for broadcast request message transmission to the broadcast exchanger (BEX), no deadlock takes place even as a plurality of sources output broadcast request messages simultaneously.

Generally in the n-dimensional setup, all X-coordinate XBs may be composed of extended XBs, and the PEs corresponding to the EXs connected to the extended ports involved may all be used as IOEs. This scheme also suppresses the deadlock.

<Third Embodiment>

The third embodiment is a variation of the first embodiment whereby partial broadcast is accomplished. What makes the third embodiment different from the first embodiment lies in the modified PE structure and message formats for implementing the partial broadcast operation.

Figure 15:
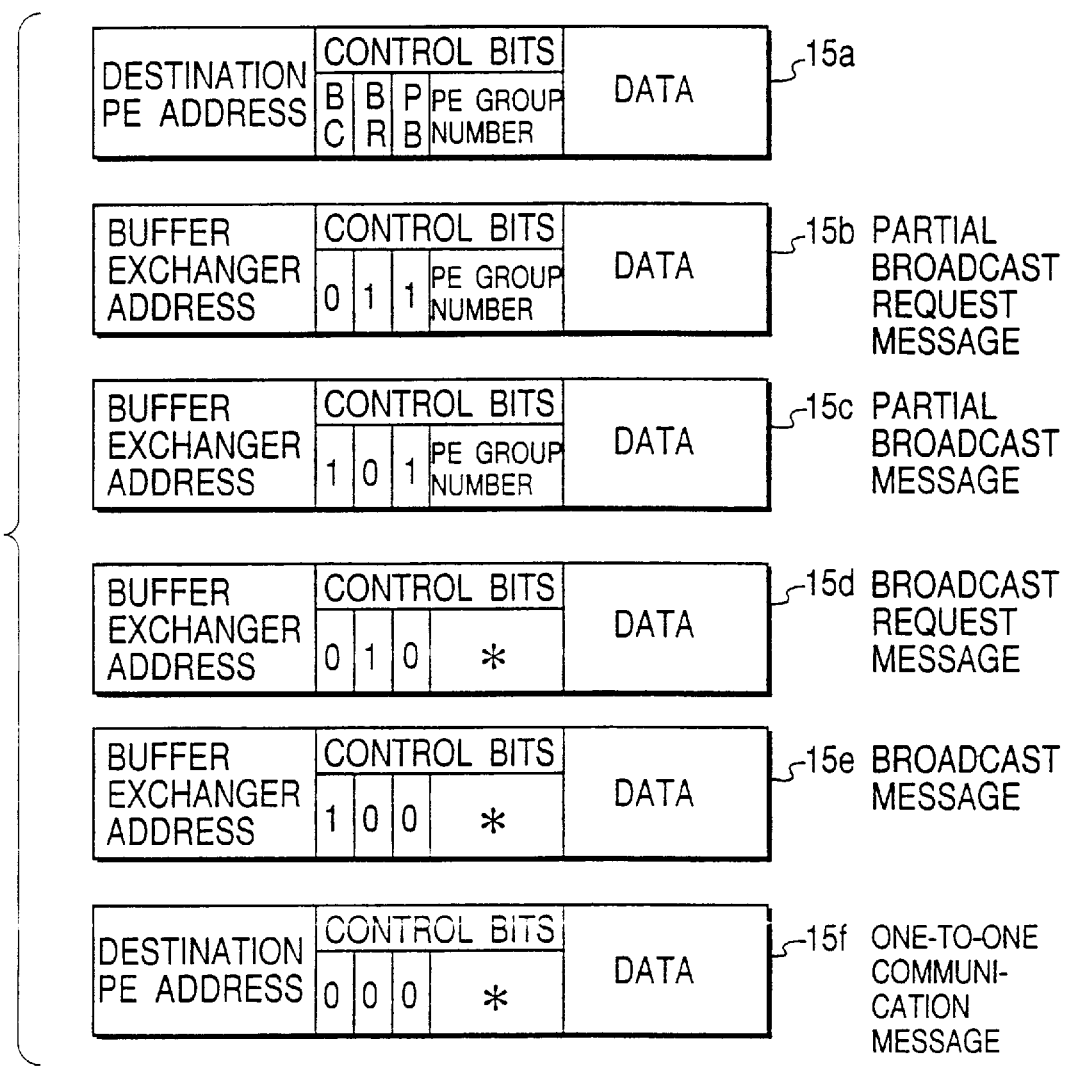
FIG. 15 is a view depicting message formats used by the third embodiment.

FIG. 15 is a view depicting message formats used by the third embodiment. Each message, as shown in a format 15a, has a PB bit and a PE group number added to the format. The PB bit indicates that the message is to be broadcast partially. The PE group number is an identifier that identifies the PE group to which the message is to be transmitted. The newly added two fields are used only by the PEs and ignored by the EXs, XBs and BEX. If the message is a partial broadcast request message, the BC, BR and PB bits therein are set to 0, 1 and 1, respectively, as indicated in a format 15b. In this case, an effective group identifier is set in the PE group number field, and the BEX address is set in the destination PE address field. If the message is a partial broadcast message, the BC, BR and PB bits therein are changed to 1, 0 and 1, respectively, as indicated in a format 15c. If the message is a broadcast request message, a broadcast message or a one-to-one communication message, the PB bit is set to 0 as indicated in formats 15d, 15e and 15f. These formats are the same as the formats 8b, 8c and 8d in FIG. 8, with nothing set in the PE group number field.

Figure 14:
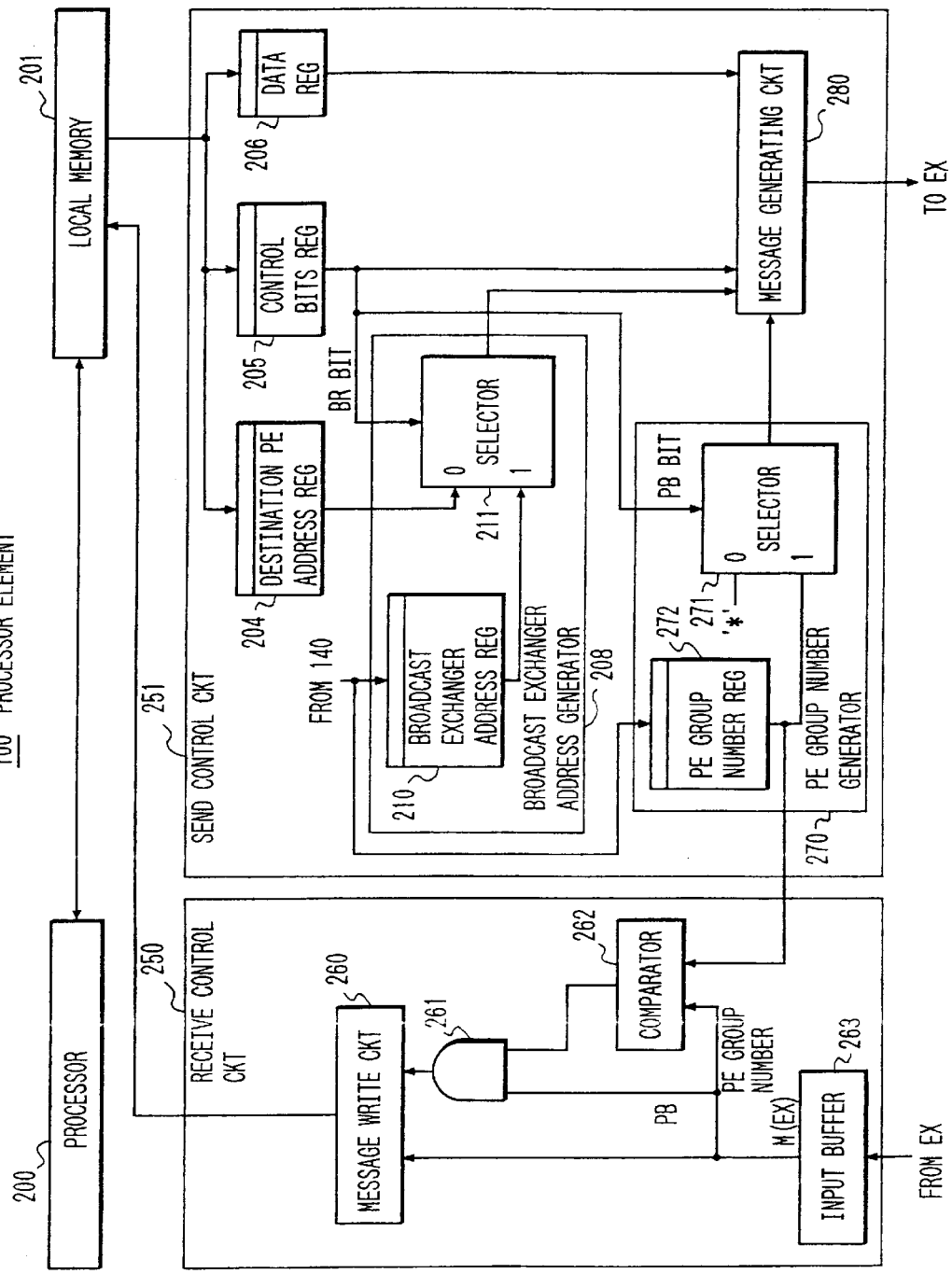
FIG. 14 is a schematic circuit diagram of a processor element (PE) used by a parallel processor system practiced as a third embodiment of the invention.

FIG. 14 is a schematic circuit diagram of a PE used by a parallel processor system practiced as the third embodiment of the invention. What makes this PE different from the PE (FIG. 2) of the first embodiment is that the second control circuit of this PE includes a PE group number generator 270 and that the receive control circuit comprises a comparator 262, an AND gate 261, and a control line connecting the AND gate with a message write circuit 260. The PE group number generator 270 includes a register 272 in which the host processor or SVP 140 sets beforehand the number of the PE group that the PE in question belongs to. When the PE sends a partial broadcast request message, a selector 271 causes the PE group number in the CTL field of the register 272 and the PB bit (set to 1) in the register 205 to be output to a message generating circuit 280, whereby a message is generated.

When a partial broadcast message is received, the comparator 262 compares the PE group number in the message with the content of the register 272. If the comparison results in an agreement (i.e., the message is to be received), the comparator 262 outputs 0 to the AND gate 261. The AND gate 261 forwards 0 to the message write circuit 260. In turn, the message write circuit 260 writes the message to the memory 201. If the comparison results in a disagreement (i.e., the message is not to be received), the comparator 262 outputs 1 to the AND gate 261. The AND gate 261 forwards 1 to the message write circuit 260. Given the signal 1, the message write circuit 260 prevents the message from getting written to the memory 201 and releases an input buffer 263. In this manner, the message not destined to this PE is not received.

The PB bit is set to 0 in one-to-one communication messages and broadcast request messages. With nothing specific set in such cases, the selector 271 outputs "*." Because the PB bit is also set to 0 in one-to-one communication messages and broadcast messages, the AND gate 261 always outputs 0 in such cases, and the message write circuit 260 does not prevent the message from being written to memory. Thus the message is always received.

As described, an appropriate modification of the PE allows partial broadcast to be implemented with no changes in the EX, XB or BEX.

<Fourth Embodiment>

Partial broadcast is also implemented by partially modifying the constitution of the second embodiment. The modification involves changing the constitution of the second embodiment and that of the PE as well as the message format into those of the third embodiment.

<Fifth Embodiment>

With the first embodiment, a plurality of broadcast request messages parallelly output by a plurality of PEs are handled by the broadcast exchanger (BEX) that serially places onto the network the broadcast messages corresponding to the request messages. With the fifth embodiment, the serializing of the output messages to be output is carried out by one of the partial networks constituting the network, i.e., by a particular crossbar switch. Furthermore, if a certain partial network or exchange switch is at fault, the fifth embodiment causes the above specific partial network to control message transmission so that any one-to-one communication message will detour around the faulty portion.

Figure 16:
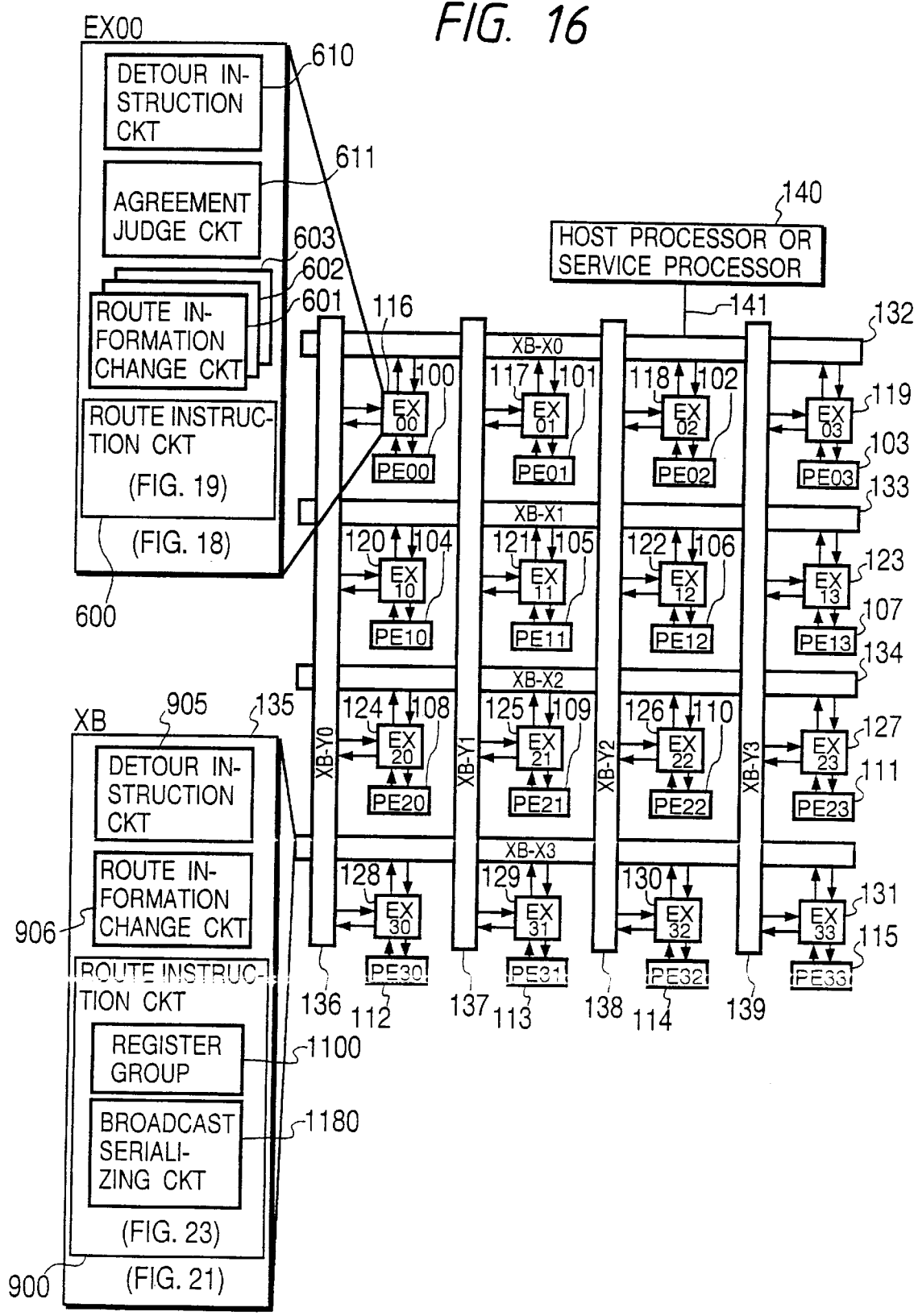
FIG. 16 is a schematic circuit diagram of a parallel processor system practiced as a fifth embodiment of the invention.

In FIG. 16, reference numerals 132 through 135 are X-coordinate crossbar switches (XB-Xs) and 136 through 139 are Y-coordinate crossbar switches (XB-Ys). Reference numerals 116 through 131 denote exchange switches (EXs) located at the points of intersection between the XB-Xs and the XB-Ys. Reference numeral 140 is a host processor or service processor (SVP), and 100 through 115 are processor elements (PEs) constituting the parallel processor system.

These component parts are the same as those of the first embodiment, except that the fifth embodiment relegates the serializing of a plurality of broadcast messages to a specific XB (called the serializing network or serializing crossbar switch); the first embodiment has been shown to use the broadcast exchanger to implement the serializing process. If any crossbar switch or EX becomes faulty, the faulty component is detoured by use of the serializing crossbar switch. For this reason, the structures of each XB and EX in the fifth embodiment differ considerably from those in the first embodiment.

Where the whole network is free of fault, any of the XBs may be used as the serializing network. All XBs of the fifth embodiment are structured identically so that any one of them may serve as the serializing network. If any one XB is faulty, the serializing network should be a normal XB that belongs to the same coordinate axis as that of the faulty XB. For example, if the XB-X2 is faulty, the serializing network should be one of the XB-X0, XB-X1 and XB-X3. If a Y-coordinate XB is faulty, one of the other Y-coordinate crossbar switches should be used as the serializing network. If an EX is faulty, the serializing network should be an XB to which that faulty EX is not connected. With the fifth embodiment, the XB-X3 is assumed to be used as the serializing network where the whole network is normal.

With the fifth embodiment, as with the first embodiment, a PE (e.g., PE01) wishing to broadcast data to a plurality of PEs sends a broadcast request message containing the target data to the EX (e.g., EX01) to which the PE in question is connected. On receiving the broadcast request message, the EX (EX01 in this example) forwards the message to an XB (e.g., XB-Y1) that belongs to a coordinate axis (Y) different from that (X) to which the serializing network (XB-X3) belongs. The XB (XB-Y1) transmits the broadcast request message to the EX (EX31) connected to the serializing network (XB-X3). This EX (EX31) converts the broadcast request message into a broadcast message to be transmitted to the serializing network (XB-X3). The serializing network sends the broadcast message to a plurality of XBs and a plurality of EXs. Upon receipt of the broadcast message, the multiple EXs forward the message to the respectively connected XBs (e.g., XB-Y0 through XB-Y3). Furthermore, these EXs transmit the broadcast message to the PEs connected thereto. The XB-Y0 through XB-Y3 further send the broadcast message to those of the respectively connected EXs which are not connected to the serializing network. In turn, those EXs forward the broadcast message to the PEs connected thereto. This completes the message broadcast operation. As described, when the EXs connected to the serializing network receive a broadcast message therefrom, the EXs forward the message to the PEs connected to these EXs. When the XB-Y0 through XB-Y3 connected to the EXs receive a broadcast message from any EX connected to the serializing network, the message is not sent to those EXs. That is, the routes for transmitting broadcast messages are kept from overlapping with the routes ranging from any of the XB-Y0 through XB-Y3 to the EXs connected to the serializing network. As mentioned earlier, the latter routes are allocated for transmission of broadcast request messages. Where the routes for sending broadcast messages from EXs to PEs are allocated as discussed above, the fifth embodiment prevents the routing for broadcast request message transmission from overlapping with the routing for broadcast message transmission. Deadlocks stemming from overlapping routes are thus avoided.

Furthermore, if any XB or EX becomes faulty, the fifth embodiment utilizes the serializing network to provide a detour for one-to-one communication messages.

The above operations are implemented by each EX utilizing route information change circuits 601 through 603 furnished therein. The circuits 601 through 603 change transmit control information including two kinds of information: information as to whether the message fed to the EX in question is a broadcast message or a broadcast request message, and information as to whether or not the message is to be transmitted to the serializing network. In particular, each EX connected to the serializing network employs the circuits 601 through 603 in converting the received broadcast request message into the corresponding broadcast message or in getting a one-to-one communication message to make a detour. Each EX further comprises an agreement judgment circuit 611, a detour instruction circuit 610 and a route instruction circuit 600. The agreement judgment circuit 611 judges whether or not the XB connected to the EX in question is the serializing network. The detour instruction circuit 610 instructs that the message fed to the EX should make a detour. The route instruction circuit 600 determines the destination of the message supplied to the EX.

Each XB comprises a route instruction circuit 900, a detour instruction circuit 905 and a route information change circuit 906. The route instruction circuit 900 determines the destination of the broadcast message, broadcast request message or one-to-one communication message supplied. The detour instruction circuit 905 instructs how the message should make a detour if any EX connected to the XB is faulty. The route information change circuit 906 changes the transmit control information in the message to have the message make a detour. Each XB further includes a broadcast serializing circuit 1180 if that XB serves as the serializing network. The broadcast serializing circuit 1180 serially outputs a plurality of broadcast messages sent parallelly from a plurality of PEs. The circuit 1180 operates effectively within the serializing network.

As described, the fifth embodiment using the broadcast serializing circuit inside the serializing network transmits broadcast messages as rapidly as the first embodiment. Because the broadcast serializing circuit transmits a plurality of broadcast messages not parallelly but serially, deadlocks stemming from parallel message transmission are avoided. The fifth embodiment is also arranged so that the routing for broadcast request message transmission is kept from overlapping with the routing for broadcast message transmission. This prevents deadlocks resulting from overlapping transmission routes. It should be noted that the fifth embodiment need not use a broadcast exchanger structurally different from the other EXs (e.g., the BEX of the first embodiment) or XBs having different quantities of I/O ports from those of the other XBs (e.g., extended XBs). This means that the fifth embodiment has a simplified circuit construction. The fifth embodiment is also noted for its ability to deal effectively with a faulty XB or EX.

It is a known practice to install within the XB a circuit for serializing a plurality of broadcast messages, as disclosed illustratively in Japanese Pat. Laid-Open No. Hei 1-267763. The disclosed constitution involves using a broadcast serializing circuit for preventing deadlocks in a single XB. By contrast, the fifth embodiment of the present invention utilizes the serializing circuit to prevent a plurality of broadcast messages from being transmitted in parallel over the network use of a single serializing circuit is important, because deadlock will occur, if more than one serializing circuits are employed in a network which uses worm-hole routing as in the current embodiment.

The fifth embodiment will now be described in more detail. Although the fifth embodiment may be arranged to operate normally even where a plurality of crossbar switches or exchange switches are faulty, the description that follows assumes for the sake of simplicity that only one crossbar switch or exchange switch is at fault.

(Message Format)

Figure 17:
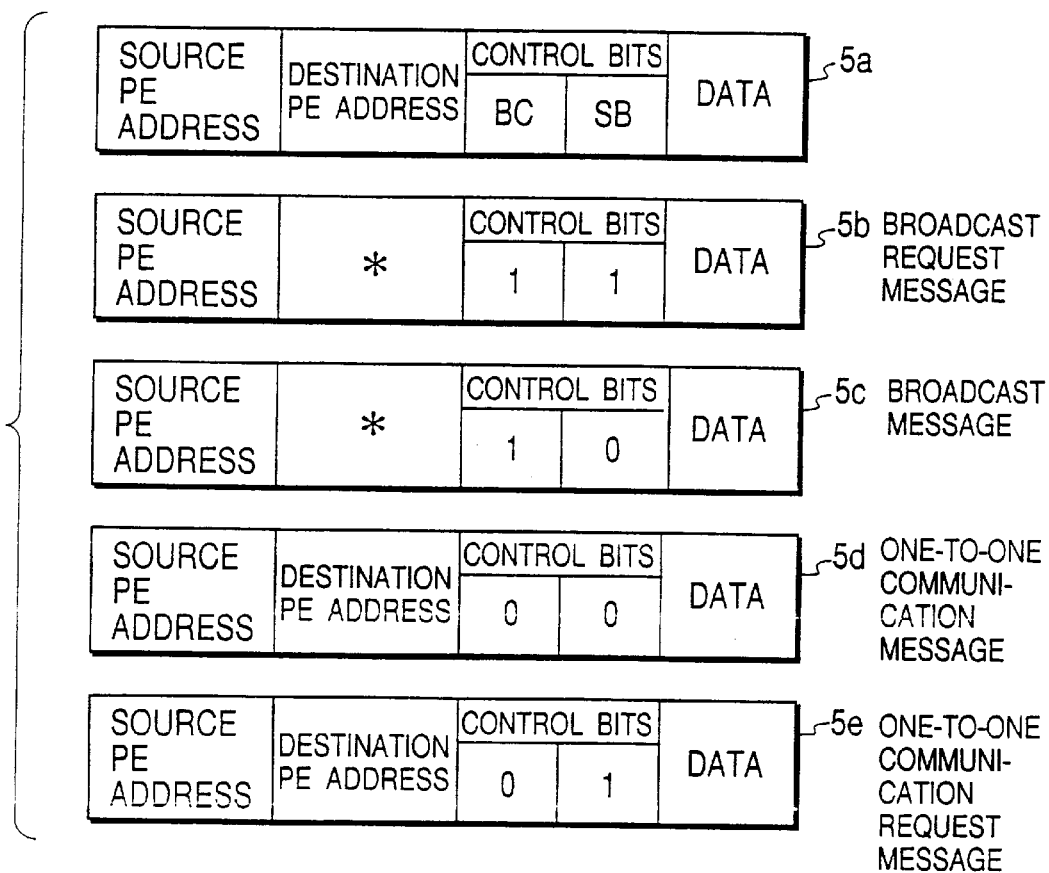
FIG. 17 is a view illustrating message formats used by the circuit of FIG. 16.

Regardless of their types, the messages used by the fifth embodiment are each composed of a source PE address field, a destination PE address field, a control (CTL) bit field and a data field, as indicated in a basic format 5a of FIG. 17. The CTL bits include a BC bit which designates the attribute of the message and which indicates a broadcast message when set, and an SB bit which, when set, shows the message to be one destined to the serializing network. These control (CTL) bits are used as transmit control information by which to determine the routing for transmitting the message in question.

With the fifth embodiment, as with the first embodiment, a PE (e.g., PE01) wishing to broadcast data to a plurality of PEs outputs a broadcast request message containing the target data. The BC and SB bits in this message are both set to 1, as shown in a format 5b of FIG. 17. The destination PE address field of this message is insignificant (as indicated by an asterisk *).

With the fifth embodiment, the EX having received the broadcast request message (e.g., EX01) sends the message to the XB connected to that EX (XB-Y1 in this example). In turn, the XB-Y1 forwards the broadcast request message to the EX (EX31) connected to the serializing network XB-X3. The EX31 sets the SB bit in the received message to 0 to convert the message into a broadcast message. In this broadcast message, the BC and SB bits are set to 1 and 0, respectively, as shown in a format 5c of FIG. 17.

When the network is normal and a PE sends a one-to-one communication message therethrough, the message is transmitted in a format 5d of FIG. 17. In this message format, the source PE address and the destination PE address are regarded as significant, and the BC and SB bits are both set to 0.

If the network is faulty, a one-to-one communication message sent from a PE is changed by the EX into a one-to-one communication request message having a format 5e of FIG. 17. This one-to-one communication request message is sent toward the serializing network. Immediately before reaching the serializing network, the request message is changed back to the original one-to-one communication message. Thereafter, the serializing network sends this one-to-one communication message to the destination PE through a detour.

(Exchange Switches)

How each EX controls messages will now be described with reference to FIG. 18. All EXs have the same hardware constitution.

The EX of the fifth embodiment is similar to that of the first embodiment in that this EX has input buffers 604 through 606, the route instruction circuit 600, and output ports 607 through 609. What makes the EX of the fifth embodiment different is that it further comprises the route information change circuits 601 through 603, detour instruction circuit 610, and agreement judgment circuit 611.

The input buffers 604 through 606 accommodate input messages temporarily. The output port 607 is composed of a selector 617 and an output buffer 620, and sends messages to the XB-X, XB-Y and PE. The selector 617 selects the message to be transmitted in accordance with the signal from the route instruction circuit 600. The output buffer 620 holds the selected message temporarily. The output ports 608 and 609 have the same constitution.

The route instruction circuit 600 determines the destination of the message in each of the input buffers on the basis of the BC and SB bits in the message and of a serializing network address 613S set beforehand in a serializing network address register 613. With the fifth embodiment, the serializing network address 613S is the address of an EX connected to both the serializing network and the same XB to which that EX belongs. For example, address 31 of the EX31 is set to the register 613 in each of the EX01 through EX31 connected to the XB-Y1. This address is set in advance by the host processor or SVP 140 via a line 141.

The agreement judgment circuit 611 judges whether or not this (i.e., home) EX is connected to the serializing network. The agreement judgment circuit 611 includes a serializing network address register 612, a home PE number register 613, and a comparator 614 that compares the content of the register 612 with that of the register 613. The address of the home EX is set in advance in the register 612 by the host processor or SVP. If the contents of the registers 612 and 613 are found to be in agreement, that means the EX is connected to the serializing network.

The route information change circuits 601 through 603 receive from the XB-X, XB-Y and PE a message with its SB bit set to 1, i.e., a broadcast request message or a one-to-one communication message requiring a detour. If an output signal 614S from the comparator 614 of the agreement judgment circuit is found to be 1 upon receipt of the message, the route information change circuit sets the SB bit in the received message to 0. It follows that the route information change circuits 601 through 603 operate only in conjunction with the EXs connected to the serializing network XB-X3.

The detour instruction circuit 610 is constituted by an XB fault information register 615 and an OR gate 616. In the XB fault information register 615, the host processor or SVP sets beforehand XB faulty information indicating whether or not any of the multiple XBs connected to the EX in question is faulty. With the fifth embodiment, the host processor or SVP illustratively sets 00 in the register 615 when the XB-Y and XB-X are both normal; the host processor or SVP sets 01 if the XB-Y is normal and the XB-X is faulty. The OR gate 616 in the detour instruction circuit 610 ORs the two bits in the XB fault information register 615 with the SB bit in the message supplied by this PE. The result of the OR operation is used as the new SB bit of the message. Thus if the content of the register 615 is something other than 00 and if the SB bit is 0 in the message from the PE, that SB bit is changed to 1. The bit change instructs that this message should be transmitted to the serializing network. Since the SB bit is 1 in the broadcast messages supplied from the PE, the detour instruction circuit 610 operates only on one-to-one communication messages coming from the PE.

Figure 19:
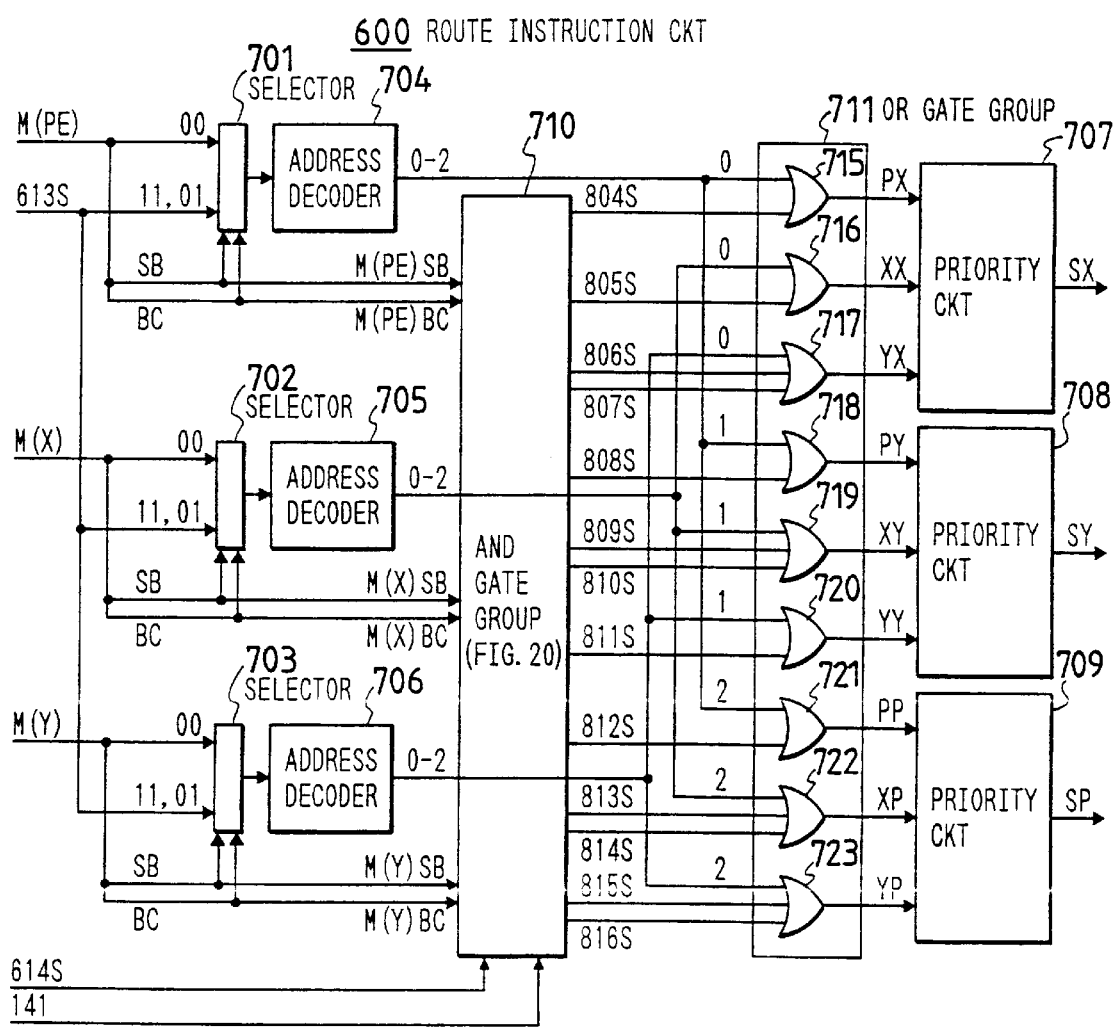
FIG. 19 is a schematic circuit diagram of a route instruction circuit used by the circuit of FIG. 18.

FIG. 19 is a schematic circuit diagram showing the internal structure of the route instruction circuit 600. The route instruction circuit 600 comprises selectors 701 through 703, address decoders 704 through 706, priority circuits 707 through 709, an AND gate group 710, and an OR gate group 711. The route instruction circuit of the fifth embodiment is similar to that of the first embodiment in that the two circuits have the address decoders (704–706), priority circuits (707–709) and OR gate group (711) in common. What makes the route instruction circuit of the fifth embodiment different is that it includes the selectors 701 through 703 and the AND gate group 710.

Signals M(PE), M(X) and M(Y) represent message signals (a destination PE address, a serializing bit SB and a broadcast bit BC) received from the PEs, XB-Xs and XB-Ys connected to the respective EXs. Output signals PX, XX and YX indicate that the messages from the PE, XB-X and XB-Y are sent to the XB-X; output signals PY, XY and YY indicate that the messages from the PE, XB-X and XB-Y are sent to the XB-Y; output signals PP, XP and YP indicate that the messages from the PE, XB-X and XB-Y are sent to the PE.

The selector 701 selects the serializing network address that is the output of the signal 613S, in one of two cases: either when the message M(PE) input to the input buffer 604 (FIG. 18) is a message to be transmitted to the serializing network, i.e., a broadcast message (BC=1, SB=1); or when that message M(PE) is a one-to-one communication message (BC=0, SB=1) in effect where the connected XB is faulty. If the message M(PE) is an ordinary one-to-one communication message (SB=0, BC=0), the selector 701 selects the destination PE address in the message. The selectors 702 and 703 act in the same manner as the selector 701.

The address decoders 704 through 706 decode the destination PE address of each of the messages selected by the selectors 701 through 703. When the address decoders determine the destination of each message, they send appropriate signals to the OR gate group 711.

Figure 20:
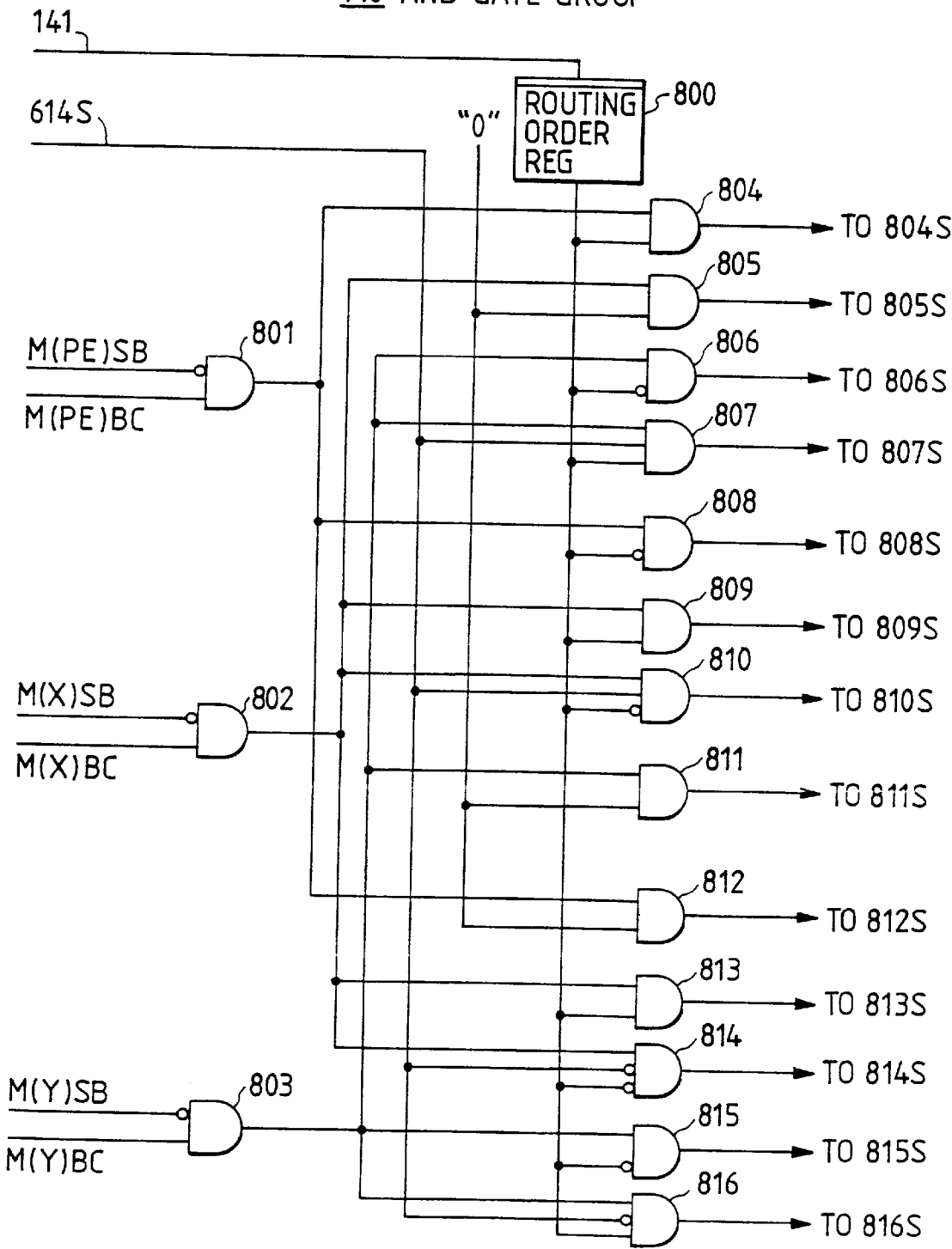
FIG. 20 is a schematic circuit diagram of an AND gate group used by the circuit of FIG. 19.

The priority circuits 707 through 709 select one of the three messages received and output signals SX, SY and SP in return. In this example, the messages are selected on a first-in, first-out basis. These priority circuits, like those of the first embodiment, operate so as to transmit messages through worm-hole routing. The OR gate group 711, made up of OR gates 715 through 723, ORs the output signals from the AND gate group 710 with the output signals from the address decoders 704 through 706. FIG. 20 is a schematic circuit diagram showing the internal structure of the AND gate group 710. The AND gate group 710 comprises AND gates 801 through 803, AND gates 804 through 816, and a routing order register 800 into which the host processor or SVP 140 sets beforehand a bit designating the routing order. If the routing order for message transmission is from X-coordinate XBs to Y-coordinate XBs, then 1 is set in the routing order register 800; if the routing order is reversed, i.e., from Y-coordinate XBs to X-coordinate XBs, then 0 is set in the register 800. With the fifth embodiment, the routing order register contains 1 and thus the routing order is from X-coordinate XBs to Y-coordinate XBs. The AND gates 801 through 803 output 1 when the BC bit is 1 and the SB bit is 0 in the broadcast message, i.e., when the broadcast message is broadcast from the serializing network. The AND gates 804 through 816 determine which output signal is to be 1 in accordance with the content of the register 800 and with the signal 614S.

(Crossbar Switches)

Figure 21:
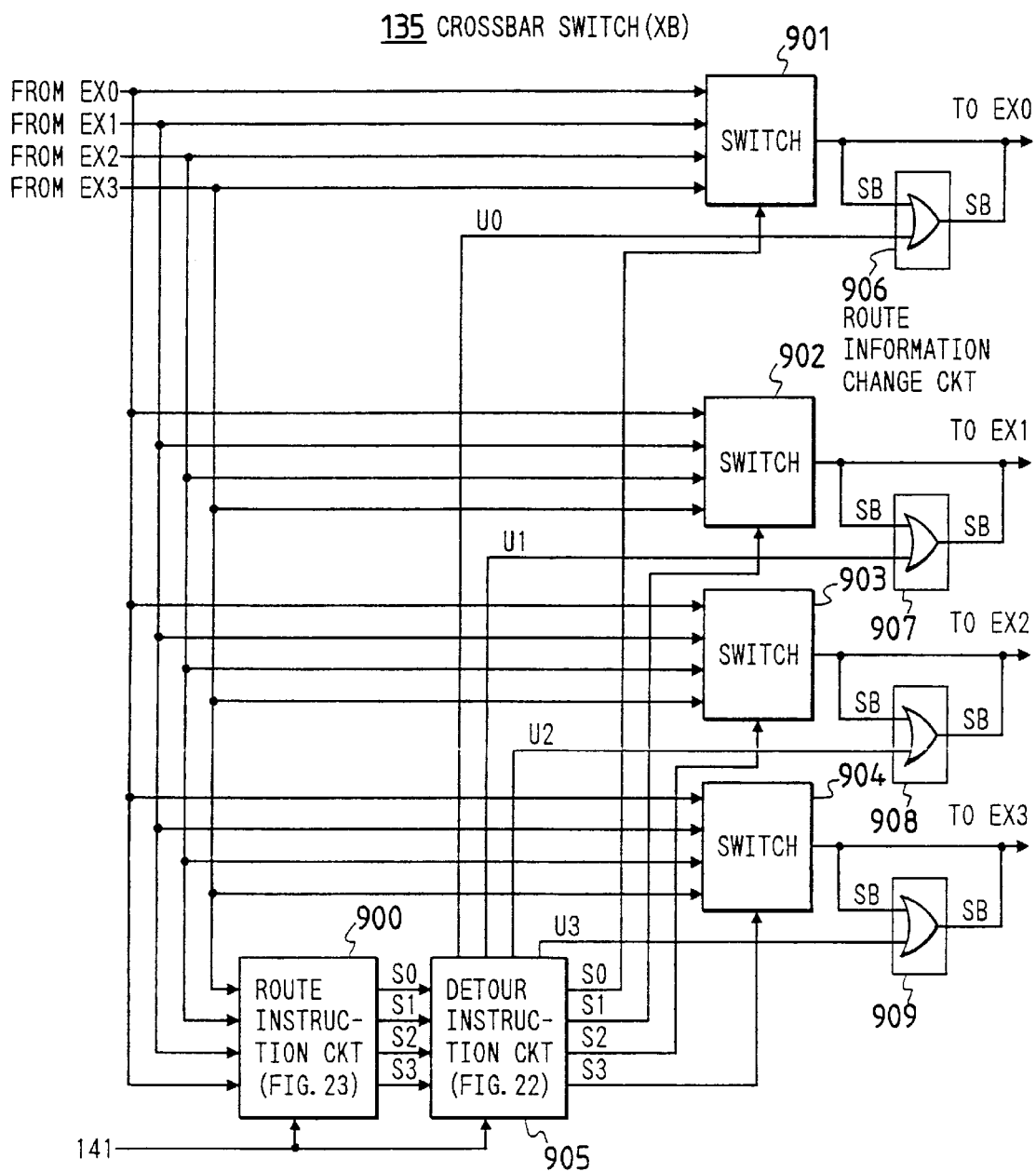
FIG. 21 is a schematic circuit diagram of a crossbar switch used by the fifth embodiment.

FIG. 21 is a schematic circuit diagram showing the structure of the X-coordinate crossbar switch XB-Xi (i=0, 1, 2 or 3). The Y-coordinate crossbar switches also have the same structure. The crossbar switch XB-Xi comprises a route instruction circuit 900, a detour instruction circuit 905, route information change circuits 906 through 909, and switches 901 through 904. What makes the crossbar switches of the fifth embodiment different is that they additionally include the route instruction circuit and the route information change circuits. The route instruction circuit 900 determines the switch through which to transmit the input message. The switches 901 through 904 select one of four input ports. In FIG. 21, I/O signals EX0 through EX3 denote signals coming from the EXi0 through EXi3 connected to the XB in question. In the case of, say, the XB-X0, the I/O signals EX0 through EX3 are replaced by EX00 through EX03. With the XB-Y0, the I/O signals EX0 through EX3 are replaced by EX00 through EX30. Because the XBs are a crossbar switch each, the input signals EX0 through EX3 are connected unchanged to the switches 901 through 904 respectively. A message received through any one of the input ports is transmitted unchanged to the switches 901 through 904.

The detour instruction circuit 905 receives signals S0, S1, S2 and S3 from the route instruction circuit 900 and a signal from the host processor or SVP 140. In response, the detour instruction circuit 905 outputs its signal not to any faulty EX but to the port connected to the adjacent EX.

Given the signal from the detour instruction circuit 905, the route information change circuit 906 changes the SB bit in the message. The route information change circuits 907 through 909 have the same structure as the circuit 906.

Figure 22:
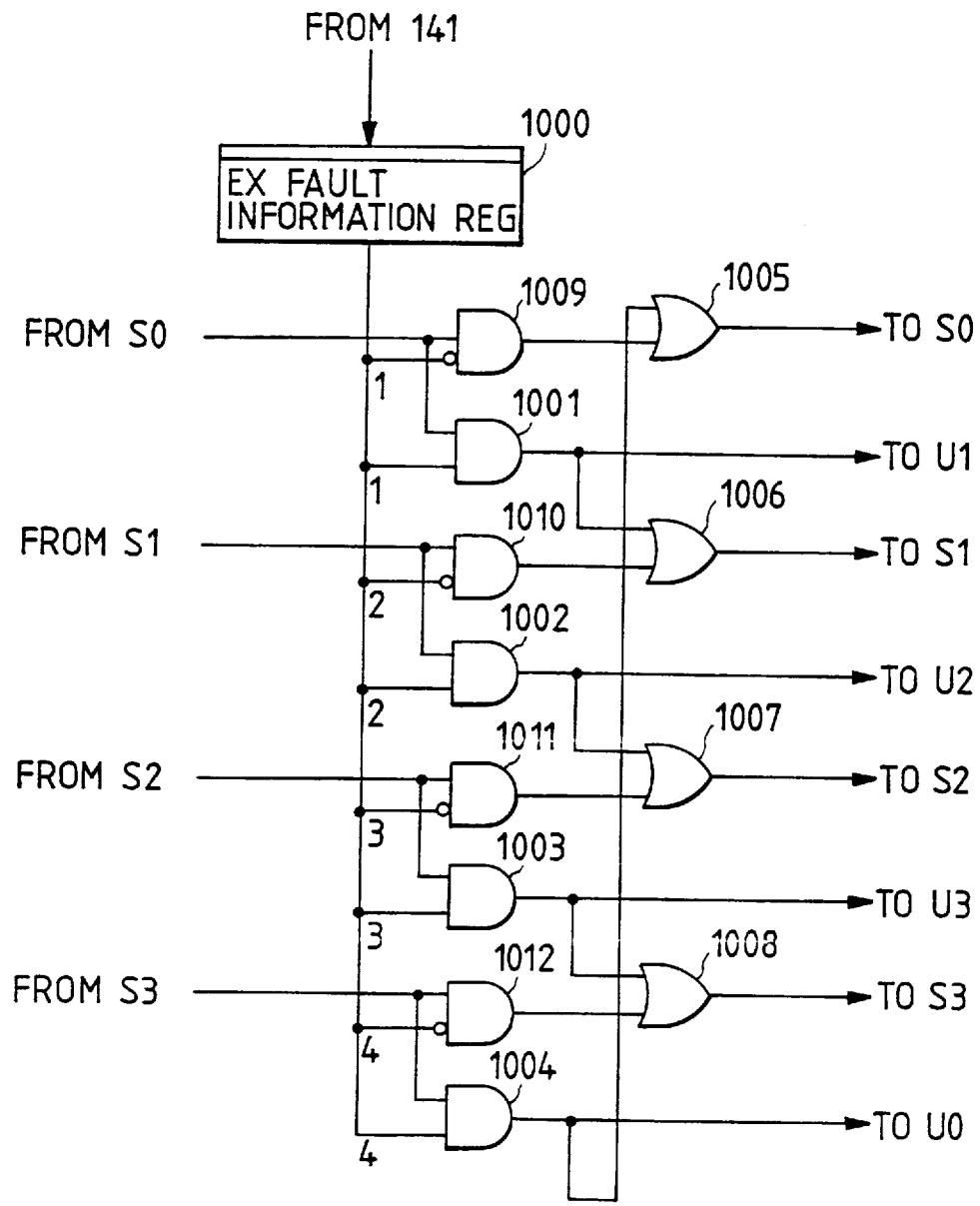
FIG. 22 is a schematic circuit diagram of a detour instruction circuit used by the circuit of FIG. 21.

FIG. 22 is a schematic circuit diagram showing the structure of the detour instruction circuit 905. The detour instruction circuit 905 comprises an EX fault instruction register 1000, AND gates 1001 through 1004 and 1009 through 1012, and OR gates 1005 through 1008.

In the EX fault information register 1000, the host processor or SVP 140 sets in advance fault information about the EXs connected to the XB in question. For example, if the EX connected to output port 0 of that XB is faulty, then the value 1000 is set in the EX fault information register 1000. The AND gates 1001 through 1004 output 1 if that bit in the register 1000 which corresponds to the target port is 1 (i.e., indicating a faulty EX). In that case, the signal is output to the adjacent port. For example, if the output signal from S0 is 1 and the EX connected to port 0 is faulty, then bit 1 in the register 1000 is set to 1. This causes the AND gate 1001 to output 1, with the result that the OR gate 1006 outputs 1 and the output of S1 is 1. Although the fifth embodiment utilizes the adjacent port for a detour, any port may be used for a detour provided there exists only one faulty location.

Figure 23:
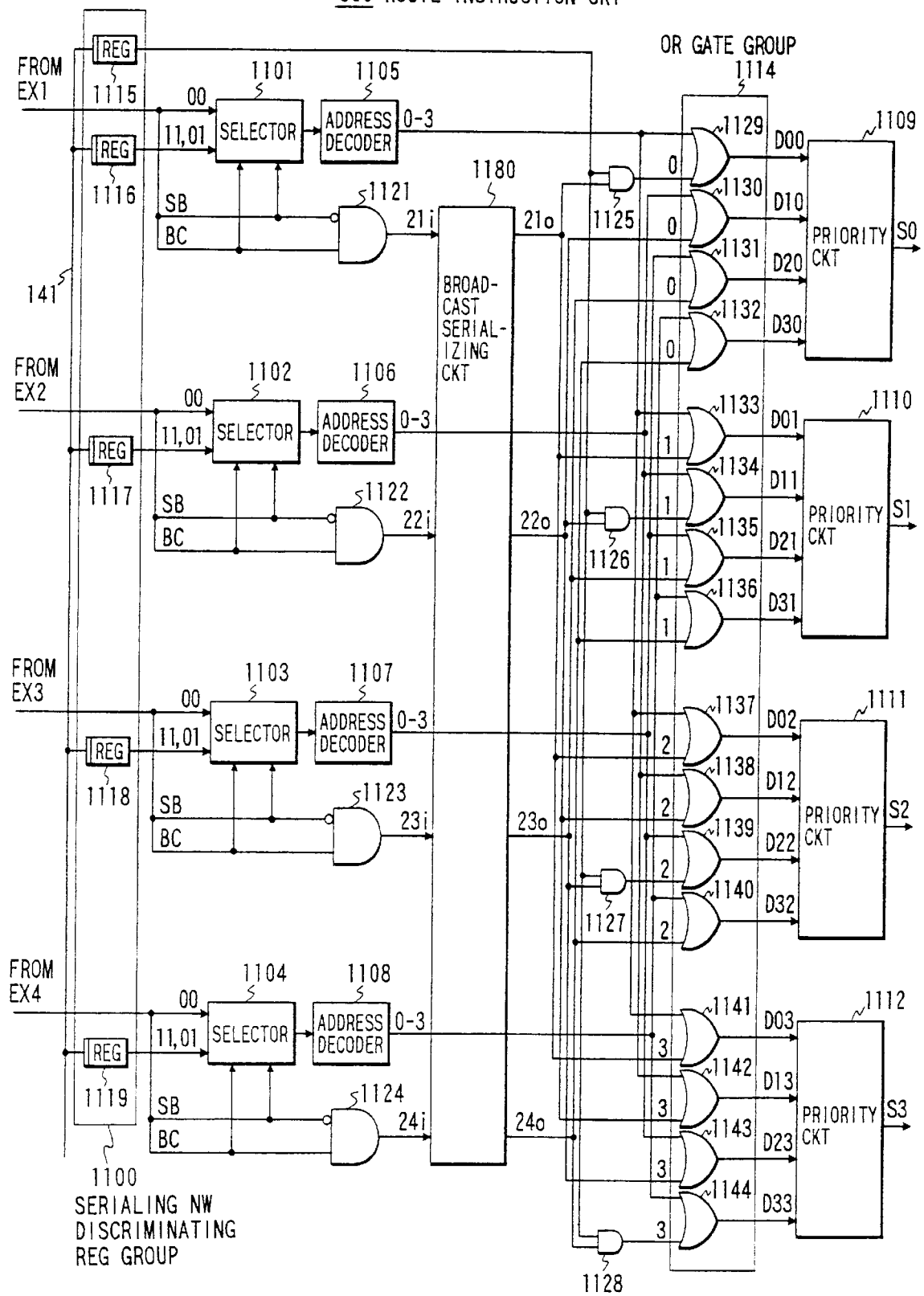
FIG. 23 is a schematic circuit diagram of a route instruction circuit used by the circuit of FIG. 21.

FIG. 23 is a schematic circuit diagram showing details of the route instruction circuit 900. The route instruction circuit 900 comprises a register group 1100, selectors 1101 through 1104, address decoders 1105 through 1108, a broadcast serializing circuit 1180, AND gates 1121 through 1128, priority circuits 1109 through 1112, and an OR gate group 1114.

The register group 1100 is composed of a register 1115 and registers 1116 through 1119. If the XB in question is the serializing network, the signal 141 from the host processor or SVP sets 1 beforehand in the register 1115. In this example, the register 1115 contains 1 only within the serializing network XB-X3. In the registers 1116 through 1119, the host processor or SVP 140 sets beforehand a serializing network address ij corresponding to each port. Suppose that the serializing network is XB-Xi (i=3) in the fifth embodiment. In that case, the registers 1116, 1117, 1118 and 1119 have 30, 31, 32 and 33 set therein, respectively.

The selectors 1101 through 1104 select the serializing network address in each of the registers 1116, 1117, 1118 and 1119 if the SB bit in the message is 1 (which means that the input message is a message to be transmitted to the serializing network, i.e., a broadcast request message or a one-to-one communication message in effect when the network has a fault). If the input message is an ordinary one-to-one communication message, the selectors 1101 through 1104 select the destination PE address in the message. The address decoders 1105 through 1108 decode the route information in the message selected by the selectors 1101 through 1104 so as to determine the destination of the message.

Figure 32:
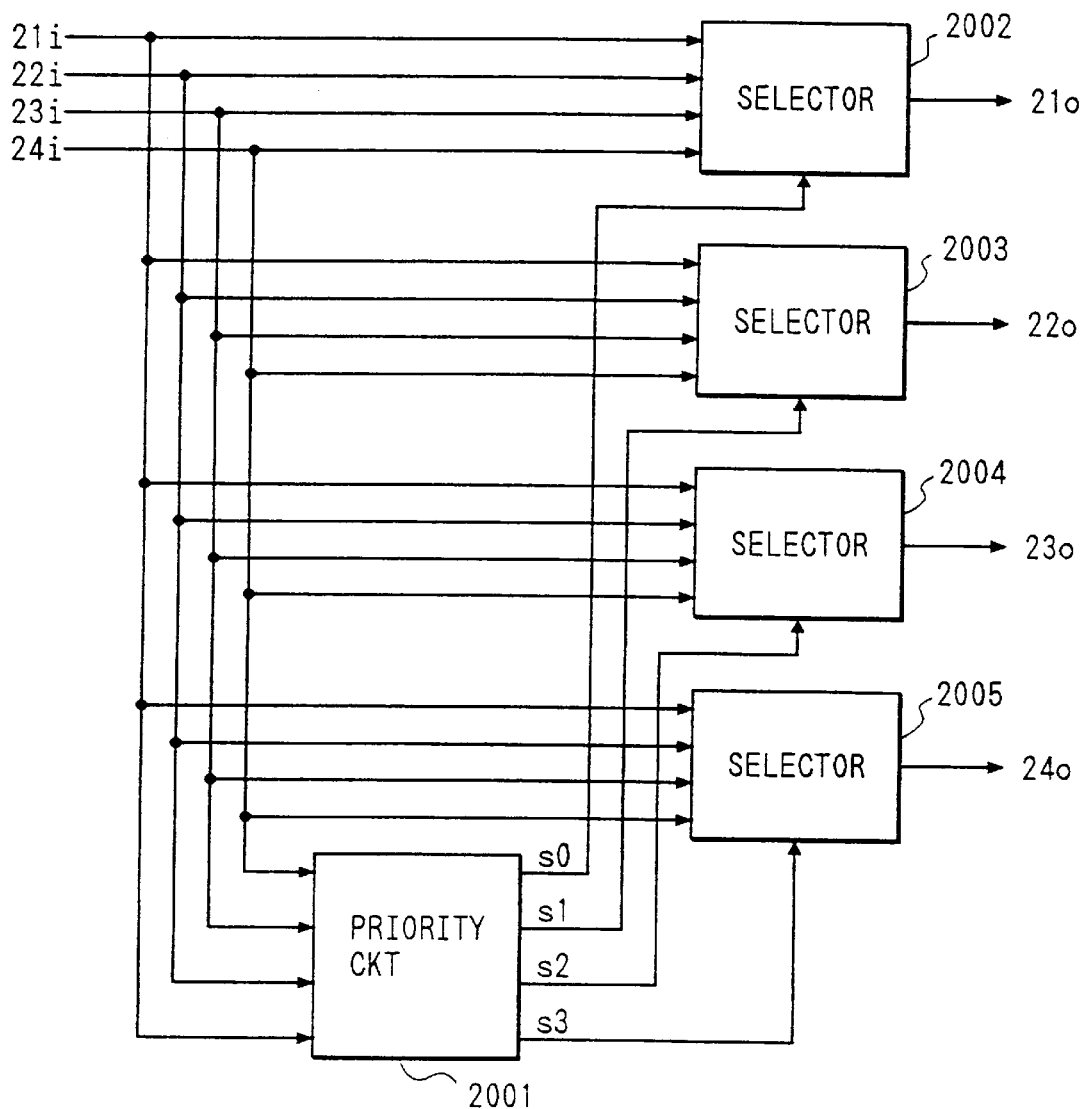
FIG. 32 is a schematic circuit diagram of a broadcast serializing circuit used by the circuit of FIG. 31.

The broadcast serializing circuit 1180 selects one of four input signals 21i, 22i, 23i and 24i, and sends the selected signal correspondingly to one of the four output terminals for signals 21o, 22o, 23o and 24o. FIG. 32 is a schematic circuit diagram showing the structure of the broadcast serializing circuit 1180. The broadcast serializing circuit 1180 comprises a priority circuit 2001 and selectors 2002 through 2005. The priority circuit 2001 selects one of four input signals only when all output ports of the crossbar switch to which it belongs are available for use and outputs the selected signal as one of four signals S0, S1, S2 and S3. In this example, the messages are selected on a first-in, first-out basis. If a plurality of broadcast messages are transmitted simultaneously, the broadcast serializing circuit 1180 serializes the messages for transmission. Although the serializing network may be fed parallelly with a plurality of broadcast request messages from different PEs, the broadcast serializing circuit 1180 keeps the serializing network from outputting parallelly a plurality of broadcast messages. This suppresses deadlocks that can result from a plurality of broadcast messages being transmitted in parallel. The use of this circuit in a crossbar switch is a known technique, as disclosed illustratively in Japanese Pat. Laid-Open No. Hei 1-267763.

The priority circuits 1109 through 1112 select one of four input messages, and output signals S0, S1, S2 and S3. In this example, the messages are selected on a first-in, first-out basis. These priority circuits, like those of the first embodiment, operate so as to transmit messages by wormhole routing.

The AND gates 1121 through 1124 output 1 provided the BC and SB bits of the transmit control information are set to 1 and 0 respectively in the broadcast message, i.e., only when the broadcast message is broadcast from the serializing network.

The AND gates 1125 through 1128 output 1 only when the register 1115 has the value of 1.

The OR gate group 1114 comprises OR gates 1129 through 1144. Given the outputs of the address decoders and those of the AND gate group, one of the component OR gates outputs 1.

Output signals D00, D10, D20 and D30 indicate that the messages received respectively from EX0, EX1, EX2 and EX3 are sent to EX0.

Likewise, output signals D01, D11, D21 and D31 indicate that the messages received respectively from EX0, EX1, EX2 and EX3 are sent to the EX1; output signals D02, D12, D22 and D32 indicate that the messages received respectively from EX0, EX1, EX2 and EX3 are sent to EX2; output signals D03, D13, D23 and D33 indicate that the messages received respectively from EX0, EX1, EX2 and EX3 are sent to EX3.

(Transmission of Broadcast Message over a Normal Network)

Figure 24:
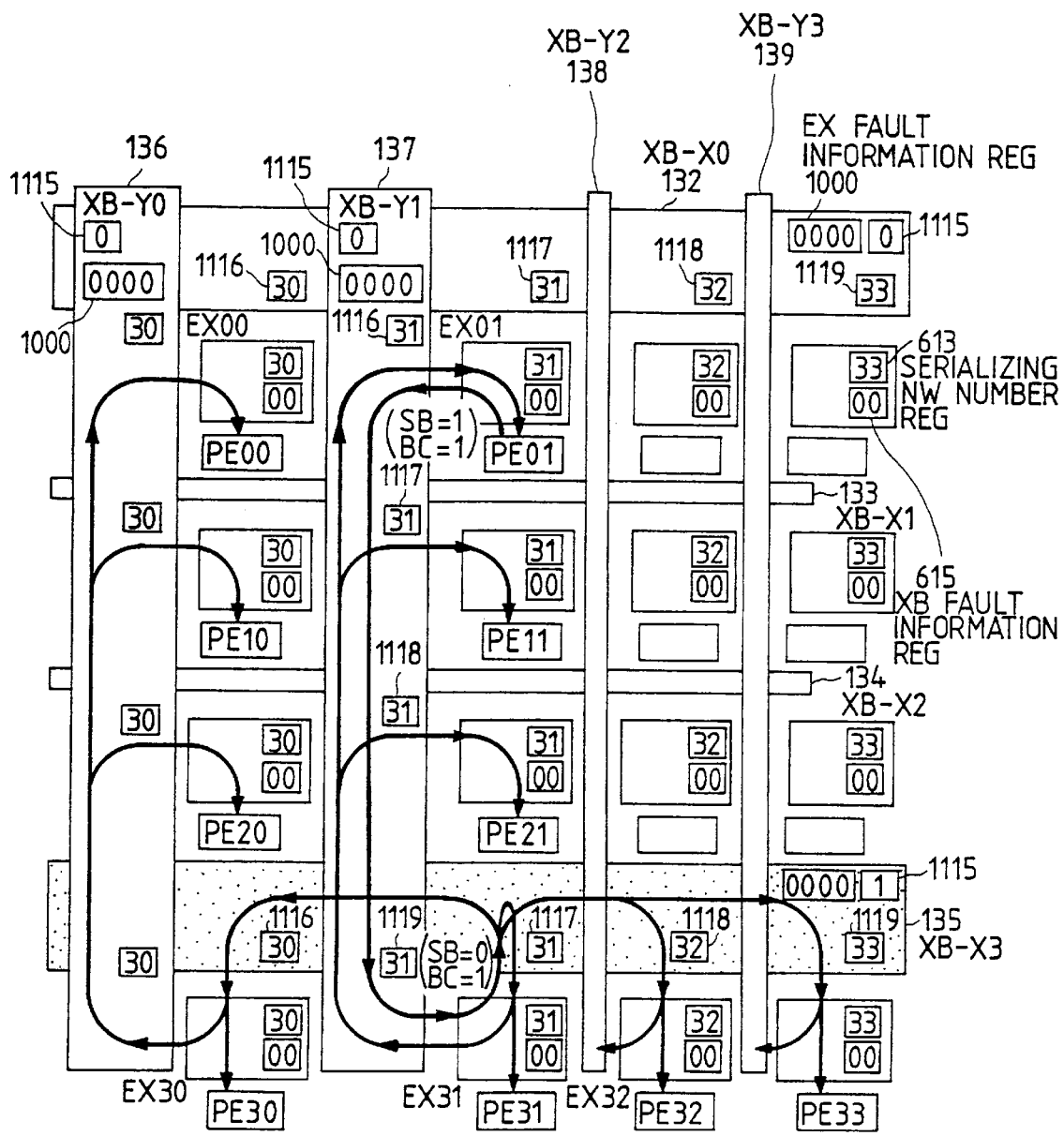
FIG. 24 is a view showing typical routes for transmitting broadcast messages by use of the circuit in FIG. 16.

FIG. 24 is shows routes for transmitting a broadcast request message sent from the PE01 and a broadcast message generated from the broadcast request message, in case the network is normal. How the broadcast message is transmitted will now be described by referring to FIG. 24 as needed. It is assumed here that the serializing network is XB-X3 and that 1 is set in the register 1115 inside XB-X3. When the serializing network is XB-X3, the PE address with its X coordinate changed to 3 is set to the register 613 that retains the address of the serializing network in the EX. For example, the register in EX00 has 30 set and the register in EX20 has 20 set, while the register in EX01 has 31 set. The addresses of EXs (30, 31, 32, 33) connected to the ports of the serializing network 135 are set in advance in those registers 1116 through 1119 in the network 135 which correspond to these ports and which are intended to retain serializing network addresses. In the registers 1116 through 1119 which correspond to the ports inside any XB other than the serializing network, the value retained in the register 613 in the EX connected to that XB is set. Since the network is free of fault, the XB fault information register 615 contains the value of 00 and the EX fault information register 1000 has the value of 0000.

The processors that are assigned divisions of a process within the same job transmit to one another messages necessary for process execution by way of the EXs and XBs. In so doing, the processors carry out programs independently of one another. When the source processor element PE01 generates a broadcast request message, the processor transmits the message to the EX01. As shown in FIG. 18, the broadcast request message is transmitted to the XB-Y1 by the route instruction circuit 600. What takes place within the EX01 will now be described with reference to FIGS. 18, 19 and 20. Inside the EX01, the broadcast request message fed from the PE01 is first placed unchanged into the input buffer 606. The SB bit in the broadcast request message will not be changed by the route information change circuit 603 or by the detour instruction circuit 610. In the EX01, the output 614S of the agreement judgment circuit 611 is 0. Inside the route instruction circuit 600, the selector 701 selects the output signal 613S of the serializing network address register 613 (i.e., address 31 in this example) because the BC and SB bits of the transmit control information in the message are both 1. The address decoder 704 decodes this address 31. Because the X-coordinate of the serializing network address agrees with that of the EX31, a value of 1 is output to the OR gate 718. Because the BC and SB bits are both 1, the AND gate group 710 has its AND gate 801 output 0 as shown in FIG. 20. Thus the outputs of the AND gate group 710 remain all 0. It follows that, of the OR gates making up the OR gate group 711, only the OR gate 718 outputs 1. This causes the priority circuit 708 to output the signal SY. In FIG. 18, with the signal SY set to 1, the selector 618 selects the broadcast request message and transmits it to the XB-Y3.

The XB-Y3 then transmits the broadcast request message to the EX31. What takes place at this time will now be described with reference to FIGS. 21, 22 and 23. With the BC and SB bits both set to 1, the selector 1101 of the route instruction circuit 900 selects the serializing network address in the register 1116 (address 31 in this example). The selected address is decoded by the address decoder 1105. The OR gate 1141 in the OR gate group 1114 outputs 1 which is forwarded by the priority circuit 1112 onto a signal line S3. The outputs of the AND gates 1121 through 1128 remain 0. The signal S3 is transmitted to the detour instruction circuit 905. In the detour instruction circuit 905 of this example, EX fault information is not set in the EX fault information register 1000 of FIG. 22. Thus the AND gate 1012 outputs 1, and the detour instruction circuit 905 outputs the signal S3 unchanged. The signal S3 from the detour instruction circuit 905 causes the switch 904 to transmit the broadcast message to the EX31. The route information change circuit 903 does not change the SB bit because that bit is 1.

The EX31 then changes the SB bit in the broadcast request message to 0. The broadcast message obtained by this bit change is transmitted to the serializing network XB-X3. What takes place inside the EX31 will now be described with reference to FIGS. 18, 19 and 20.

In the EX31, the agreement judgment circuit 611 finds that the address 31 of the home PE agrees with address 31 of the serializing network. This causes the output signal 614S to become 0. The SB bit of the message is transmitted to the route information change circuit 603. In the route information change circuit 602, the AND gate 623 outputs 0 because the output signal 614S is 0 and the SB bit is 1. That is, the SB bit is changed from 1 to 0. The broadcast message thus changed is retained in the input buffer 605. At this point, the BC bit is 1 and the SB bit is 0.

What occurs inside the route instruction circuit 600 will now be described. Because the BC bit is 1 and the SB bit is 0 in the message, the AND gates 803 and 807 in the AND gate group 710 of FIG. 20 output 1. This causes the output YX of the OR gate 717 to become 1. As a result, when the priority circuit 707 selects this output YX, the output SX of the circuit 707 becomes 1. In FIG. 18, given the signal SX set to 1, the selector 617 selects the broadcast message and sends it to the XB-X3. Thus the broadcast message from the EX31 is transmitted to the XB-X3 as illustrated in FIG. 24.

What takes place inside the serializing network XB-X3 will now be described with reference to FIGS. 21, 22 and 23. The route instruction circuit 900 of FIG. 23 receives the broadcast message trough an input terminal EX1. Because the BC bit is 1 and the SB bit is 0, the output 22*i* of the AND gate 1122 becomes 1. When the broadcast serializing circuit 1180 selects the output 22*i*, the output 21*o* of the circuit 1180 becomes 1. At this point, 1 is already set in register 1115 of the serializing NW discriminating register group 1110 because the XB-X3 is the serializing network. Thus the AND gate 1126 outputs 1. As a result, the OR gates 1130, 1134, 1138 and 1142 output 1 and the outputs of S0, S1, S2 and S3 become 1. The signal from the route instruction circuit 900 enters the detour instruction circuit 905 and, with no fault information set, arrives unchanged at the switches 901 through 904. The route information change circuits 906 through 909 leave unchanged the SB bit in this broadcast request message.

In the manner described, the broadcast message transmitted from the EX31 is sent via all switches to the EX30, EX31, EX32 and EX33.

If a plurality of broadcast messages are supplied parallelly to the broadcast serializing circuit 1180, the circuit 1180 serializes the supplied broadcast messages.

The broadcast message input to any of the EX30, EX31, EX32 and Ex33 is handled exactly the same way. Thus the description that follows regarding these messages will concern only that which is input to the EX31. What takes place inside the EX31 will be described below with reference to FIGS. 18, 19 and 20.

The message transmitted to the EX31 is forwarded to the route instruction change circuit 601. Because the SB bit of the message is 0, the route information change circuit 601 places the SB bit unchanged in the input buffer 604.

In the route instruction circuit 600 of FIG. 19, the AND gates 802, 809 and 813 in the AND gate group 710 output 1 (FIG. 20) and the OR gates 719 and 722 also output 1 because the BC bit is 1 and the SB bit is 0. This causes the outputs SY and SP to become 1. The selectors 618 and 619 in FIG. 18 select the broadcast message which is transmitted to the XB-Y1 and PE31. The reason for the broadcast message to be sent from the EX31 to the PE31 at this point is that when the broadcast message is later transmitted to the XB-Y1, the XB-Y1 will not return the message to the EX31. Thus as soon as the EX31 receives the broadcast message from the XB-X3, that message is forwarded to PE31. The broadcast message in XB-Y1 is prevented from subsequently returning to EX31 so as to prevent the route ranging from XB-Y1 to EX31, which is a route for broadcast request message transmission, from overlapping with the routing for broadcast message transmission.

As shown in FIG. 24, the broadcast message sent from the EX31 is transmitted to the XB-Y1. What takes place inside the XB-Y1 will now be described with reference to FIGS. 21, 22 and 23. The message is first transmitted to the route instruction circuit 900. In the route instruction circuit 900 (FIG. 23), the output signal 24i of the AND gate 1124 becomes 1 because the BC bit is 1 and the SB bit is 0. The broadcast serializing circuit 1180 selects the route for the output signal 240 corresponding to this input signal. Since the XB-Y1 is not the serializing network, the register 1115 has 0 already set therein. The AND gate 1128 thus outputs no signal.

As a result, the OR gates 1132, 1136 and 1140 output 1, and the outputs of S1 and S2 become 1. No output is made to S3.

With the network free of fault, the detour instruction circuit 905 does not change any signal. The broadcast message from the EX31 is transmitted to the EX01, EX11 and EX21 via the switches 901 through 903 in FIG. 21, respectively. A deadlock is avoided because the broadcast message is not sent to the EX31. The broadcast request message output by the EX01 needs to be transmitted from the XB-Y1 to the EX31. Therefore, allowing the broadcast message to be sent from the XB-Y1 to the EX31 would let the route for transmitting the broadcast request message overlap with the route for broadcast message transmission from the XB-Y1 to the EX31, which would result in a deadlock.

The operation of the EX01, EX11, EX21 is exactly the same. Thus the description that follows regarding the operation of these exchange switches will be limited to the operation of the EX01. Specifically, what takes place inside the EX01 will be described below with reference to FIGS. 18, 19 and 20.

Figure 18:
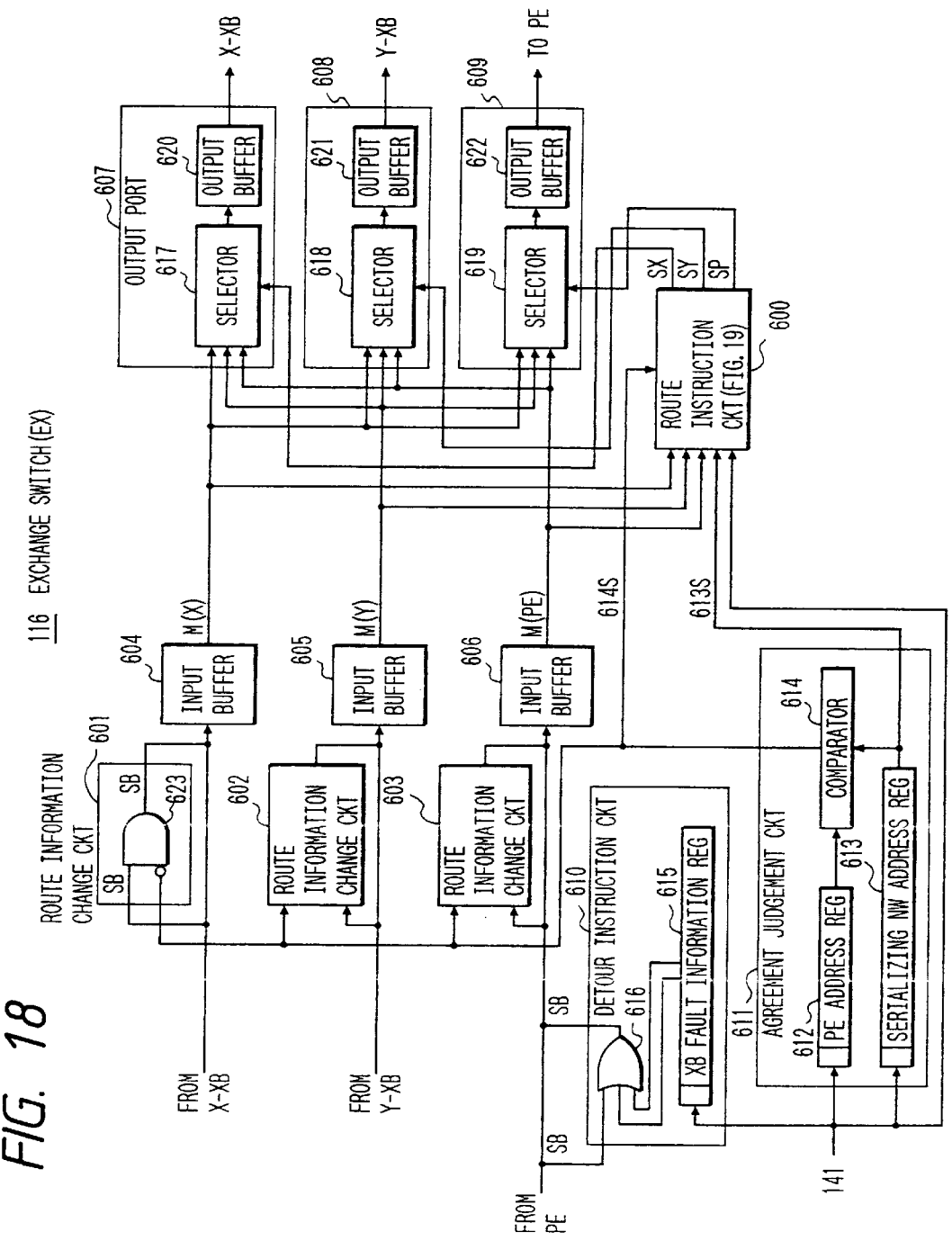
FIG. 18 is a schematic circuit diagram of an exchange switch (EX) used by the circuit of FIG. 16.

In FIG. 18, the output 614S of the agreement judgment circuit 611 is 0. The broadcast message received from the XB-Y is transmitted to the route information change circuit 602. Because the SB bit is 0 in this broadcast message, the message is retained in the input buffer 605 with the SB bit left unchanged.

In the route instruction circuit 600 of FIG. 19, the AND gates 803 and 816 in the AND gate group 710 of FIG. 20 output 1 and the OR gate 723 of FIG. 19 outputs 1 because the BC bit is 1 and the SB bit is 0. This causes 1 to be output to SP. In FIG. 18, the selector 619 selects the broadcast message and sends it to the PE01.

To sum up, the broadcast message from the PE01 is transmitted through the following routing: PEO1→EX01→XB-Y1→EX31→XB-X3→EX3i (i=0, 1, 2 and 3)→Yi-XB, PE3i (i=0, 1, 2 and 3)→EXi0 (i=0, 1 and 2)→PEij (i=0, 1 and 2; j=0, 1, 2 and 3).

(Transmission of Broadcast Message Involving a Faulty XB-X2)

Figure 25:
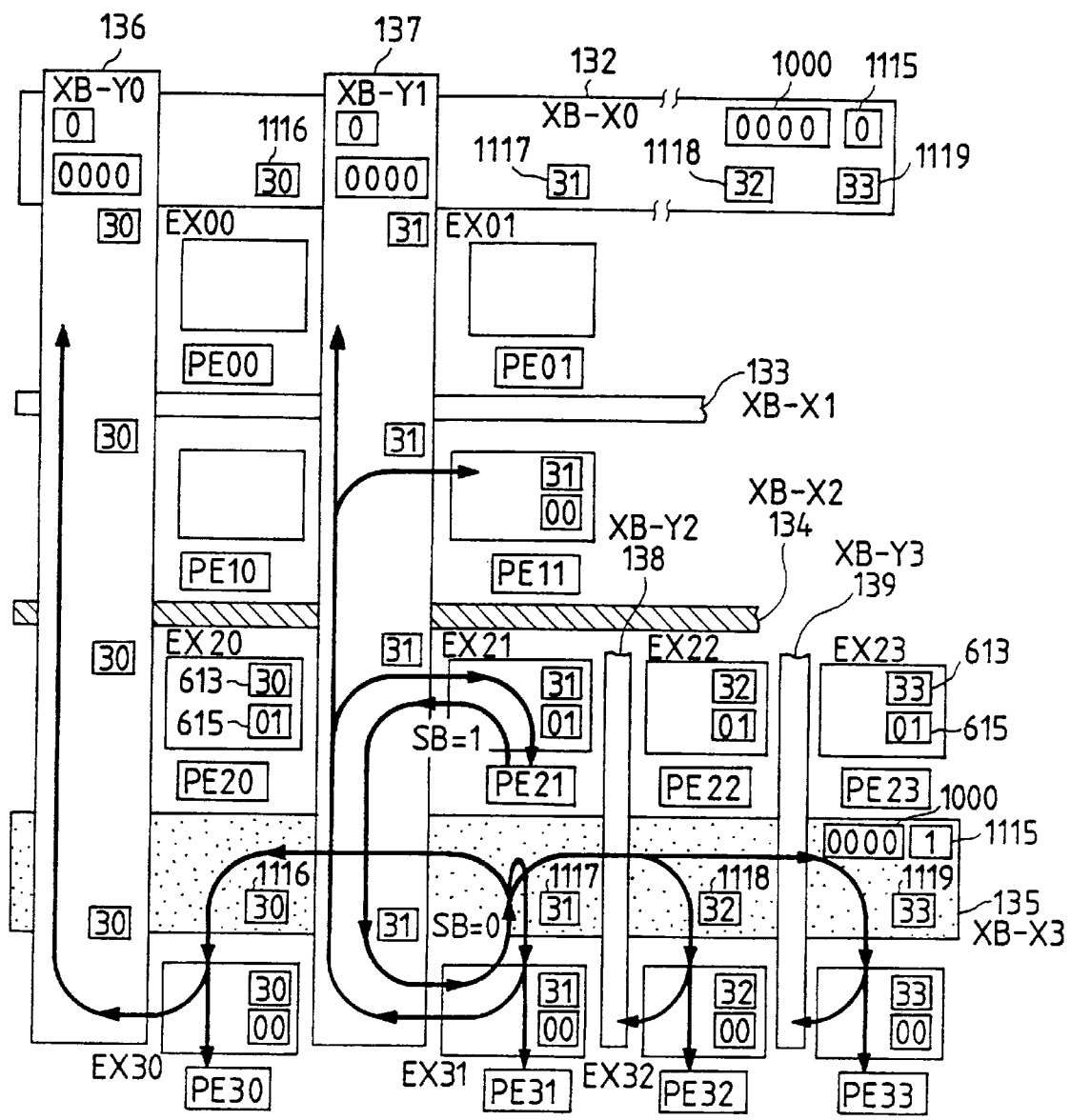
FIG. 25 is a view indicating typical routes for transmitting broadcast messages in case of a crossbar switch fault in the circuit of FIG. 16.

FIG. 25 illustrates the flow of a broadcast message from the PE21, with the crossbar switch XB-X2 at fault. Information about this fault is set to the XB fault information register 615 within each EX. For example, a value of 01 is set to the XB fault information register 615 in the EX20 through EX23 connected to the faulty XB; a value of 00 is set to the XB fault information register 615 in the other EXs. Because the faulty XB is an X-coordinate XB, the routing order is from the X to the Y axis. This requires setting beforehand 1 in the routing order bit register 800 of FIG. 20. With the fifth embodiment, it is assumed that the fault in the is limited to a single partial network. Thus the EXs are free of fault and the EX fault information register 1000 in each XB has the value of 0000 set therein.

With one XB at fault, the serializing network is set to be one of the XBs belonging to the same coordinate axis as that of the faulty XB. It is assumed here that the XB-X3 is the serializing network. In the XB-X3, the register 1115 has a value of 1 set therein. The values set to the register 613 in the EXs and to the registers 1115 through 1119 in the XBs are the same as those shown in FIG. 24.

In FIG. 25, the processor operation is the same as that performed when message broadcast is effected without any faulty XB. The source processor element PE21 composes a message in accordance with one of the formats shown in FIG. 17. Because this message is a broadcast message, the BC and SB bits of the transmit control information are both 1.

In FIG. 25, the broadcast message composed by the source processor element PE21 is transmitted through the following routing: PE21→EX21→XB-Y1→EX31→XB-X3→EX3i (i=0, 1, 2 and 3)→Yi-XB, PE3i (i=0, 1 and 3)→EXi0 (j=0, 1 and 2)→PEij (J=0, 1 and 2; j=0, 1, 2 and 3).

When the serializing network is set to be one of the XBs belonging to the same coordinate axis as that of the faulty XB, the operation of each EX and XB for transmitting the broadcast message becomes the same as that performed when there is no fault. Thus the operation will not be described further.

What follows is a description of how messages are handled where an EX is faulty.

(Transmission of Broadcast Message Involving a Faulty EX)

Figure 27:
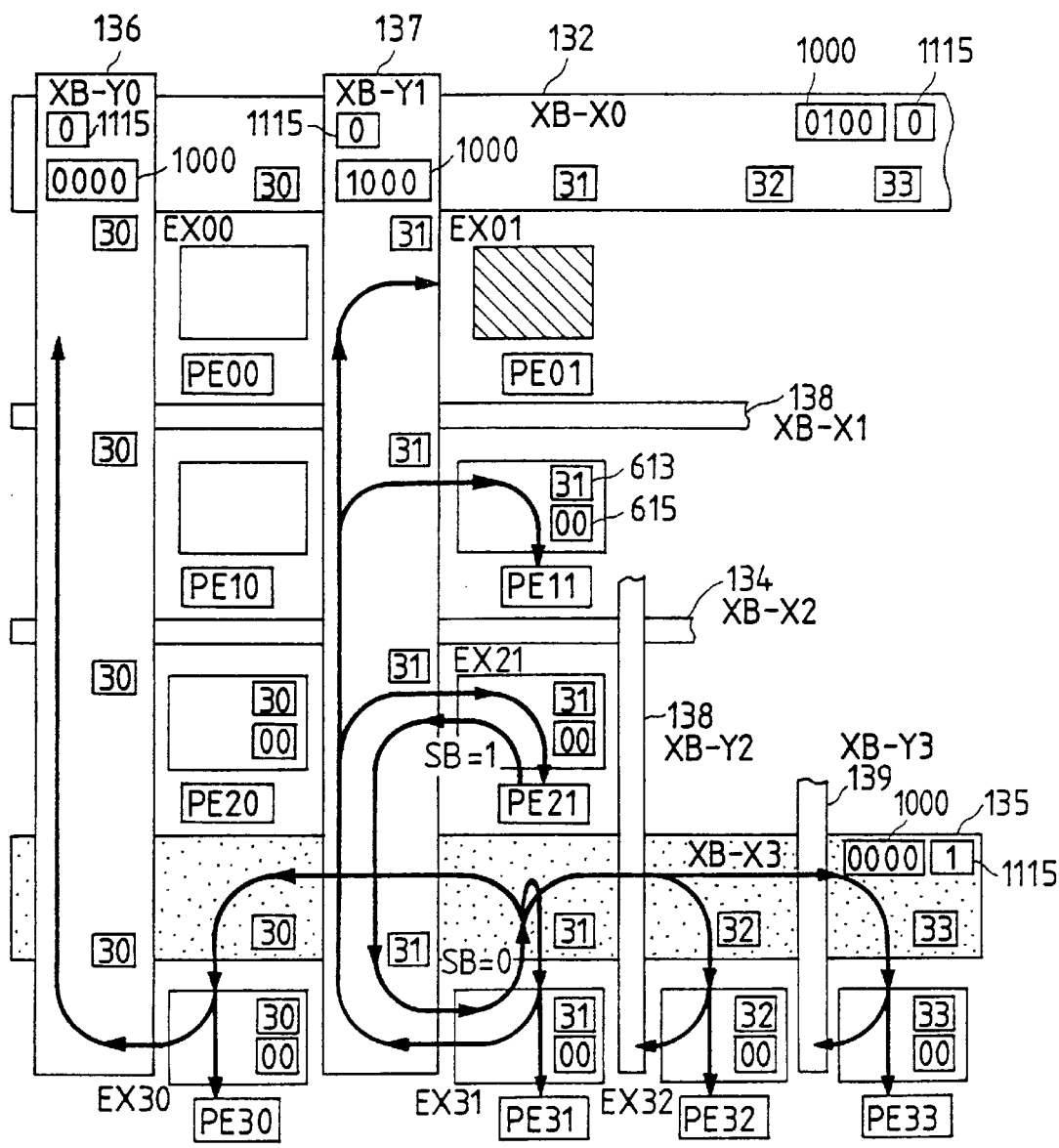
FIG. 27 is a view illustrating typical routes for transmitting broadcast messages in case of an exchange switch fault in the circuit of FIG. 16.

FIG. 27 depicts the flow of a broadcast message issued by the PE21 where the EX01 is faulty.

It is assumed here that the EX01 is the only EX that is faulty. Information about the faulty EX is set to the EX fault information register 1000 in each EX. For example, a value of 0100 is set to the EX fault information register 1000 of the XB132 connected to the faulty EX; a value of 1000 is set to the EX fault information register of the XB-Y1; a value of 0 is set to the EX fault information register of all other EXs.

With the fifth embodiment, it is assumed that the fault in the system is limited to a single partial network. Thus the XBs in this example are free of fault and the XB fault information register 615 in each EX has the value of 00 set therein. The serializing network may be any XB provided it is not connected to the faulty EX. In this example, the XB135 (XB-X3) is set to be the serializing network and the register 1115 in the XB135 has a value of 1 set therein to indicate that this XB is the serializing network.

The values to be set in the serializing network address registers 613 in the EXs and XBs are the same as those shown in FIG. 24. The routing order need not be changed when an eX is faulty. In this example, the routing order is from the X to the Y axis and a value of 1 is set beforehand in the routing order register 800 of FIG. 17.

Where the message is a broadcast message, that message is transmitted the same way as when an XB is faulty. In the example of FIG. 27, however, the message cannot be transmitted to any PE connected to the faulty EX.

As described, in case a faulty EX exists, an XB t o which the faulty EX is not connected is selected as the serializing network. This makes it possible to implement message broadcast despite the presence of the fault.

(Transmission of One-to-one Communication Message over a Normal Network)

A one-to-one communication message is transmitted selectively to the PE identified by the destination PE address held in the message. Transmission of the message is effected via the address decoders 704 through 706 in the EX of FIG. 19 and via the address decoders 1105 through 1108 in the XB of FIG. 23.

Where the network is free of fault and the message is not a broadcast message, the BC and SB bits in the message are both 0. The route information change circuit 601, the detour instruction circuit 610 and the agreement judgment circuit 611 in the EX remain inactive. In this case, the message is transmitted according to the destination PE address held in the message and in a manner equivalent to appropriate techniques known in the art. Thus the procedure for the above message transmission will not be discussed further.

(Transmission of One-to-one Communication Message Involving a Faulty XB)

Figure 26:
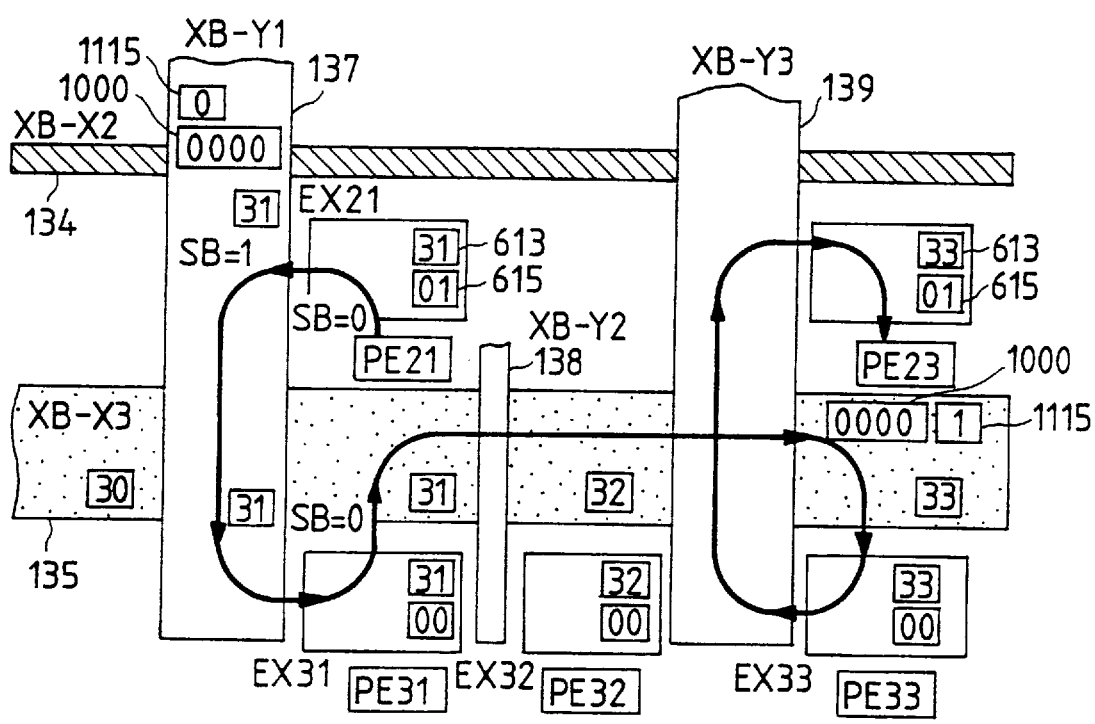
FIG. 26 is a view depicting a typical route for transmitting a one-to-one communication message in case of a crossbar switch fault in the circuit of FIG. 16.

FIG. 26 shows the flow of a one-to-one communication message transmitted from the PE21 to the PE23, with the XB-X2 being faulty. The XB-X3 is selected as the serializing network. The values to be set beforehand in the registers of the XBs and EXs are the same as those shown in FIG. 25.

In FIG. 26, the operation of the processor elements is the same as that carried out when a broadcast message is transmitted. The source processor element PE21 composes a one-to-one communication message in accordance with the format 5d in FIG. 17. In the one-to-one communication message, the BC and SB bits of the transmit control information are both 0.

In FIG. 26, the one-to-one communication message composed by the source processor element PE21 is first transmitted to the EX21. What takes place inside the EX21 will now be described with reference to FIGS. 18, 19 and 20.

In the EX21, a disagreement between the serializing network addresses causes the output 614S of the agreement judgment circuit 611 to become 0. The message transmitted to the EX21 is forwarded to the detour instruction circuit 610.

In the detour instruction circuit 610, the register 615 has a value of 01. Thus the OR gate 616 outputs 1, thereby changing the SB bit in the message from 0 to 1. At this point, the BC and SB bits are set to 0 and 1 respectively.

As one characteristic of the fifth embodiment, the SB bit of the transmit control information in the one-to-one communication message is changed where the register of the detour instruction circuit has a value of 1 set therein.

The message is then transmitted to the route information change circuit 603. In the route information change circuit 603, the SB bit of the message is left unchanged because the output of the signal 614S is 0. This message is retained in the input buffer 606. At this point, the BC bit is 0 and the SB bit is 1.

The route instruction circuit 600 (FIG. 19) selects the signal 613S because the BC bit is 0 and the SB bit is 1. The serializing network address 31 is decoded by the address decoder 704, with 1 output to SY.

With the one-to-one communication message, no output is made from the AND gate group 710 because the BC bit is 0.

The selector 619 of FIG. 18 selects the message and sends it to the XB137 (XB-Y1). Because the XB134 connected to the EX21 is faulty, the message is transmitted not to the XB134 (XB-X2) but to the serializing network 135 for a detour.

As shown in FIG. 26, the message from the EX21 is transmitted to the XB137 (XB-Y1). What takes place within the XB-Y1 will now be described with reference to FIGS. 21, 22 and 23.

In the route instruction circuit 900 of FIG. 21, the selector 1103 selects the serializing network address in the register 1118 because the BC bit is 0 and the SB bit is 1. The selected serializing network address is decoded by the address decoder 1107, with 1 output to S3.

In the detour instruction circuit 905 of FIG. 22, the connected EX fault information register 1000 has a value of 0000. Thus the output signal remains unchanged and is transmitted to the EX31 via the switch 904.

In the route information change circuit 909, the SB bit of the transmit control information in the message is left unchanged because the output signal U3 from the detour instruction circuit 905 is 0.

What takes place in the EX31 will now be described with reference to FIG. 18.

In the agreement judgment circuit 611, the comparator 614 detects an agreement and sends out 1 as its output 614S. The message is first transmitted to the route information change circuit 602. In the route information change circuit 602, the AND gate 623 outputs 1 because the output of the signal 614S is 1 and the SB bit is 1. A new message is then generated with its SB bit changed from 1 to 0 and is retained in the input buffer 605. At this point, the BC and SB bits are both 0.

As another characteristic of the fifth embodiment, the SB bit of the transmit control information in the message is changed when the message passes through the serializing network.

In the route instruction circuit 600 (FIG. 19), the message is received through a terminal EX1. Because the BC and SB bits are both 0, the selector 703 selects the destination PE address within the message. The selected address is decoded by the address decoder 706, with 1 output to SX. Since the BC bit is 0, no output is effected from the AND gate group 710. The selector 618 of FIG. 18 selects the message and sends it to the XB135 (XB-X3). In this manner, the message from the EX31 is transmitted to the XB135.

The XB135 is the serializing network. What takes place inside the XB135 will now be described with reference to FIGS. 21, 22 and 23. With the fifth embodiment, a message fed to the serializing network is transmitted therefrom through dimension order routing. That is, every message is first transmitted in parallel with the faulty XB (serializing network) and then along an XB of another coordinate axis. Illustratively, if an X-coordinate XB is faulty, a dimension order routing message is first transmitted along a normal X-coordinate XB and then along a Y-coordinate XB. Conversely, if a Y-coordinate XB is faulty, the message is first transmitted along a normal Y-coordinate XB and then along an X-coordinate XB.

In FIG. 21, the received message is first transmitted to the route instruction circuit 900. In the route instruction circuit 900 (FIG. 23), the selector 1102 selects the destination PE address because the BC and SB bits are both 0. The selected address is decoded by the address decoder 1106. A 1 is output to S3. The output signal is sent to the detour instruction circuit 905.

In the detour instruction circuit 905 (FIG. 22), the output signal is left unchanged because the register 1000 has a value of 0 set therein. The signal is sent to the EX33 via the switch 904.

In the route information change circuit 909, the transmit control information of the message remains unchanged. This is because the output signal U3 from the detour instruction circuit 905 is 0.

The message input to the EX33 will now be described with reference to FIG. 18.

The agreement judgment circuit 611 has an agreement detected by its comparator. This causes the signal 614S to become 1.

The message is first transmitted to the route information change circuit 601. In the route information change circuit 601, the transmit control information of the message is left unchanged because the SB bit is 0. The message is retained in the input buffer 604.

In the route instruction circuit 600 (FIG. 19), the destination PE address is decoded by the address decoder 705 because the BC and SB bits are both 0. A 1 is output to SY. The selector 618 then selects the message and sends it to the XB139 (XB-Y3).

As shown in FIG. 26, the message from the EX33 is transmitted to the XB139. What takes place within the XB139 will be described below with reference to FIGS. 21, 22 and 23.

The message is first transmitted to the route instruction circuit 900, as depicted in FIG. 21. In the route instruction circuit 900 (FIG. 23), the destination PE address is decoded by the address decoder 1108 because the BC and SB bits are both 0, with the result that the signal S2 becomes 1.

In the detour instruction circuit 905 (FIG. 22), the output signal remains unchanged because the register 1000 has a value of 0 set therein. The signal is transmitted to the EX23 via the switch 903.

In the route information change circuit 909, the transmit control information held in the message is not changed. This is because the output signal U3 from the detour instruction circuit 905 is 0.

The message input to the EX23 will now be described by referring to FIG. 18. The agreement judgment circuit 611 fails to detect an agreement, with the result that the output of the signal 614S becomes 0. The message is first transmitted to the route information change circuit 602. In the route information change circuit 602, the transmit control information is not changed because the SB bit is 0. The message is retained in the input buffer 605.

In the route instruction circuit 600 (FIG. 19), the destination PE address is decoded by the address decoder 706 because the BC and SB bits are both 0. A 1 is output to SP. The message is selected by the selector 619 and transmitted to the PE23.

To sum up, the one-to-one communication message is transmitted from the PE21 to the PE23 through the following routing: PE21→EX21→XB-Y1→EX31 XB-X3→EX33→XB-Y3→EX23→PE23.

Given an ordinary one-to-one communication message, the address decoders 704 through 706 in the EX and the address decoders 1105 through 1108 in the XB transmit the message selectively to the PE identified by the destination PE address held in the message.

When an XB is faulty, the fifth embodiment allows PEs connected to the faulty XB to transmit one-to-one communication messages to each other via the serializing network. When a detour is permitted only through the serializing network, no deadlock occurs from simultaneous generation of broadcast messages.

(Transmission of One-to-one Communication Message Involving a Faulty EX)

Figure 28:
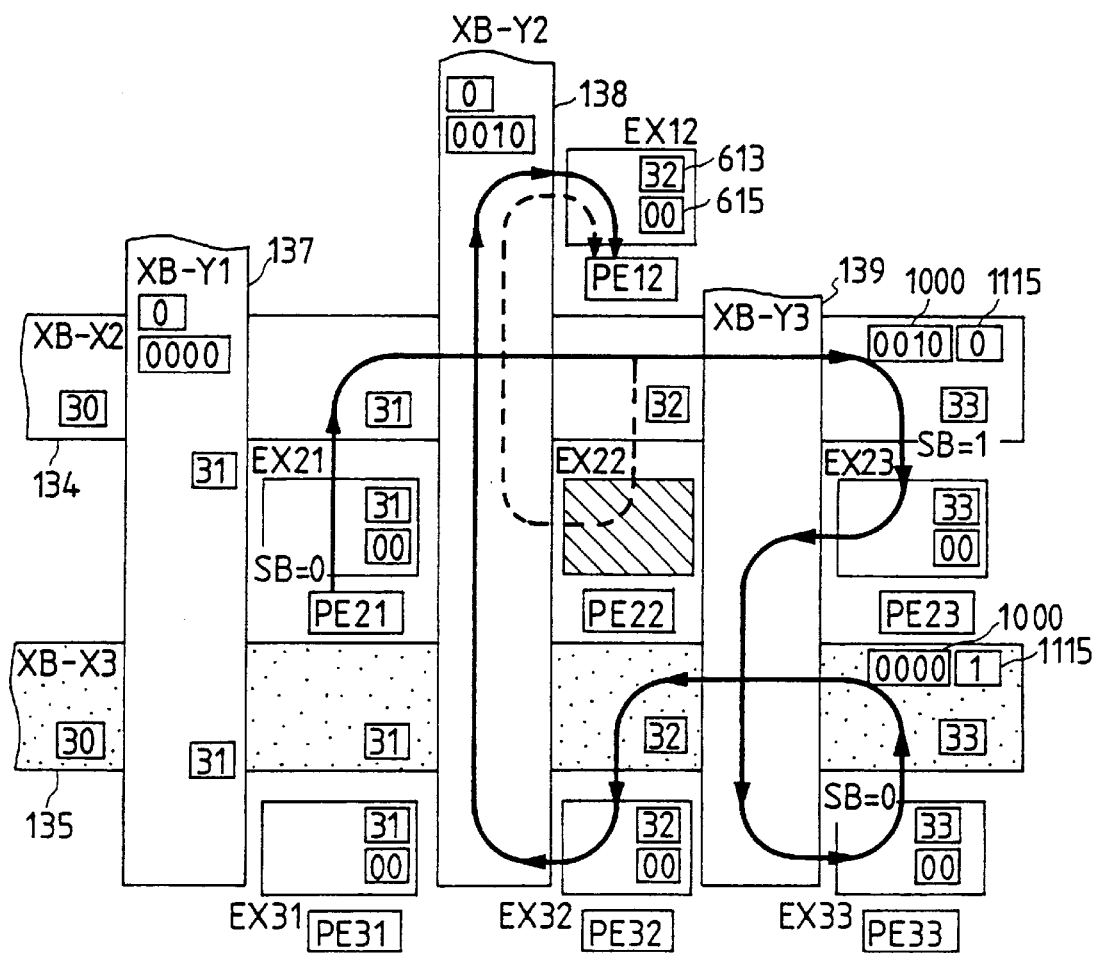
FIG. 28 is a view showing a typical route for transmitting a one-to-one communication message in case of an exchange switch fault in the circuit of FIG. 16.

FIG. 28 illustrates the flow of a one-to-one communication message sent from the PE21 to the PE12.

As shown in FIG. 28, the message from the PE21 is sent to the XB134 (XB-X2) via the EX21 as in the case of the fault-free network. What takes place within the XB-X2 will be described below with reference to FIGS. 21, 22 and 23.

As shown in FIG. 21, the message is first transmitted to the route instruction circuit 900. In the route instruction circuit 900 (FIG. 23), the destination PE address 12 is decoded by the address decoder 1106 because the BC and SB bits are both 0. The decoded result is sent to the OR gate group 1114, with 1 output to S2. Because the XB-X2 is not a serializing network, the register 1115 has a value of 0 set therein. Since the BC bit is 0 and the register 1115 contains 0, no output is effected from the AND gate group 1113.

In the detour instruction circuit 905 (FIG. 22), the AND gate 1003 outputs 1 because the register 1000 has a value of 0010. The output signal of S2 is replaced by S3 and the signal U3 becomes 1. The switch 904 selects the message as per the output signal S3. Since the signal U3 is 1, the route information change circuit 909 changes the SB bit of the transmit control information in the message from 0 to 1. At this point, the BC bit is 0 and the SB bit is 1.

Where an EX is faulty, the fifth embodiment operates characteristically as follows: the fault information in the XB connected to the faulty EX is referenced so that the detour instruction circuit transmits the message to the EX adjacent to the faulty EX and that the route information change circuit changes the transmit control information in the message. Although the fifth embodiment gets the detour instruction circuit 905 to transmit the message to the EX adjacent to the faulty EX, another EX not adjacent thereto may also be used.

What takes place within the EX23 will now be described with reference to FIGS. 18, 19 and 20. In the route instruction circuit 600 (FIG. 19), the address decoder 705 decodes the serializing network address 33 because the SB bit is 1. The decoded result is input to the OR gate group 711.

In the OR gate group 711, the OR gate 719 outputs 1 and a 1 is output to SY. The selector 618 then selects the message and sends it to the XB139 (XB-Y3). The other circuit operations are the same as those performed when the network is free of fault. As shown in FIG. 28, the message from the EX23 is transmitted to the XB139 (XB-Y3). The workings inside the XB139 are described below by referring to FIGS. 21, 22 and 23. As depicted in FIG. 21, the message is first transmitted to the route instruction circuit 900. In the route instruction circuit 900 (FIG. 23), the address decoder 1107 decodes the serializing network address 33 because the SB bit is 1. A 1 is output to S3. As per the signal S3, the switch 904 selects the message destined to the EX33.

What takes place within the EX33 will now be described with reference to FIGS. 18, 19 and 20. The agreement judgment circuit 611 finds an agreement upon comparison, with the result that the output of the signal 614S becomes 1. The message is first transmitted to the route information change circuit 602. In the route information change circuit 602, the AND gate 623 outputs 0 because the output of the signal 614S and the SB bit are both 1. The message with its SB bit replaced by 0 is then selected and retained in the input buffer 605. At this point, the BC and SB bits are both 0. Thereafter, as in the case of the fault-free network, the message is transmitted to the processor element PE12 in accordance with the destination PE address held in that message.

As described above, regardless of the network being normal or faulty in part, broadcast messages are transmitted via a specific crossbar switch. This avoids deadlocks and makes the transmission overhead appreciably lower than that of conventional parallel processor systems.

Where a faulty XB exists, one of the XBs on the same dimension as the faulty XB is selected as the serializing network. In such a case, one-to-one communication messages are allowed to make a detour only through the serializing network. This limits the reverse order transmission to a single location and thereby avoids deadlocks stemming from parallel transmission of a plurality of messages.

Where an EX is faulty, an XB to which the faulty EX is not connected is selected as the serializing network. In this case, too, one-to-one communication messages are allowed to make a detour only through the serializing network. This limits the reverse order transmission to a single location and thus avoids deadlocks resulting from parallel transmission of a plurality of messages.

Although the fifth embodiment has been shown to involve only two-dimensional setups, this embodiment may also apply to the n-dimensional constitution. In that case, the transmission of messages is fixed illustratively to the following order: X dimension→Y dimension→Z dimension→ . . . →N dimension. The serializing network may be one of the crossbar switches on the dimension on which the message in question is first transmitted.

<Sixth Embodiment>

The sixth embodiment is arranged to have a crossbar switch scheme serialize a mixture of partial broadcast messages and broadcast messages, thereby avoiding deadlocks that can result from the mixture of the two kinds of messages. Partial broadcast techniques are disclosed in detail in Japanese Pat. Laid-Open No. Hei 5-28122 and U.S. patent application Ser. No. 07/916,663 corresponding thereto. The contents of these publications are incorporated herein for reference. These disclosures contain no reference to the techniques for preventing deadlocks.

Partial broadcast is a scheme for transmitting the same data parallelly to a group of processor elements constituting part of the parallel processor system. The processor group may comprise PEs contained in a two-dimensional rectangular region of the whole system. For example, the processor group may belong to a rectangular region (called a region A) made up of a plurality of rows and columns including the PE00, PE01, PE10 and PE11. The processor group may also belong to a region made up of a single column including the PE00, PE10, PE20 and PE30. Furthermore, the processor group may belong to a region composed of a single row including the PE00, PE01, PE02 and PE03.

A format 17a shown in FIG. 29 is a format in which to compose messages for the sixth embodiment. The message format of the sixth embodiment differs from that of the fifth embodiment in that the broadcast message of the sixth embodiment includes maximum and minimum coordinates constituting process group limit information, in addition to the destination PE address and CTL (control) bits. The maximum coordinates are made of a maximum X-coordinate XMAX and a maximum Y-coordinate YMAX, and the minimum coordinates are composed of a minimum X-coordinate XMIN and a minimum Y-coordinate YMIN. Together, these coordinates define the processor group to which the message is destined. Besides the BC and SB bits, the CTL (control) bits include a PB bit indicating that the message is a partial broadcast message. Inclusion of the PB bit is another difference from the first embodiment.

In the partial broadcast request message, the PB and SB bits are both 1 and the BC bit is 0, as shown in a format 17f of FIG. 29. In the partial broadcast message, the PB bit is 1 and the BC and SB bits are both 0, as depicted in a format 17g of FIG. 29. The formats 17b through 17e in FIG. 29 correspond to the message formats 5b through 5e shown in FIG. 17.

Figure 30:
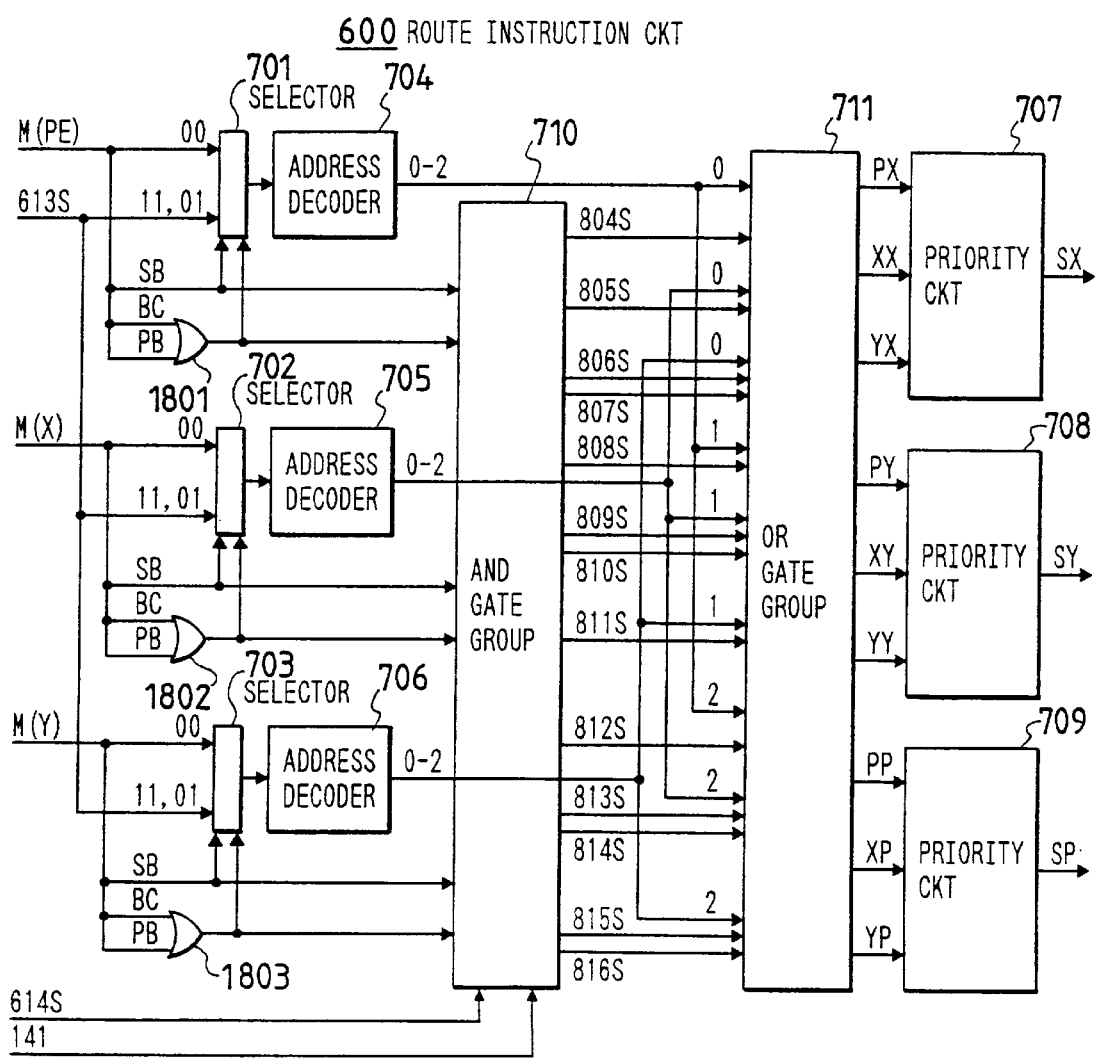
FIG. 30 is a schematic circuit diagram of a route instruction circuit within an exchange switch used by the sixth embodiment.

The only difference between the EX of the sixth embodiment and that of the fifth embodiment in FIG. 18 lies in the route instruction circuit 600. FIG. 30 is a schematic circuit diagram showing the structure of the route instruction circuit 600 within the EX of the sixth embodiment. What makes the circuit constitution of FIG. 30 different from the route instruction circuit of the fifth embodiment in FIG. 19 is the addition of OR gates 1801 through 1803. The OR gates 1801 through 1803 output 1 if either the PB bit or the BC bit is 1 within the message. Each OR gate (e.g., 1801) has its output connected to the selector (e.g., 701) and to the AND gate group 710. Comparing FIG. 19 with FIG. 30 reveals that the BC bit used by the fifth embodiment is replaced by the output of this OR gate for the sixth embodiment. Thus each EX in the sixth embodiment operates in the same manner regarding the broadcast message or partial broadcast message as its counterpart of the fifth embodiment.

Figure 31:
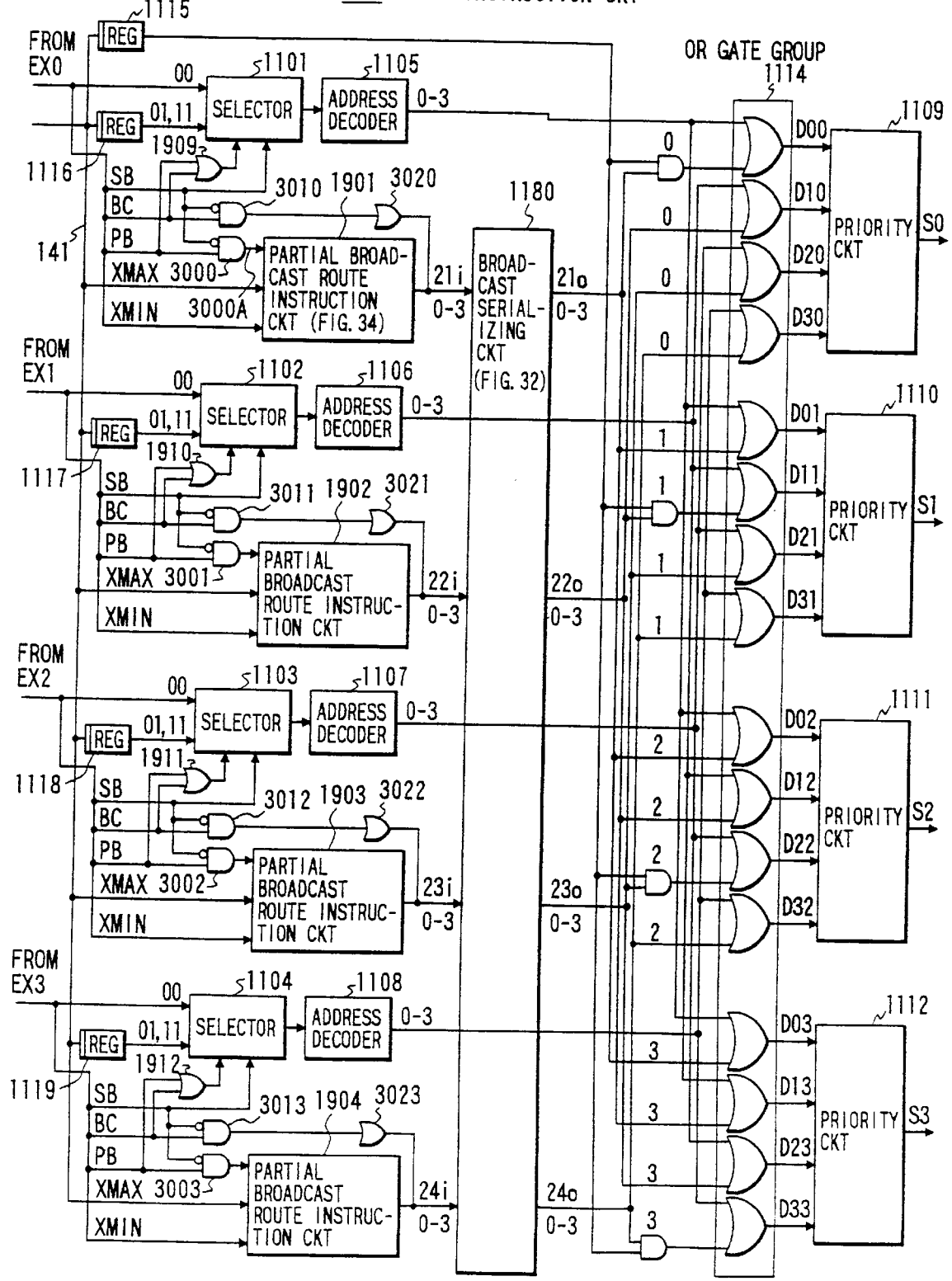
FIG. 31 is a schematic circuit diagram of a route instruction circuit within a crossbar switch used by the sixth embodiment.

The difference between the XB of the sixth embodiment and that of the fifth embodiment shown in FIG. 21 lies in the route instruction circuit 900 alone. FIG. 31 is a schematic circuit diagram showing the structure of the route instruction circuit 900 inside the XB of the sixth embodiment. What makes the circuit constitution of FIG. 31 different from the route instruction circuit of the fifth embodiment in FIG. 23 is the addition of OR gates 1909 through 1912, AND gates 3000 through 3003 and 3010 through 3013, drivers 3020 through 3023, and partial broadcast route instruction circuits 1901 through 1904. Of these added components, the OR gates 1909 through 1912 are concerned with the transmission of partial broadcast request messages or one-to-one communication messages requiring a detour. The AND gates 3000 through 3003 and the partial broadcast route instruction circuits 1901 through 1903 are associated with the transmission of partial broadcast messages. The drivers 3020 through 3023 are involved with the transmission of broadcast messages.

The OR gate 1909 is furnished so as to correspond with the input port connected to the EX0. Given the message through the corresponding input port, the OR gate 1909 operates on the BC and PB bits within the message and outputs the ORed result to the selector 1101. Thus whether the message is a partial broadcast request message or a partial broadcast message, the selector 1101 operates in the same manner as its counterpart of the fifth embodiment regarding the broadcast request message and broadcast message. The same applies to the other OR gates 1910 through 1914.

As described, the sixth embodiment transmits the partial broadcast request message and the one-to-one communication message requiring a detour in the same way as the fifth embodiment. Suppose that the PE01 of the sixth embodiment outputs a partial broadcast request message over a network comprising a serializing network as in the case of the fifth embodiment. In that case, as with the fifth embodiment, the EX01 of the sixth embodiment transmits the partial broadcast request message to the XB-Y1 which in turn forwards the message to the EX31. The EX31 changes the SB bit of this message to 0, thereby converting the partial broadcast request message into a partial broadcast message. The partial broadcast message is sent to the XB-X3 that serves as the serializing network. The transmission thereafter of the partial broadcast message by the sixth embodiment differs from what the fifth embodiment does regarding broadcast messages. It should be noted that the transmission of broadcast messages by the sixth embodiment is the same as that by the fifth embodiment, as will be described later.

Of the circuit components making up the XB, those associated with partial broadcast messages and broadcast messages will be described below in structural and operational terms.

The AND gate 3000 is furnished so as to correspond with the input port connected to the EX0. On receiving a message through the corresponding input port, the AND gate 3000 checks to see whether or not the received message is a partial broadcast message. When the PB bit is 1 and the SB bit is 0 in the received message, the AND gate 3000 recognizes a partial broadcast message and outputs 1 (3000A). The same applies to the other AND gates 3001 through 3003.

The partial broadcast route instruction circuit 1901 is furnished so as to correspond with the input port connected to the EX0. As will be explained later, the partial broadcast route instruction circuit 1901 operates effectively only when the message received through the corresponding input port turns out to be a partial broadcast message (PB=1, SB=0). In accordance with the maximum and minimum coordinates within the partial broadcast message received from the corresponding EX0, the partial broadcast route instruction circuit 1901 checks to see whether or not the processor element connected to the output port EX0, EX1, EX2 or EX3 inside the XB belongs to the processor group to which the partial broadcast message is destined. Depending on the result of its judgment, the partial broadcast route instruction circuit 1901 sets to 1 or 0 each of the values of output signals 21$i$-1 through 21$i$-4 corresponding to the four output ports. In this way the circuit 1901 generates four outputs. These output signals are represented collectively by reference numeral 21$i$ in FIG. 31, with an indication 0–3 placed on a signal line for identification of these signals. Likewise, the other partial broadcast instruction circuit 1902 and 1903 each receive a partial broadcast message through the input ports EX1, EX2 and EX3, and output signals 22$o$, 23$o$ and 24$o$ indicating which of the output ports the partial broadcast message is bound for.

Figure 34:
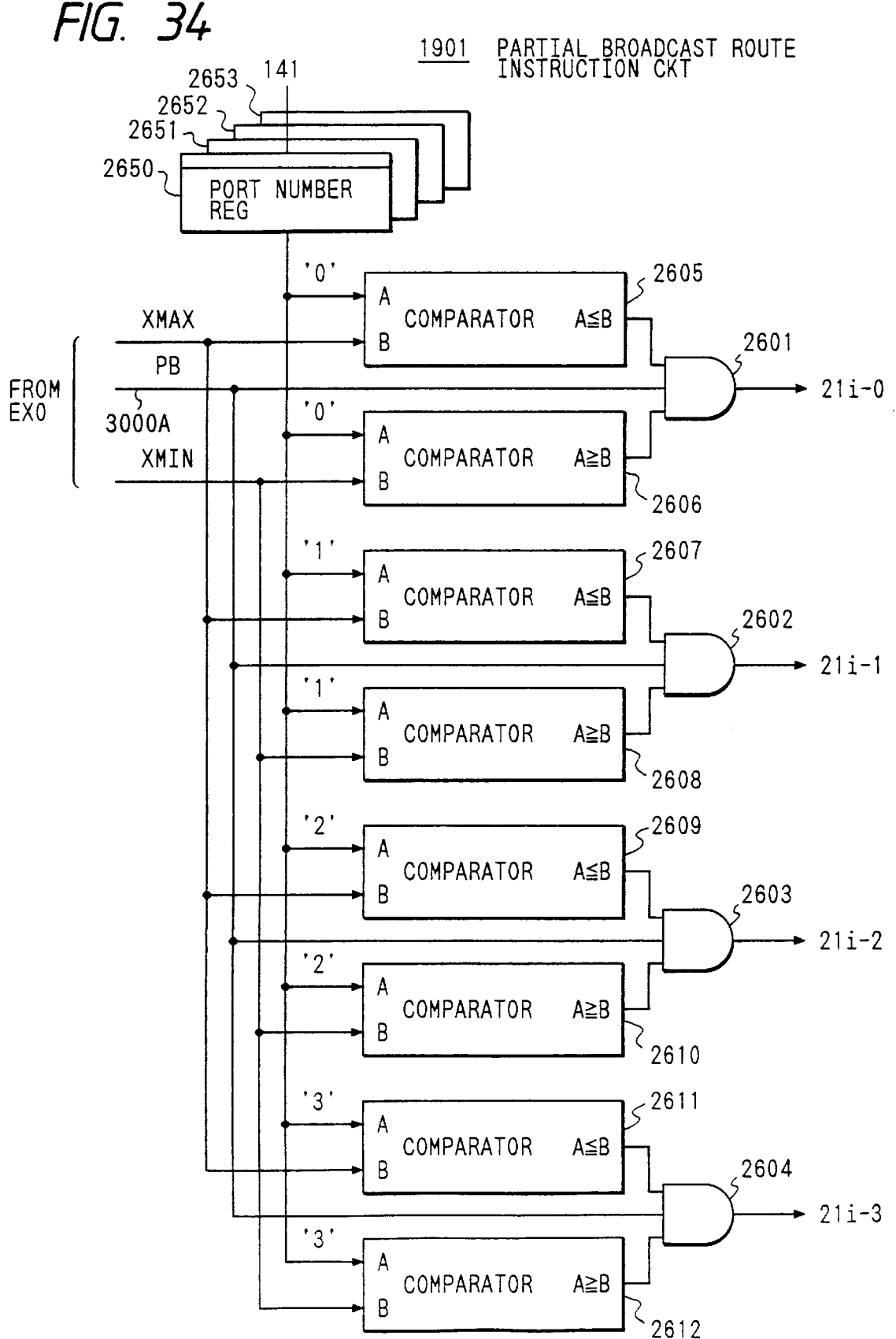
FIG. 34 is a schematic circuit diagram of a partial broadcast route instruction circuit used by the circuit of FIG. 31.

FIG. 34 is a schematic circuit diagram showing the structure of the partial broadcast route instruction circuit 1901. The partial broadcast route instruction circuit 1901 comprises registers 2650 through 2653, comparators 2605 through 2612, and AND gates 2601 through 2604. The registers 2650 through 2653 each retain the port number of the single corresponding output port. These output port numbers are set beforehand by the host processor or SVP. The comparators 2605 through 2612 constitute a plurality of pairs of comparators, each pair corresponding to a single output port. For example, a pair of comparators 2605 and 2606 check to see, given a message from the corresponding input port (EX0 in this case), whether or not the broadcast range defined by the maximum and minimum X-coordinates within the message includes that port number of the corresponding output port (e.g., EX0) which is retained in the register 2650. If the port number of the corresponding output port is found to fall within the range defined by the maximum and minimum X-coordinates in the message, the comparators 2605 and 2606 both output 1. The AND gate 2601 receives the output 3000A of the AND gate 3000 in FIG. 31 as well as the outputs from the comparators 2605 and 2606. The output 3000A is 1 when the received message is a partial broadcast message. Thus the output 21$i$-0 of the AND gate 2601 is 1 provided that the message input to the input port EX0 is a partial broadcast message and that the output port EX0 is included in the broadcast range defined by that partial broadcast message. Likewise, if the output port EX1, EX2 or EX3 is included in the broadcast range designated by the partial broadcast message, the output signal 21$i$-1, 21$i$-2 or 21$i$-3 becomes 1.

The AND gate 3010 is furnished so as to correspond with the input port connected to the EX0. On receiving a message through the corresponding input port, the AND gate 3010 checks to see whether or not the received message is a broadcast message. When the BC bit is found to be 1 and the SB bit to be 0 in the received message, the AND gate 3010 recognizes a broadcast message and outputs 1. The driver 3020 receives the output of the AND gate 3010. If the output of the AND gate 3010 is 1, the driver 3020 sends a value of 1 to the four output terminals 21$i$-0 through 21$i$-3 of the partial broadcast route instruction circuit 1901, thereby indicating that this broadcast message is to be transmitted to the four output ports.

When the XB in question receives a plurality of partial broadcast messages or broadcast messages from part or all of the EX0 through EX3, the broadcast serializing circuit 1180 selects either one of the broadcast messages, or one or more of the partial broadcast messages for transmission.

FIG. 32 is a schematic circuit diagram of the broadcast serializing circuit 1180. In the circuit 1180, the priority circuit 2001 selects one or more of four signals 21$i$, 22$i$, 23$i$ and 24$i$ that are determined regarding the four input ports. The signals are selected on a first-in, first-out basis. As in the case of the fifth embodiment, when a plurality of broadcast messages are input simultaneously to the XB in question, the priority circuit 2001 generally selects only one input signal at a time representing one of the broadcast messages. Likewise, when a broadcast message and a partial broadcast message are input simultaneously to this XB, the priority circuit 2001 selects only one input signal at a time representing one of the input messages. Thus even when partial broadcast messages and broadcast messages are input mixedly through a plurality of input ports, the sixth embodiment serializes the messages in the same manner as the fifth embodiment, thereby preventing deadlocks. It should be noted that if a plurality of partial broadcast messages are input to the XB and if the output ports for transmitting these messages do not overlap with one another, the sixth embodiment may select input signals representing these partial broadcast messages. Where there are individually different destinations for the multiple partial broadcast messages, these messages may be transmitted in parallel and their transmission routes still do not overlap with one another. With no overlap between the transmission routes, no deadlock occurs from the parallel transmission of a plurality of partial broadcast messages following parallel selection of these messages. The priority circuit 2001 supplies selector control signals s0 through s3 to the selectors 2002 through 2005 so that one of these selectors will output the selected signals received.

As described above, when the partial broadcast request message from the PE01 is converted to a partial broadcast message by the EX31 and sent to the serializing network XB-X3, the XB-X3 in turn forwards the partial broadcast message to part of the EX30 through EX33 connected to this XB, i.e., to those EXs connected to the processor group designated by this partial broadcast message (e.g., EX30 and EX31). As with the fifth embodiment, the EX30 transmits this partial broadcast message to the PE30 as well as to the XB-Y0. The EX31 sends the partial broadcast message to the PE31 as well as to the XB-Y1. Via the partial broadcast route instruction circuits 1901 through 1904 in the XB, the XB-Y0 transmits the partial broadcast message illustratively to the EX00 and EX10, i.e., those EXs that are connected to the PE belonging to the processor group designated by this message. From the EX00 and EX10, the message is transmitted further to the PE00 and PE10 connected therewith. Likewise, the XB-Y1 transmits the partial broadcast message from the EX31 to part of the PEs (e.g., PE01 and PE11) via part of the EXs (e.g., EX001, EX11). Thus the data contained in the partial broadcast message from the PE01 is transmitted selectively to the PE00, PE01, PE10 and PE11 only.

The description above has shown how partial broadcast messages are transmitted over the fault-free network. Furthermore, the sixth embodiment transmits broadcast messages in the same manner as the fifth embodiment. Where one XB or one EX is faulty, the sixth embodiment transmits one-to-one communication messages over the network in exactly the same way as the fifth embodiment.

<Seventh Embodiment>

The seventh embodiment is arranged to have a particular exchange switch (EX) serialize broadcast request messages so as to avoid deadlocks therebetween. That particular EX is used as the serializing network. More specifically, broadcast request messages are each transmitted to the serializing network (EX). The EX then sets the SB bit to 0 in each broadcast request message for conversion into a broadcast message, as in the case of the fifth embodiment. With the seventh embodiment, the serializing network (EX) transmits each message directly to the PE connected therewith as well as to the other PEs via the XB-X and XB-Y connected to the same EX.

Figure 33:
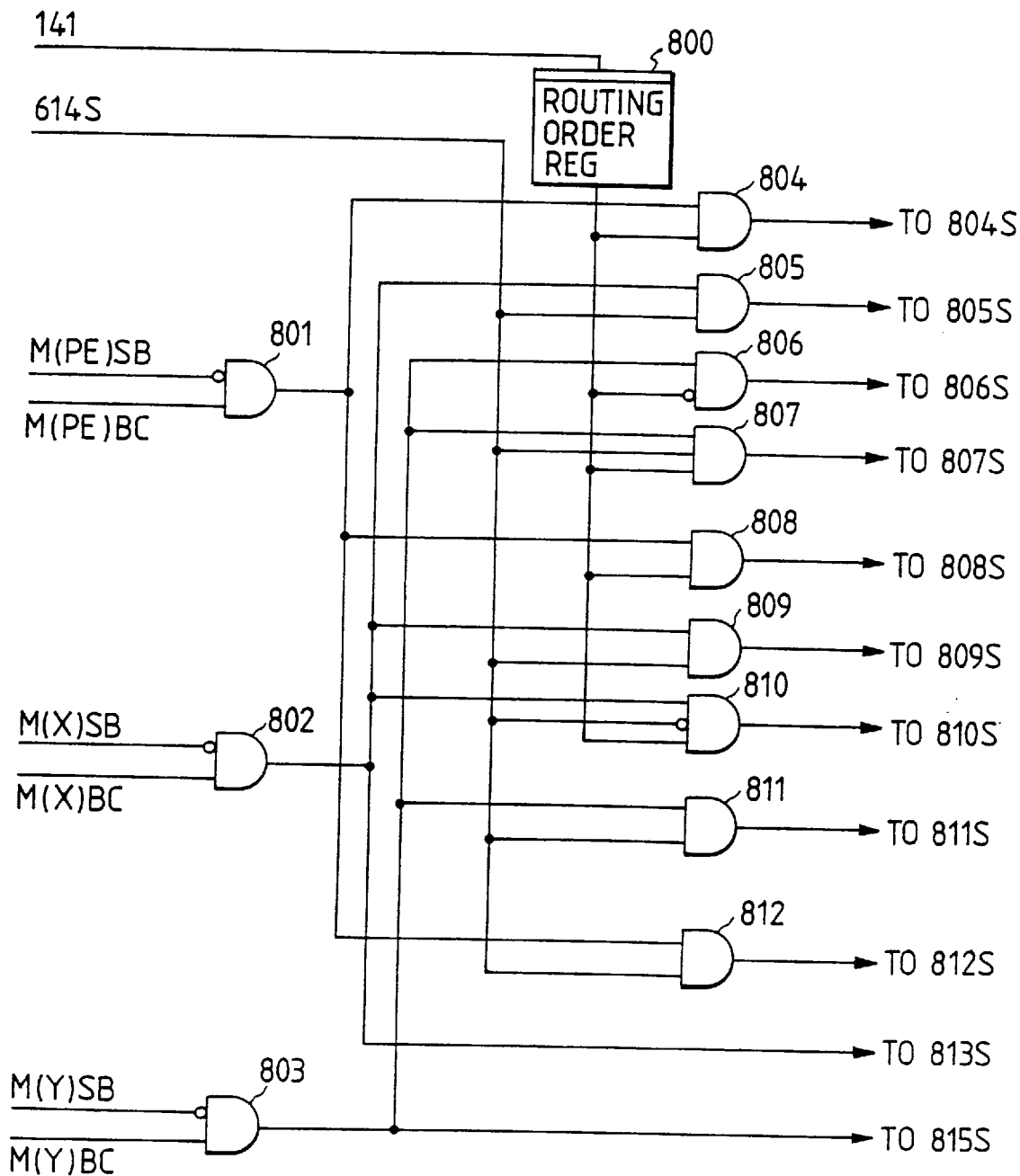
FIG. 33 is a schematic circuit diagram of an AND gate group within an exchange switch used by a parallel processor system practiced as a seventh embodiment of the invention.

The operation above has been implemented by the fifth embodiment utilizing the AND gate group 710 of FIG. 20; this AND gate group 710, located in the route instruction circuit 600 of FIG. 19, determines through which routes the messages received from M(PE), M(X) and M(Y) are to be transmitted. The EX of the seventh embodiment utilizes the AND gate group 710 in FIG. 33 instead of that in FIG. 20. As shown in FIG. 33, this AND gate group 710 is arranged so that when the EX acting as the serializing network transmits a broadcast message, that message will be transmitted simultaneously to the XB-Xs, XB-Ys and PEs. This is one aspect that makes the AND gate group 710 of the seventh embodiment different from that of the first embodiment. It should also be noted that the AND gate group 710 of the seventh embodiment does not include the signal lines 814S and 816S. Comparing FIG. 20 with FIG. 33 reveals that the AND gate group is simpler in structure where broadcast messages are serialized by an EX. The register 613 in each EX or the registers 1116 through 1119 in the XB retain the address of this EX as the serializing network address. Alternatively, the registers 1116 through 1119 may be replaced by a single common register.

<Eighth Embodiment>

The eighth embodiment is arranged to have an exchange switch (EX) serialize both broadcast messages and partial broadcast messages to avoid deadlocks therebetween. The description that follows will focus on the differences from the fifth and the seventh embodiment.

As with the fifth and the seventh embodiment, the eighth embodiment utilizes a particular EX as the serializing network. Broadcast request messages and partial broadcast request messages are transmitted to the serializing network (EX). In turn, the EX sets the SB bit to 0 in each of the received messages. In this EX of the eighth embodiment, the AND gate group 710 of FIG. 33 used by the seventh embodiment is adopted in place of the AND gate group 710 in the route instruction circuit of FIG. 30 used by the fifth embodiment.

<Variations>

(1) In the fifth through the eighth embodiment, the address of the serializing network may be written in each message by software or by hardware. When the message arrives at the serializing network, the serializing network address in the message may be updated thereby. This makes it possible to serialize broadcast messages and to implement a detour of one-to-one communication messages through a partially faulty network.

(2) With the sixth embodiment, the range of processor elements within which to effect partial broadcast is defined in each partial broadcast message. Alternatively, the partial broadcast range may be set in a register group of a crossbar switch. This makes the message format as simple as what is shown in FIG. 17.

(3) The description of the fifth through the eighth embodiment has centered on hyper-crossbar networks. Alternatively, the invention also applies to a multi-stage interconnection network, a hyper-cube network and a lattice network each composed of a large number of partial networks.

Such applicable networks are each constituted by interconnecting a plurality of exchange switches (EXs). Thus when one of the EXs making up any of such networks is utilized suitably by the seventh or the eighth embodiment, this scheme also implements serialization of broadcast messages as achieved by an exchange switch in the hyper-crossbar network in conjunction with the seventh or the eighth embodiment.

As described above and according to the invention, deadlocks are avoided between a plurality of broadcast messages or partial broadcast messages issued from a plurality of processor elements in a parallel processor system (i.e., network) composed of a plurality of partial networks. Specifically, the invention avoids such deadlocks through the use of a particular partial network in the network or by utilizing a particular circuit attached to the network. Furthermore, the invention employs the particular partial network to make one-to-one communication messages detour around a fault in the network during transmission.

What is claimed is:

1. In a parallel processor system which includes a plurality of processor elements and a network which connects said plurality of processor elements for parallel transfer of plural messages thereamong, a message transfer method comprising the steps of:

transferring, by said network, a broadcast request message from a sending processor element to a predetermined location within said network predetermined for at least plural ones of said plurality of processor elements, said broadcast request message including data designated by said sending processor element and to be transferred to said plurality of processor elements;

supplying, by said network, a broadcast message, in response to arrival of said broadcast request message at said predetermined location within the network, said broadcast message including said data included in said broadcast request message; and transferring, by said network, said supplied broadcast message to said plurality of processor elements.

2. A message transfer method according to claim 1, wherein said step of transferring said broadcast message includes a step of transferring, by said network, said supplied broadcast message by way of routes within said network which do not overlap a route within said network by way of which said broadcast request message is transferred from said sending processor element to said predetermined location.

3. A message transfer method according to claim 2,
wherein said step of transferring said broadcast request message includes a step of sequentially transferring a plurality of message portions which constitute said broadcast request message by worm-hole routing from said sending processor element to said predetermined location;

wherein said step of supplying said broadcast message includes a step of sequentially supplying a plurality of message portions constituting said broadcast message, respectively corresponding to said plurality of transferred message portions which constitute said broadcast request message, respectively in response to arrival of corresponding ones of said plurality of message portions which constitute said broadcast request message at said predetermined location; and wherein said step of transferring said broadcast message includes a step of sequentially transferring, by said network, said plurality of sequentially supplied message portions constituting said broadcast message to said plurality of processor elements by worm-hole routing.

4. A message transfer method according to claim 1,
wherein said broadcast request message further includes first control information;

wherein said broadcast message further includes second control information, which is different from said first control information, and which is related to a broadcast message;

wherein said transferring of said broadcast request message includes a step of controlling a transfer path thereof based upon said first control information; and wherein said transferring of said broadcast message includes a step of controlling a transfer path thereof based upon said second control information.

5. A message transfer method according to claim 4,
wherein said first control information includes address information related to said predetermined location; and wherein said step of controlling a transfer path of said broadcast request message is executed based upon said address information.

6. A message transfer method according to claim 4,
wherein said first control information includes information related to a broadcast request message; and wherein said step of controlling a transfer path of said broadcast request message is executed based upon said information related to a broadcast request message.

7. A message transfer method according to claim 1,
wherein said broadcast request message further includes first control information related to a broadcast request message;

wherein said broadcast message further includes second control information related to a broadcast message; and wherein said step of supplying said broadcast message includes a step of supplying said broadcast message by converting said first control information included in said broadcast request message supplied to said predetermined location, into said second control information.

8. A parallel processor system, comprising:

a plurality of processor elements; and a network connected to said plurality of processor elements and responsive to a plurality of broadcast request messages, for sequentially transferring a plurality of broadcast messages to said plurality of processors in response to arrival of said broadcast request messages at a predetermined location within the network, each broadcast request message being transmitted in parallel with each other by a different one of a plurality of sending processor elements and each including data to be transmitted to said plurality of processors, said network including a broadcast message supply circuit provided at said predetermined location in common to at least plural ones of said plurality of processor elements, wherein at least plural ones of said broadcast request messages are provided in common to said predetermined location;

wherein each broadcast message corresponds to one of said plurality of broadcast request messages and includes said data included in a corresponding one of said plurality of broadcast request messages.

9. A parallel processor system according to claim 8, wherein said network transfers, in parallel, plural one-to-one communication messages respectively transmitted by different sending processors and addressed to different destination processors.

10. A parallel processor system according to claim 8,
wherein said network includes:

a switch circuit connected to said plurality of processor elements for realizing plural transfer paths for parallel transfer of plural messages among said plurality of processors;

wherein said switch circuit transfers said plurality of broadcast request messages, each from one of said plurality of sending processor elements, to said broadcast message supply circuit at said predetermined location;

wherein said broadcast message supply circuit sequentially supplies said switch circuit with said plurality of broadcast messages, in response to said plurality of broadcast request messages; and wherein said switch circuit further transfers each of said plurality of broadcast messages to said plurality of processor elements, in response to supplying thereof by said broadcast message supply circuit.

11. A parallel processor system according to claim 10,
wherein said switch circuit transfers each of said plurality of broadcast messages supplied by said broadcast message supply circuit, to said plurality of processor elements by way of routes within said network which do not overlap routes within said network by way of which said plurality of broadcast request messages are transferred from said plurality of sending processor elements to said broadcast message supply circuit.

12. A parallel processor system according to claim 11,
wherein said switch circuit sequentially transfers a plurality of message portions which constitute each of said plurality of broadcast request messages by worm-hole routing, from one of said plurality of sending processor elements to said broadcast message supply circuit;

wherein said broadcast message supply circuit includes a sequential message portion supply circuit for sequentially supplying said switch circuit with a plurality of message portions constituting each broadcast message, respectively corresponding to said plurality of message portions constituting said each of said plurality of broadcast request messages, respectively in response to arrival of corresponding ones of said plurality of message portions constituting said each broadcast request message at said broadcast message supply circuit; and wherein said switch circuit further transfers sequentially said plurality of supplied message portions constituting said each broadcast message, to said plurality of processor elements by worm-hole routing.

13. A parallel processor system according to claim 10, wherein said switch circuit transfers said plurality of broadcast messages to said broadcast message supply circuit in parallel; and wherein said broadcast message supply circuit includes a sequential message supply circuit for sequentially supplying said switch circuit with said plurality of broadcast messages, in response to said plurality of broadcast request messages supplied in parallel to said broadcast message supply circuit.

14. A parallel processor system according to claim 13, wherein said sequential message supply circuit includes:
a selection circuit for sequentially selecting said plurality of broadcast request messages transferred in parallel to said broadcast message supply circuit; and
a message generating circuit for generating and supplying each of said plurality of broadcast messages to said switch circuit, in response to selecting of a corresponding one of said plurality of broadcast request messages by said selection circuit.

15. A parallel processor system according to claim 13, wherein said sequential message supply circuit includes:
a plurality of message generating circuits for generating, in parallel, said plurality of broadcast messages corresponding to said plurality of said broadcast request messages, in response to said transferring of said plurality of said broadcast request messages in parallel to said broadcast message supply circuit; and
a selection circuit for sequentially selecting and supplying said plurality of generated broadcast messages to said switch circuit.

16. A parallel processor system according to claim 10, wherein said switch circuit sequentially transfers said plurality of broadcast request messages to said broadcast message supply circuit; and wherein said broadcast message supply circuit includes a message supply circuit for sequentially supplying said switch circuit with said plurality of broadcast messages, each in response to transferring of a corresponding one of said plurality of broadcast request messages to said broadcast message supply circuit.

17. A parallel processor system according to claim 10, wherein each broadcast request message further includes first control information;

wherein each broadcast message further includes second control information which is different from said first control information and is related to a broadcast message; and wherein said switch circuit controls a transfer path of each broadcast request message based upon said first control information included therein and a transfer path of each broadcast message based upon said second control information included therein.

18. A parallel processor system according to claim 17, wherein said first control information included in each broadcast request message includes address information related to said broadcast message supply circuit; and wherein said switch circuit controls a transfer path of each broadcast request message based upon said address information included therein.

19. A parallel processor system according to claim 17, wherein said first control information included in each broadcast request message includes information related to a broadcast request message; and wherein said switch circuit controls a transfer path of each broadcast request message based upon said information related to a broadcast request message included therein.

20. A parallel processor system according to claim 10, wherein each broadcast request message further includes first control information related to a broadcast request message;

wherein each broadcast message further includes second control information related to a broadcast message; and wherein said broadcast message supply circuit includes a message generating circuit for generating each broadcast request by converting said first control information included in a corresponding one of said plurality of broadcast request messages supplied to said broadcast message supply circuit, into said second control information.

21. A parallel processor system according to claim 10, wherein said broadcast message supply circuit sequentially supplies said plurality of broadcast messages to a common location within said network, predetermined for at least plural ones of said plurality of processor elements.

22. A parallel processor system according to claim 10, wherein said broadcast message supply circuit supplies each of said plurality of broadcast messages to one of a plurality of particular locations within said network, predetermined for at least plural ones of said plurality of processor elements; and wherein said switch circuit transfers each of said plurality of broadcast messages to said plurality of processor elements by way of routes predetermined in common to said plurality of particular locations, in response to supplying of said each broadcast message to one of said plurality of particular locations.

23. A parallel processor system according to claim 10, wherein said network further includes:
a plurality of partial networks each for parallel transfer of plural messages;
wherein said switch circuit includes a plurality of exchange switches each connected to at least two of said plurality of partial networks;
wherein said broadcast message supply circuit is connected to at least plural ones of said plurality of partial networks;
wherein each processor element is connected to one of said plurality of exchange switches; and
wherein said broadcast message supply circuit receives said plurality of broadcast request messages by way of at least one of said plural partial networks connected to said broadcast message supply circuit, and sequentially supplies another of said plural partial networks connected to said broadcast message supply circuit with said plurality of broadcast messages.

24. A parallel processor system according to claim 23, wherein said plurality of partial networks and said plurality of exchange switches further transfer each of said plurality of broadcast messages to said plurality of processor elements, in response to supplying thereof by said broadcast message supply circuit to said another partial network.

25. A parallel processor system according to claim 24, wherein said plurality of partial networks and said plurality of exchange switches transfer said plurality of broadcast messages to said broadcast message supply circuit in parallel by way of said plural partial networks connected to said broadcast message supply circuit; and
wherein said broadcast message supply circuit includes a sequential message supply circuit for sequentially supplying said another of said plural partial networks connected to said broadcast message supply circuit with said plurality of broadcast messages, in response to said plurality of broadcast request messages supplied in parallel to said broadcast message supply circuit.

26. A parallel processor system according to claim 25, wherein each broadcast request message further includes first control information related to a broadcast request message;
wherein each broadcast message further includes second control information related to a broadcast message; and
wherein said sequential message supply circuit includes:
a selection circuit for sequentially selecting said plurality of broadcast request messages transferred in parallel to said broadcast message supply circuit; and
a message generating circuit for generating each of said plurality of broadcast messages, in response to selecting of a corresponding one of said plurality of broadcast request messages by said selection circuit.

27. A parallel processor system according to claim 24, wherein said plurality of partial networks and said plurality of exchange switches sequentially transfer said plurality of broadcast messages to said broadcast message supply circuit by way of said one of said plural partial networks connected to said broadcast message supply circuit; and
wherein said broadcast message supply circuit includes a sequential message supply circuit for sequentially supplying said another of said plural partial networks connected to said broadcast message supply circuit with said plurality of broadcast messages, each in response to transferring of a corresponding one of said plurality of broadcast request messages to said broadcast message supply circuit.

28. A parallel processor system according to claim 27, wherein each broadcast request message further includes first control information related to a broadcast request message,
wherein each broadcast message further includes second control information related to a broadcast message; and
wherein said sequential message supply circuit includes a message generating circuit for generating each of said plurality of broadcast messages, in response to arrival of a corresponding one of said plurality of broadcast request messages at said broadcast message supply circuit.

29. A parallel processor system according to claim 23, wherein each partial network comprises a crossbar switch; and
wherein said plurality of partial networks and said plurality of exchange switches are connected to each other to form a hyper-crossbar network.

30. A parallel processor system according to claim 10, wherein said network further includes:
a plurality of partial networks, each including a switch circuit for controlling transfer paths of messages in said each partial network for parallel transfer thereof; and
a plurality of exchange switches, each connected to at least two of said plurality of partial networks;
wherein said broadcast message supply circuit is connected to the switch circuit included in a predetermined one of said plurality of partial networks, and a group of said plurality of exchange switches connected to said predetermined partial network;
wherein each processor element is connected to one of said plurality of wherein switches; and
wherein said broadcast message supply circuit sequentially supplies said switch circuit included in said predetermined partial network with said plurality of broadcast messages, in response to said plurality of broadcast request messages supplied to plural ones of said group of exchange switches.

31. A parallel processor system according to claim 30, wherein said plurality of partial networks and said plurality of exchange switches transfer said plurality of broadcast request messages in parallel, each from one of said plurality of sending processor elements to one of said group of exchange switches; and
wherein said switch circuit included in said predetermined partial network, said plurality of partial networks other than said one predetermined network, and said plurality of exchange switches further transfer each of said plurality of broadcast messages to said plurality of processor elements, in response to supplying thereof by said broadcast message supply circuit to said switch circuit included in said predetermined partial network.

32. A parallel processor system according to claim 30, wherein each broadcast request message further includes first control information related to a broadcast request message;
wherein each broadcast message further includes second control information related to a broadcast message;
wherein said broadcast message supply circuit includes:
a plurality of message generating circuits each included in a corresponding one of said group of exchange switches, each message generating circuit generating one of said plurality of broadcast messages corresponding to one of said plurality of broadcast request messages, in response to transferring of said corresponding broadcast request message to said corresponding group of exchange switches;
wherein each of said group of exchange switches transfers one of said plurality of broadcast messages to said predetermined partial network, in response to generation of said one broadcast message by a corresponding one of said plurality of message generating circuits included in said each of said group of exchange switches, so that said plurality of broadcast messages are transferred from plural ones of said group of said exchange switches to said predetermined partial network in parallel; and wherein said broadcast message supply circuit further includes:
 a selection circuit connected to said switch circuit included in said predetermined partial network, for sequentially selecting and supplying to said switch circuit included in said predetermined partial network, said plurality of broadcast request messages transferred in parallel to said predetermined one partial network by said plural exchange switches within said group of exchange switches.

33. A parallel processor system according to claim 30,
wherein each partial network comprises a crossbar switch; and
wherein said plurality of partial networks and said plurality of exchange switches are connected to each other to form a hyper crossbar network.

34. A parallel processor system according to claim 30,
wherein each exchange switch includes:
 a register for holding fault information which indicates whether one of plural partial networks connected to said each exchange switch is faulty; and
 a message modifying circuit which adds detour instructing information to a one-to-one communication message supplied from one processor element connected to said each exchange switch, in case said fault information indicates that one of said plural partial networks connected to said each exchange switch is faulty; and
wherein said plurality of exchange switches and said plurality of partial networks transfer a one-to-one communication message supplied by one of said plurality of exchange switches connected to a faulty partial network, to a destination processor element designated by said one-to-one communication message, by way of said one predetermined partial network and not by way of said faulty partial network, in response to detour instructing information included in said one-to-one communication message.

35. A parallel processor system according to claim 30,
wherein each partial network includes:
 a register for holding fault information which indicates whether one of plural exchange switches connected to said each partial network is faulty; and
 a message modifying circuit which adds detour instructing information to a one-to-one communication message transmitted by one processor element connected to and supplied by a fault-free free exchange switch within plural exchange switches connected to said each partial network, in case said fault information indicates that one of said plural exchange switches connected to said each partial network is faulty; and
wherein said plurality of partial networks and said plurality of exchange switches transfer a one-to-one communication message supplied by one of said plurality of partial networks connected to a faulty exchange switch, to a destination processor element designated by said one-to-one communication message, by way of said one predetermined partial network and not by way of said faulty exchange switch, in response to detour instructing information included in said one-to-one communication message.

36. In a parallel processor system which includes a plurality of processor elements and a network which connects said plurality of processor elements for parallel transfer of plural messages thereamong, a message transfer method comprising the steps of:

transferring, each by a different one of a plurality of sending processor elements to one of a plurality of predetermined locations within said network, predetermined for at least plural ones of said plurality of processor elements, a plurality of broadcast request messages in parallel to said network, each broadcast request message including data designated by one of said plurality of sending processor elements and to be transferred to said plurality of processor elements; and sequentially transferring, by said network, a plurality of broadcast messages to said plurality of processor elements, in response to said plurality of broadcast request messages, each of said plurality of broadcast messages corresponding to one of said plurality of broadcast request messages and including said data included in a corresponding one of said plurality of broadcast request messages.

37. A message transfer method according to claim 36, wherein said step of sequentially transferring said plurality of broadcast messages includes a step of sequentially supplying said plurality of broadcast messages to a particular location within said network, predetermined for at least plural ones of said plurality of processor elements.

38. A message transfer method according to claim 36, wherein said step of sequentially transferring said plurality of broadcast messages includes the steps of:
 sequentially selecting said plurality of broadcast request messages transferred in parallel to said plurality of predetermined locations; and
 supplying each of said plurality of broadcast messages, in response to selecting of a corresponding one of said plurality of broadcast request messages by said selecting step.

39. A message transfer method according to claim 36, wherein said step of sequentially transferring said plurality of broadcast messages includes the steps of:
 generating in parallel said plurality of broadcast messages corresponding to said plurality of broadcast request messages, in response to said transferring of said plurality of said broadcast request messages in parallel to said plurality of predetermined locations; and
 sequentially selecting and supplying said plurality of generated broadcast messages.

40. A message transfer method according to claim 36,
wherein said step of sequentially supplying said plurality of broadcast messages includes a step of transferring each of said plurality of broadcast messages to one of a plurality of particular locations within said network, predetermined for at least plural ones of said plurality of processor elements; and
wherein said step of supplying each of said plurality of broadcast messages includes a step of transferring each broadcast message to said plurality of processor elements by way of routes predetermined in common to said plurality of particular locations, in response to supplying of said each broadcast message to one of said plurality of particular locations.

41. A message transfer method according to claim 36, wherein said transferring of said plurality of broadcast messages includes a step of transferring said each of said plurality of broadcast messages by way of routes within said network which do not overlap routes within said network by way of which said plurality of broadcast request messages are transferred from said plurality of sending processor elements to said plurality of predetermined locations, 42. A message transfer method according to claim 41, wherein said step of transferring said plurality of broadcast request messages includes a step of sequentially transferring a plurality of message portions which constitute each of said plurality of broadcast request messages by worm-hole routing, from one of said plurality of sending processor elements to one of said plurality of predetermined locations;

wherein said step of sequentially transferring said plurality of broadcast messages includes a step of sequentially supplying a plurality of message portions constituting each broadcast message, respectively corresponding to said plurality of message portions constituting said each of said plurality of broadcast request messages, respectively in response to arrival of corresponding ones of said plurality of message portions constituting said each broadcast request message at one of said plurality of predetermined locations; and wherein said step of transferring each of said plurality of broadcast messages includes a step of sequentially transferring, by said network, said plurality of supplied message portions constituting said each broadcast message, to said plurality of processor elements by way of said network by worm-hole routing.

43. A message transfer method according to claim 36, wherein each broadcast request message further includes first control information;

wherein each broadcast message further includes second control information which is different from said first control information and is related to a broadcast message;

wherein said transferring of said plurality of broadcast request messages includes a step of controlling a transfer path of each broadcast request message based upon said first control information included therein; and wherein said sequential transferring of said plurality of broadcast messages includes a step of controlling a transfer path of each broadcast message based upon said second control information included therein.

44. A message transfer method according to claim 43, wherein said first control information included in each broadcast request message includes address information related to one of said plurality of predetermined locations; and wherein said step of controlling a transfer path of each broadcast request message is executed based upon said address information included therein.

45. A message transfer method according to claim 43, wherein said first control information included in each broadcast request message includes information related to a broadcast request message; and wherein said step of controlling a transfer path of each broadcast request message is executed based upon said information related to a broadcast request message included therein.

46. A message transfer method according to claim 36, wherein each broadcast request message further includes first control information related to a broadcast request message;

wherein each broadcast message further includes second control information related to a broadcast message;

wherein said step of sequentially transferring said plurality of broadcast messages includes a step of supplying each broadcast message by converting said first control information included in a corresponding one of said plurality of broadcast request messages supplied to one of said predetermined locations, into said second control information.

* * * * *

UNITED STATES PATENT AND TRADEMARK OFFICE
CERTIFICATE OF CORRRECTION

PATENT NO. : 5,822,605                                    Page 1 of 2
DATED     : October 13, 1998
INVENTOR(S) : Higuchi et al It is certified that error appears in the above-identified patent and that said Letters Patent is hereby corrected as shown below:

On the title page, add item [56]

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 5- | 8 | 1 | 2 | 1 | 6 | 04/02/93 | Japan | | | | |
| | | 1- | 2 | 6 | 7 | 7 | 6 | 3 | 10/25/89 | Japan | | | |
| | | 3- | 2 | 0 | 9 | 5 | 5 | 0 | 09/12/91 | Japan | | | |
| | | 5- | 2 | 8 | 1 | 2 | 2 | | 02/05/93 | Japan | | | |
| | | | | | | | | | | | | | |

UNITED STATES PATENT AND TRADEMARK OFFICE
CERTIFICATE OF CORRRECTION

PATENT NO. : 5,822,605
DATED : October 13, 1998
INVENTOR(S) : Higuchi et al It is certified that error appears in the above-identified patent and that said Letters Patent is hereby corrected as shown below:

On the title page, add item [56]

OTHER DOCUMENTS

|  |  |
|---|---|
|  | T. Boku et al, "A Performance Evaluation of Hyper-Crossbar Network" TECHNICAL REPORT OF IEICE, Institute of Electronics, Information and Communication Engineers, CPSY 93-40, (1993-11), pages 41-48. |
|  |  |

Signed and Sealed this

Sixth Day of April, 1999

Attest:

Q. TODD DICKINSON

Attesting Officer

Acting Commissioner of Patents and Trademarks